(12) United States Patent
Coleman

(10) Patent No.: US 8,249,408 B2
(45) Date of Patent: Aug. 21, 2012

(54) METHOD OF MANUFACTURING AN OPTICAL COMPOSITE

(75) Inventor: Zane Coleman, Chicago, IL (US)

(73) Assignee: Fusion Optix, Inc., Woburn, MA (US)

(*) Notice: Subject to any disclaimer, the term of this patent is extended or adjusted under 35 U.S.C. 154(b) by 0 days.

(21) Appl. No.: 13/163,938

(22) Filed: Jun. 20, 2011

(65) Prior Publication Data

US 2011/0286222 A1    Nov. 24, 2011

Related U.S. Application Data

(63) Continuation of application No. 12/209,709, filed on Sep. 12, 2008, now Pat. No. 7,991,257, which is a continuation-in-part of application No. 12/122,661, filed on May 16, 2008, now abandoned.

(60) Provisional application No. 60/872,446, filed on May 16, 2007.

(51) Int. Cl.
| | |
|---|---|
| G02B 6/10 | (2006.01) |
| G02B 6/00 | (2006.01) |
| G09F 13/04 | (2006.01) |
| G02F 1/1333 | (2006.01) |
| B29D 11/00 | (2006.01) |
| F21V 5/00 | (2006.01) |

(52) U.S. Cl. ........ 385/129; 385/130; 385/131; 385/141; 385/36; 385/33; 362/97.1; 362/97.2; 362/326; 349/56; 349/57; 349/58; 349/61; 264/1.24; 264/1.27; 264/1.34; 264/1.7; 156/219

(58) Field of Classification Search .............. 385/14, 385/33, 129, 130, 131, 132, 146, 143, 145, 385/36, 901; 264/1.24, 1.26, 1.27, 1.29, 264/1.32, 1.34, 1.7, 1.8, 2.1, 21, 405, 464, 264/466, 480, 494; 362/97.1, 97.2, 97.4, 362/326; 349/56, 57, 58, 61, 187; 156/219
See application file for complete search history.

(56) References Cited

U.S. PATENT DOCUMENTS

| | | | | |
|---|---|---|---|---|
| 5,971,559 A | * | 10/1999 | Ishikawa et al. | 362/625 |
| 6,123,431 A | * | 9/2000 | Teragaki et al. | 362/625 |
| 6,712,481 B2 | * | 3/2004 | Parker et al. | 362/619 |
| 6,814,901 B2 | * | 11/2004 | Itoh | 264/1.38 |
| 7,507,012 B2 | * | 3/2009 | Aylward et al. | 362/625 |
| 7,991,257 B1 | * | 8/2011 | Coleman | 385/129 |
| 2004/0120667 A1 | * | 6/2004 | Aylward et al. | 385/115 |
| 2008/0285307 A1 | * | 11/2008 | Aylward et al. | 362/618 |
| 2011/0286222 A1 | * | 11/2011 | Coleman | 362/326 |

* cited by examiner

*Primary Examiner* — Brian Healy

(57) ABSTRACT

Embodiments of this invention include composite articles having specific optical properties. In one embodiment of this invention, a composite comprises high and low refractive index light transmitting material and surface relief features. In further embodiments, the composite comprises volumetric dispersed phase domains that may be asymmetric in shape. In one embodiment of this invention, the composite is an optical film providing light collimating features along two orthogonal planes perpendicular to the surface of the film. In another embodiment, the composite has improved optical, thermal, mechanical, or environmental properties. In further embodiments of this invention, the composite is manufactured by optically coupling or extruding two or more light transmitting materials, and forming inverted light collimating surface relief features or light collimating surface relief features. In further embodiments of this invention, a method of manufacturing a composite comprises forming one or more surface relief features on a component and injection molding or otherwise optically coupling two or more materials to the component. In one or more embodiments of this invention a light source is optically coupled to the composite or used in a light emitting device.

26 Claims, 25 Drawing Sheets

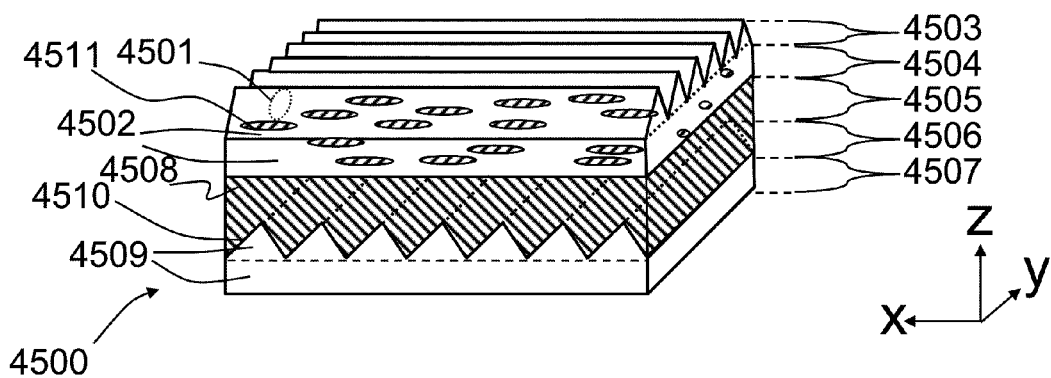
FIG. 45
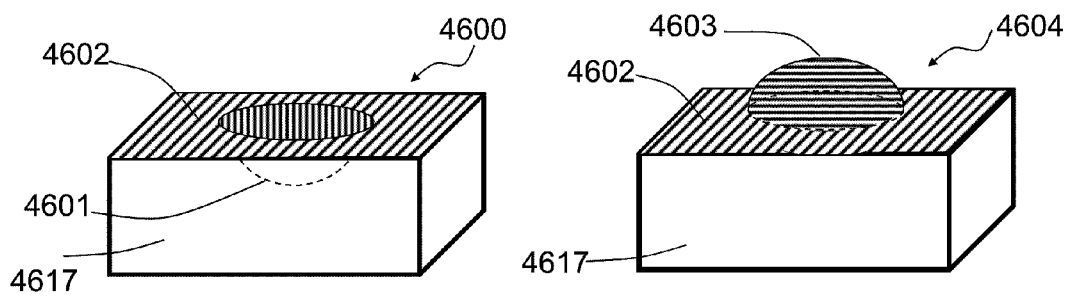
FIG. 46A  FIG 46B
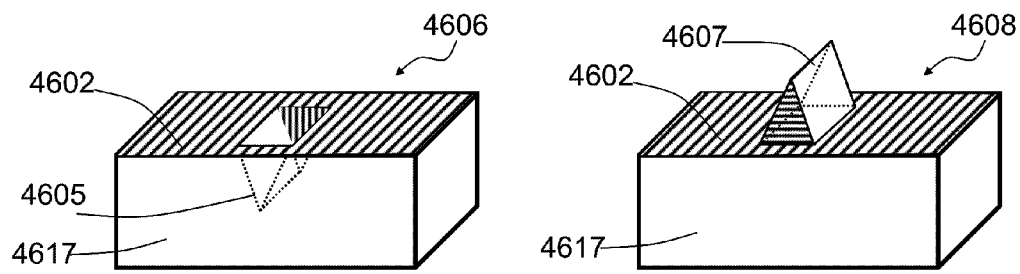
FIG. 46C  FIG 46D

METHOD OF MANUFACTURING AN OPTICAL COMPOSITE

RELATED APPLICATIONS

This is a continuation of U.S. application Ser. No. 12/209,709, filed Sep. 12, 2008, now U.S. Pat. No. 7,991,257, itself a continuation-in-part of application Ser. No. 12/122,661, filed May 16, 2008, now ABANDONED, which claims the benefit of U.S. Provisional Application No. 60/872,446, filed May 16, 2007, the entire contents of all incorporated herein by reference.

FIELD OF THE INVENTION

The invention generally relates to optical composites articles and methods for manufacturing optical composite articles and light emitting devices incorporating them.

BACKGROUND

Lenses, films, and optical elements for lighting fixtures and other optical systems and components typically provide one or more of the following functions: protection of the light source or other components in the system from external objects such as dust, moisture, accidental contact, etc.; redirection of light such as collimating, converging, diverging and angular or spatial light re-distribution; provide structural rigidity or support for one or more optical components or the system; improve spatial luminance or color uniformity; improve aesthetic appearance; provide other optical effects including absorbing, fluorescing, phosphorescing, filtering, reflecting, de-pixelization, angular or spatial separation or re-distribution of light of one or more wavelength or polarization states; speckle contrast reduction; convey or illustrate information; illuminate a component, system or environment; internal, external or ambient light absorption or re-direction; contrast enhancement; thermal conduction or insulation from the environment or one or more parts of the system; and other modifications of the properties of the electromagnetic waves emitted from the component or system. In addition, other desirable properties related to the component include low cost of manufacture, low cost to install or assemble with high yields, easy to handle, clean, install, or repair.

Typically one or more of the desired or preferred functionalities described above can not be achieved by a single process of casting, extruding, or molding operation. For example, in order to achieve one form of anisotropic diffuser or polarization sensitive optical composite or scattering element, a film is oriented or stretched along one or two axes. These processing requirements typically prohibit the film being greater than approximately 200 µm in thickness due to the typical extrusion equipment and process limitations related to achieving the asymmetry. In some applications an optical component is desired to have specific mechanical, environment, or other optical property that can not be readily achieved with a 200 µm film. These are typical produced in sheet extrusion process in which performing processes such as stretching or orientation is difficult or prohibited.

SUMMARY

Embodiments of this invention include a method of manufacturing an article including providing a light source with a first light emitting surface and a volumetric anisotropic light scattering diffusion film, positioning them in a mold at a predetermined location and orientation and injecting a light transmitting thermoplastic material or liquid polymer precursor material into the mold such that the diffusing film is optically coupled to the light transmitting material. Further embodiments include the aforementioned method wherein the light source is optically coupled to the light transmitting material. In further embodiments of this invention, the method includes orientating the anisotropic light scattering diffuser film in the mold such that longer dimension of the asymmetric domains is oriented substantially parallel to the optical axis of the light source.

In other embodiments of this invention, the method of manufacturing an article includes providing a light source with a first light emitting surface, a mold with light extraction features, two volumetric anisotropic light scattering diffusion films, positioning the light source and films in the mold at predetermined locations and orientations and injecting a light transmitting thermoplastic material or liquid polymer precursor material into the mold such that the diffusing film and light source are optically coupled to the light transmitting material.

Other embodiments of this invention include the method of manufacturing an article comprising: providing a first light transmitting material of refractive index $n_{L1x}$ in a first axis x; extruding the first light transmitting material into a first film comprising a first surface and a second surface; embossing the first surface of the first film to achieve a first plurality of inverted light collimating surface features on the first surface; extruding a second light transmitting material of refractive index $n_{H2x}$ in the first axis x onto the first surface of the first film forming a substantially planar third surface; extruding a third light transmitting material of refractive index $n_{H3x}$ in the first axis x onto the second surface of the first film; and embossing the third light transmitting material to achieve a fourth surface comprising plurality of light collimating surface features.

BRIEF DESCRIPTION OF THE DRAWINGS

FIG. 45 is a perspective view of one embodiment of this invention of a composite comprising concave prismatic inverted light collimating surface features, asymmetrically shaped dispersed phase domains, and convex prismatic light collimating surface features FIG. 46A is a perspective view of a concave inverted light collimating surface feature of a composite of one embodiment of this invention.

FIG. 46B is a perspective view of a convex light collimating surface feature corresponding to the inverse of FIG. 46A.

FIG. 46C is a perspective view of a prismatic inverted light collimating surface feature of one embodiment of this invention.

FIG. 46D is a perspective view of a convex prismatic light collimating surface feature corresponding to the inverse of FIG. 46C.

DETAILED DESCRIPTION

Figure 1:
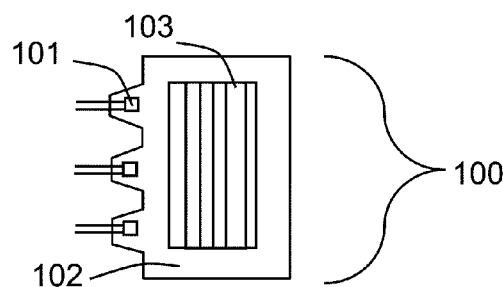
FIG. 1 is top view of a prior art edge-lit injection molded article.

The features and other details of particular embodiments of the invention will now be more particularly described. It will be understood that particular embodiments described herein are shown by way of illustration and not as limitations of the invention. The illustrations are not drawn to scale in order to illustrate particular features and properties. The principal features of this invention can be employed in various embodiments without departing from the scope of the invention. All parts and percentages are by weight unless otherwise specified.

Definitions

For convenience, certain terms used in the specification and examples are collected here.

"Diffuse" and "diffusing" as defined herein includes light scattering or diffusion by reflection, refraction or diffraction from particles, surfaces, or layers or regions.

"Diffuser Plate" and "Diffuser Film" and "Diffuser" are referred to herein as optical elements that provide a scattering or diffusion property to one or more light rays. The change in angle of a light ray may be due to refraction, internal forward and backward scattering, or diffraction. As suggested here a diffuser plate (or film) may be thin and may incorporate many layers or regions providing different properties. A diffuser plate may incorporate other features or materials in the volume or on one or more surfaces that impart a desired optical, thermal, mechanical, electrical, or environmental performance.

"Optically coupled" is defined herein as type of physically coupling condition wherein two regions or layers are coupled such that the intensity of light passing from one region to the other is not substantial reduced by Fresnel interfacial reflection losses due to an air gap region between the two materials. "Optical coupling" and "coupling optically" methods include methods of coupling wherein the two regions coupled together have similar refractive indices or using an optical adhesive with a refractive index substantially near or in-between the regions or layers. Examples of "Optical coupling" include lamination using an index-matched optical adhesive, coating a region or layer onto another region or layer, or hot lamination using applied pressure to join two or more layers or regions. Thermal transfer and injection molding or extrusion lamination are other methods that can be used to optically couple two regions of material.

"Anisotropic ratio" as defined herein refers to the ratio between the full angular width at half maximum intensity of light in a first output plane of a diffuser film and the full angular width at half maximum intensity of light in a second output plane orthogonal to the first output plane of a diffuser film when illuminated with substantially collimated light such as that from a laser. For example, the Anisotropic Ratio can be measured by looking at the FWHM of the intensity profiles in the machine direction plane and transverse direction plane of a diffuser film manufactured by film or sheet extrusion. The orthogonal planes for the anisotropic ratio may be referenced to other components, axes, or planes in a system.

"See through" as defined herein refers to the phenomenon that can be described differently depending on the context. When one refers to scattering or diffusion in a diffractive sense, one can speak of diffraction orders, although for traditional symmetric and asymmetric diffusive mediums the non-zero diffractive orders do not have well-defined angular ranges. However, one can refer to the un-deviated light as the zero order when passing through a diffuser. One may refer to "see through" as the zeroth ordered light that is un-scattered or un-diffracted after passing through a diffusing medium. A perfectly clear film will be referred to as having significant see-through and a hazy film will be referred to as having little or no see-through. See through is also commonly referred to as specular transmission.

"Clarity" is defined as the ratio of the amount of unscattered light to transmitted light expressed as a percentage using a ring sensor at the exit port of a haze meter as defined by ASTM D1003 standard and BYK documentation referring to Transmission, Haze, and Clarity definitions. The relation between the amount of unscattered light (IC−IR) and transmitted light (IC+IR) is expressed in percentage or $$\text{Clarity} = 100\% \cdot \frac{(IC - IR)}{(IC + IR)}$$

where the light intensity in the inner ring is IC and the intensity of the light in the outer ring sensor is IR. Clarity generally refers to the amount of low-angle scattered light. It is used here as one metric to quantify "see through." The Clarity measurement effectively describes how well very-fine details can be seen through the optical element. The see-through quality is determined in an angle range smaller than 2.5 degrees and the measurement of clarity depends on the distance between sample and observed object.

A "spheroidal" or "symmetric" domain or particle includes those substantially resembling a sphere. A spheroidal particle may contain surface incongruities and irregularities but has a generally circular cross-section in substantially all directions. A spheroid is a type of ellipsoid wherein two of the 3 axes are equal. An "asymmetric" particle is referred to here as an "ellipsoidal" particle wherein each of the three axes can be a different length. Ellipsoidal particles can range in shapes from squashed or stretched spheres to very long filament-like shapes.

"Planarized," "Planarization," and "Planar," includes creating a substantially flat surface on an element. A flat surface refers to one that does not have a substantially varying surface normal angle across a surface of the element. More than one surface may be planarized. As typically used herein, a material region is combined with a surface of an element that has a surface structure such that the surface of the material opposite the element is substantially planar. Typically, planarized films or components can be easily laminated to another element using pressure sensitive adhesives or hot-lamination without trapping air bubbles of sufficient size to affect the optical performance of the combined element. Extrusion of a first material onto a second embossed material can accomplish planarization of the resulting outer surface. Coatings, such as thin coatings used in some anti-reflection coatings can be applied more uniformly to planarized elements.

"Polarizer," as defined herein, includes absorbing or reflecting polarizers. These include dichroic, dye, and iodine based polarizers and multilayer or multi-domain reflective polarizers, such as DBEF from 3M. Linear or circular polarizers are also included.

"Polarization-sensitive" and "polarization-dependent" as referred to herein refer to materials, effects, or properties that may vary depending on the polarization state of the incident electromagnetic radiation. "Polarization-insensitive" and "non-polarization-dependent" and "polarization independent" refer to herein to materials, effects, or properties that are substantially independent of the polarization state of the incident electromagnetic radiation.

"Prismatic" or "Prismatic sheet" or "Prismatic structure" is defined herein as a surface relief structure that refracts or reflects light toward a desired direction. This refraction and reflection can provide collimating properties to light passing through the film. The structure can include arrays of elongated prism structures, micro-lens structures, and other surface relief structures. These features can be defined by a cross-sectional profile, surface roughness, or by other surface characterization means.

"Collimating region," "Collimating Film" and "Collimating structures" are defined here as films or structures wherein more of the light rays exiting the film or structures are directed more toward the surface normal of the component, film or substrate plane in the case of structures on a substrate. Collimation properties can be achieved by refractive structures, such as prisms, cones, microlenses, pyramids, hemispherical structures or linear, circular, random, regular, semirandom, or planar arrays of the aforementioned structures.

"Lightguide" and "waveguide" are defined here as light transmitting regions wherein the optical properties of the materials support multiple total internal reflections from interfacial boundaries.

Used herein, "particles" and "domains" refer to individual regions of one or more materials that are distinctly different than their surroundings. They include organic particles, inorganic particles, dispersed domains, dispersed phase domains and dispersed particles. They are not limited in shape and include fibrous, spherical, ellipsoidal, amoeba-like, or plate-like in shape. Domains may also include multi-component materials such as core-shell particles or coated particles. In one embodiment of this invention, a compatibilizer or other material miscible in the continuous phase material and dispersed phase domain material is substantially disposed between the continuous and dispersed phase material.

The term "polymer" will be understood to include polymers, copolymers (e.g. polymers using two or more different monomers), oligomers and combinations thereof, as well as polymers, oligomers, or copolymers that are useful to form the interpenetrating polymer network ("IPN") or semi-interpenetrating polymer network ("semi-IPN"). The term IPN refers to a broad class of polymer blends in which one polymer is mixed or polymerized in the presence of another polymer or monomer mixture. The polymers can form a variety of molecular phases consisting of co-crosslinked phases, thermoplastic (crystalline phases), mechanically cross-linked phases, e.g. by means of chain entanglement or co-crosslinked networks in which the two different polymer phases have chemical crosslinking between the polymer phases. The term semi-IPN, refers specifically to a blended polymer network where only one component of the polymer mixture is covalently crosslinked to itself. The term co-crosslinked IPN, or co-crosslinked semi-IPN, refers to the special case where both polymer networks can react in such a manner to form a co-crosslinked polymer blend. Specific descriptions can be found in such references as *IPNs Around the World-Science and Engineering*, by Kim and Sperling Eds, Wiley Science, 1997 Chapter 1.

Optical Composite

In one embodiment of this invention, a composite is an optical composite capable of performing an optical function. In one embodiment of this invention, a composite comprises a first light transmitting material, a second light transmitting material and a third light transmitting material, an inverted light collimating surface feature and a light collimating surface feature. In another embodiment of this invention, the first light transmitting material has inverted light collimating surface features. In a further embodiment, the second light transmitting material is optically coupled to the first light transmitting material and substantially planarizes the inverted light collimating surface features. In a further embodiment, the third light transmitting material is optically coupled to the first light transmitting material and is formed with light collimating surface features. One or more of the light transmitting materials may be a volumetric light scattering region and may comprise light scattering domains comprising a light transmitting material dispersed with a region of the material. The shape of the domains may be substantially spherical and the volumetric light scattering may be substantially isotropic. The shape of the domains may also be ellipsoidal and the volumetric light scattering may be substantially anisotropic. In another embodiment of this invention, the composite comprises a fourth light transmitting material optically coupled to the third light transmitting material and formed such that the resulting surface is substantially planar. In a further embodiment, the composite comprises a fifth light transmitting material optically coupled the fourth light transmitting material. In a further embodiment, a surface of the fifth light transmitting material has a plurality of light collimating surface features.

In one embodiment of this invention, the light collimating surface features are formed in a material with a high refractive index and the inverted light collimating surface features are formed in a low refractive index material. In one embodiment of this invention, inverted light collimating features made of a first material of a low refractive index are optically coupled to a conformal second material of a high refractive index such that light passing through the interface between the first and second materials from the high refractive index material is more collimated in the low refractive index material. In a further embodiment of this invention, the composite comprises a surface with light redirecting surface features such as light collimating surface features or light extracting surface features.

In one embodiment of this invention, a composite comprises a waveguide or lightguide formed from light totally internally reflecting from a surface of one or more of the light transmitting materials, second light transmitting material, light diffusing film, light redirecting optical film, or other optical component optically coupled to the light transmitting material.

In one embodiment, the composite comprises light scattering region on opposite sides of a substantially non-scattering region. In a typical lightguide, a portion of the light traveling along the lightguide is totally internally reflected from the waveguide-air interface. In one embodiment, at least one additional lightguide is created when a component has an anisotropic light scattering region on one or both sides of the non-scattering region. A portion of the light incident on the light scattering region may scatter, reflect, or diffract off of one or more disperse phase domain-matrix interfaces and continue to travel along the lightguide. A portion of the light that passes through the light scattering region will be scattered out of the lightguide and a second portion of the light will totally internally reflect off of the matrix-air interface. In this embodiment, the matrix-air interface forms an outer waveguide and the two substantially parallel light scattering regions form an inner lightguide. In one embodiment of this invention, each light scattering region forms a lightguide with each surface. The anisotropic light scattering regions may be oriented orthogonally to each other. The light scattering regions may be polarization dependent, polarization independent, wavelength dependent, or a spatially varying combination thereof and the non-scattering regions may be birefringent, tri-refringent, substantially isotropic, or a spatially varying combination thereof.

In a further embodiment of this invention polarization sensitive optical films are insert-molded or extrusion laminated on one on or more sides of a lightguide to provide increased optical efficiency through polarization recycling. These films may be specularly reflecting or provide anisotropic scattering that is polarization sensitive. In a further embodiment of this invention, the optical composite comprises at least one polarization sensitive light homogenizer to provide improved spatial luminance uniformity, light recycling efficiency for a pre-determined polarization state or improved angular redirection of light.

In a further embodiment of this invention, the composite comprises an anisotropic light scattering region and a surface relief structure formed within the volume of the substantially non-scattering region. The surface relief structure can provide additional light redirection, collimation, extraction, diffusion, recycling or other desired optical functionality such as those commonly used with backlights for LCD's. In one embodiment of this invention, the surface relief structure is an inverted light collimating surface relief structure. The surface relief structure may be located on more than one surface of the composite. In one embodiment, the surface relief profile is machined into the tool of the mold used in the insert molding process. In a further embodiment a casting roll is milled to provide the desired surface structure on one side of the composite with an optical film extrusion laminated to the opposite side.

In a further embodiment of this invention, an enhanced optical composite comprises an anisotropic light scattering region, a substantially non-scattering region and an optically coupled light emitting source such as an LED. In one embodiment of this invention, one or more LED's or arrays of LED's are insert molded along with an anisotropic light scattering region to form a light emitting optical composite. In one embodiment, the anisotropic light scattering region forms a secondary lightguide to provide increased luminance uniformity. Other methods for combining light sources to a lightguide are described in US patent application publication No. 20060262567 (Parker) the entirety of which is incorporated herein by reference.

In a further embodiment, the anisotropic light scattering region contains asymmetrically shaped domains oriented substantially parallel or perpendicular to a linear array of LEDs or an array of linear fluorescent bulbs. By transferring the total internal reflection interface to an interface located at a distance further from the light source, the lightguide created by the scattering region and the TIR surface will improve the spatial luminance uniformity.

In one embodiment of this invention, the optical composite comprises more than one anisotropic light scattering region. In some embodiments, the regions are located on both or either surface of a non-scattering region or substrate. Three anisotropic diffusing layers may also be used and they may be separated by substantially non-diffusing regions; the axes of the diffusing layers may be parallel, orthogonal or at an angle phi with respect to each other. The optical composite may include additional layers or elements to provide collimating properties or other optical, thermal, mechanical, electrical, and environmental properties discussed herein. One or more regions of the optical composite may not be optically coupled to a substrate or other component of the optical composite. In one embodiment of this invention, an optical composite comprises the combination of layers or materials that are substantially free-standing though physically coupled in at least one region. In another embodiment of this invention, the layers or materials of an optical composite in a light emitting device are physically coupled in a region outside of the volume within the light emitting device enclosure defined by the light emitting surface and a direction substantially perpendicular to the light emitting surface.

In one embodiment of this invention, a light emitting device comprises an optical composite and a light emitting source where in the optical composite comprises a substantially non-scattering region of a first thickness, d1, and at least one anisotropic light scattering region of a second thickness, d2, optically coupled to the non-scattering region wherein a portion of the light from the light emitting source is anisotropically scattered from the anisotropic light scattering region, passes through the non-scattering region and totally internally reflects from the air-non-scattering region interface such that upon scattering from the light scattering region upon the second pass it is scattered to an angle that is less than the critical angle of the air-non-scattering region interface, escapes the composite and the spatial luminance uniformity is greater than 70%. In a further embodiment, d1 is greater than d2 or d1>2*d2 or d1>4*d2 or d1>6*d2. In a further embodiment, at least 5% percent of the light incident normal to the surface of the composite passes through the anisotropic light scattering region at least twice. In a further embodiment, at least 20% percent of the light incident normal to the surface of the composite passes through the anisotropic light scattering region at least twice. In a further embodiment, at least 50% percent of the light incident normal to the surface of the composite passes through the anisotropic light scattering region at least twice.

In a further embodiment of this invention, two substantially planar light scattering regions are oriented at an angle theta with respect to each other with a substantially non-scattering region optically coupled and disposed in an optical path between the two regions. In one embodiment, substantially planar anisotropic light scattering regions are oriented 90° to each other on the edge and face of a non-scattering lightguide. In a further embodiment, the thickness of at least one of the light scattering regions is less than 1 millimeter and the thickness of the substantially non-scattering region is greater than one millimeter. In a further embodiment, the thickness of at least one of the light scattering regions is less than 0.5 millimeter and the thickness of the substantially non-scattering region is greater than 0.5 millimeters. In a further embodiment, the thickness of at least one of the light scattering regions is less than 0.5 millimeter and the thickness of the substantially non-scattering region is greater than 1 millimeter. In a further embodiment the thickness of the non-scattering light region is at least twice the thickness of at least one of the light scattering regions. This allows the light scattering properties which can be better controlled through a film extrusion process to be utilized in an injection molded or thick extrusion process wherein it is difficult to achieve the desired optical properties or orientation of domains in the thicker, extruded material.

Anisotropic Light-Scattering Regions

The optical composite may include more than one anisotropic light-scattering region or layers. In one embodiment of this invention, a light emitting device comprises a optical composite with a first input surface disposed to receive light and an first output surface disposed to output light wherein the optical composite collimates the light within a first plane and the light emitting device further comprises a light scattering element such as an anisotropic light scattering element disposed in the optical path after the first light output surface with a larger angular FWHM diffusion profile in the first plane than in a second plane orthogonal to the first. The anisotropic diffuser can be provided with a range of angles to provide a customizable light output profile. In one embodiment of this invention, a light emitting device with an angular FWHM of less than 10 degrees in at least one output plane and an anisotropic light scattering film are provided as a kit wherein the combination of the two provides a pre-determined light output profile.

In a further embodiment of this invention, the volumetric anisotropic light scattering diffuser region has an anisotropy ratio, AR, defined by the ratio of the first angular width at half maximum diffusion intensity in a first output plane of $FWHM_1$ and a second angular width at half maximum diffusion intensity in a second output plane perpendicular to the first output plane of $FWHM_2$ such that AR>2, or preferably AR>5, or more preferably AR>10. In one embodiment of this invention, a light emitting device comprises a composite comprising a volumetric anisotropic light scattering region wherein AR>2, and the angular FWHM output of light from the light emitting device is less than 60 degrees in a first output plane.

One or more of the diffusing (scattering) regions may have an asymmetric diffusion profile in the forward (transmission) or backward (reflection) directions. The optical composite may contain volumetric and surface-relief-based scattering regions that may be asymmetric or symmetric. The scattering regions or layers may be optically coupled or separated by another material or an air gap. In one embodiment of this invention, substantially transparent material separates two diffusing regions. In another embodiment of this invention, the asymmetrically diffusive regions are aligned such that the luminance uniformity of a light emitting device is improved. In another embodiment, the spatial luminance profile of a light emitting device using a linear or grid array of light sources is made substantially uniform through the use of one or more asymmetrically diffusing regions or the optical composite of one embodiment of this invention.

The use of a volumetric anisotropic light scattering region in the light emitting device comprising an optical composite allows the scattering region to be optically coupled to the lightguide such that it will still support waveguide conditions. An anisotropic surface relief scattering region on the surface of the lightguide or a surface of a component optically coupled to the lightguide will substantially scatter light in that region out of the lightguide, thus not permitting spatially uniform out-coupling in the case of scattering over a significant portion of the lightguide surface. Additionally, anisotropic scattering surface relief structures are difficult to manufacture in large sizes due to complex holographic recording techniques required.

In one embodiment of this invention, the optical composite comprises an anisotropic light scattering region wherein asymmetrically shaped dispersed phase domains of one polymer within another matrix polymer contribute to the anisotropic light scattering. The anisotropic scattering region may be non-polarization dependent anisotropic light scattering (NPDALS) or polarization dependent anisotropic light scattering (PDALS). In one embodiment of this invention, a light emitting device comprises a polarization dependent optical component such as those described in U.S. Pat. No. 6,297,906, the contents of which are incorporated herein by reference. Light emitting devices such as light fixtures with polarized light output can reduce the glare off of surfaces.

The amount of diffusion in the x-z and y-z planes for the NPDALS or PDALS regions affects the luminance uniformity and the angular light output profiles of the light emitting device. By increasing the amount of diffusion in one plane preferentially over that in the other plane, the angular light output from the light emitting device is asymmetrically increased. For example, with more diffusion in the x-z plane than the y-z plane, the angular light output (measured in the FWHM of the intensity profile) is increased in the x-z plane. The diffusion asymmetry introduced through one or more of the anisotropic light-scattering regions of the optical composite can allow for greater control over the viewing angle, color shift, color uniformity, luminance uniformity, and angular intensity profile of the light emitting device and the optical efficiency of the light emitting device. In another embodiment, the amount of diffusion (measured as FWHM of the angular intensity profile) varies in the plane of the diffusing layer. In another embodiment, the amount of diffusion varies in the plane perpendicular to the plane of the layer (z direction). In another embodiment of this invention, the amount of diffusion is higher in the regions in close proximity of one or more of the light sources.

The birefringence of one or more of the substrates, elements or dispersed phase domains may be greater than 0.1 such that a significant amount of polarization selectivity occurs due to the difference in the critical angle for different polarization states when this optically anisotropic material is optically coupled to or forms part of the lightguide. An example of this polarization selectivity is found in U.S. Pat. No. 6,795,244, the contents are incorporated herein by reference.

In one embodiment of this invention, a method for manufacturing a composite comprises the process of extrusion lamination, injection molding, or other secondary process wherein at least one material comprises dispersed phase domains. These domains may be asymmetrically shaped, symmetrically shaped, oriented along at least one axis. In one embodiment, these domains comprise at least one of an immiscible polymer, cross-linked particles, glass microspheres, hollow glass microspheres, polymer fibers, inorganic fibers, glass fibers, dispersed polymer beads, particles, core-shell particles, and other materials and additives known to be usable in optical components. In one embodiment of this invention, the optical composite comprises polymer photonic crystal fiber (PCF) such as disclosed in US Patent Application Publication No. 20060194046A1, the entirety of the application is incorporated herein by reference. An optical composite or light emitting device comprising a PCF based composite can provide increased luminance through polarization recycling. In another embodiment of this invention, the optical composite includes fibers comprising co-continuous phases such as disclosed in US Patent Application Publication No. 20060193593, the entirety of the application is incorporated herein by reference. An optical composite or light emitting device comprising a co-continuous phase based composite can provide increased luminance through polarization recycling. In one embodiment of this invention, the optical composite comprises composite polymer fibers such as those disclosed in US Patent Application Publication No. 20060193582, the entirety of the application is incorporated herein by reference. An optical composite or light emitting device comprising a polymer fiber based composite can provide increased luminance through polarization recycling or increased flexural modulus. In a further embodiment of this invention, the optical composite comprises inorganic fibers such as those disclosed in US Patent Application Publication No. 20060257679 the entirety of the application is incorporated herein by reference. An optical composite or light emitting device comprising an inorganic fiber based composite can provide increased luminance through polarization recycling or increased flexural modulus. In a further embodiment, the optical composite comprises a polymer weave such as described in US Patent Application Publication No. 20060194487, the entirety of the application is incorporated herein by reference. An optical composite or light emitting device comprising a polymer weave based composite can provide increased luminance through polarization recycling or increased flexural modulus.

Alignment of Major Diffusing Axis in Anisotropic Light Scattering Region

The alignment of the major axis of diffusion in one or more of the anisotropic light-scattering regions may be aligned parallel, perpendicular or at an angle $\theta_3$ with respect to a light source axis, LED array, or edge of the waveguide. In one embodiment, the axis of stronger diffusion (larger FWHM) is aligned perpendicular to the length of a linear light source in a cold-cathode fluorescent edge-lit light emitting device. In another embodiment of this invention, the axis of stronger diffusion is aligned perpendicular to the length of a linear array of LED illuminating the edge of waveguide in an edge-lit LED based light emitting device.

Domain Shape

The domains within one or more light scattering regions may be fibrous, spherical, ellipsoidal, cylindrical, other non-symmetric shape, or a combination of one or more of these shapes. The shape of the domains may be engineered or incorporated in the composite such that substantially more diffusion occurs in the x-z plane than that in the y-z plane. The shape of the domains or domains may vary spatially along one or more of the x, y, or z directions. The variation may be regular, semi-random, or random.

In one embodiment of this invention, the light transmitting material comprises substantially spherical light scattering domains. In one embodiment, the substantially spherical light scattering domains along with a tapered light transmitting material function together by scattering and reflecting incident light from an edge of the light transmitting material to create a substantially uniform spatial luminance along the first output surface in a direction perpendicular to the light source array axis.

In a further embodiment of this invention, the volumetric anisotropic light scattering diffuser region has a domain asymmetry ratio, DAR, defined by the ratio of the first average domain dimensional length in a first plane of $L_1$ to a second average dimensional length in a plane perpendicular to the first plane of $L_2$ where DAR>2, or preferably DAR>5 or more preferably DAR>10. In this embodiment, the scattering in the output surface plane is minimized by having a high DAR ratio such that the output coupling can be controlled by the light extraction features.

Domain Alignment

The domains within a diffusing layer may be aligned at an angle normal, parallel, or an angle $\theta$ with respect to an output surface, a light emitting device viewing plane, a layer interface, an edge of the diffusing layer or a linear light source or array of light sources. In one embodiment, the domains in a diffusing region are substantially aligned along one axis that is perpendicular to a linear array of light sources. In one embodiment of this invention $\theta$ is 0 degrees, 45 degrees, 90 degrees or an angle between 0 and 90 degrees.

A further embodiment of this invention includes aligning the volumetric asymmetric light scattering region or composite comprising the volumetric asymmetric light scattering region with the asymmetric domains aligned with their longer dimension substantially perpendicular to the first light source array axis.

Domain Location

The domains may be contained within the volume of a light transmitting material, a continuous-phase material or they may be protruding (or directly beneath a partially conformable protrusion) from the surface of the continuous-phase material.

Domain Concentration

The domains described herein in one or more light-diffusing regions may be in a low or high concentration. When the diffusion layer is thick, a lower concentration of domains is needed for an equivalent amount of diffusion for uniformity. When the light-diffusing layer is thin, a higher concentration of domains or a greater difference in refractive index is needed for a high amount of scattering. The concentration of the dispersed domains may be from less than 1% by weight to 50% by weight. In certain conditions, a concentration of domains higher than 50% by volume may be achieved by careful selection of materials and manufacturing techniques. A higher concentration permits a thinner diffusive layer and as a result, a thinner light emitting device or light recycling directional control element. The concentration may also vary spatially along one or more of the x, y, or z directions. In one embodiment of this invention, the number of domains in a first direction varies in a second direction perpendicular to the first. In one embodiment of this invention a composite comprises light scattering domains wherein the number of domains in a first direction in the plane of a cross-section of the composite varies in a second direction perpendicular to the first direction within the plane of the cross-section. In a further embodiment of this invention, the variation of domain concentration, location or number of domains may be regular, semi-random, or random. In one embodiment of this invention, the phases of the light transmitting material are co-continuous or a type of IPN.

Index of Refraction

The index of refraction of one or more light transmitting materials in the composite may be low, medium, or high in one or more of the x, y, or z directions. High refractive index materials are typically those with the refractive index above 1.56 in the x, y, or z direction. Low refractive index materials are those with the refractive index below 1.47 in the x, y, or z direction. In one embodiment of this invention, the refractive index in the x direction, $n_{L1x}$, of the first light transmitting material is less than 1.47. In another embodiment of this invention, the refractive index of the second light transmitting material in the x direction, $n_{H2x}$, is larger than 1.56. In one embodiment of this invention, the refractive index in the x direction, $n_{H3x}$, of the third light transmitting material greater than 1.56.

The difference in refractive index between the domains and the matrix in one or more of the non-polarization dependent light scattering region, polarization dependent light scattering region, symmetrically scattering region, asymmetric or anisotropically scattering region, or other light scattering regions may be very small or large in one or more of the x, y, or z directions. If the refractive index difference is small, then a higher concentration of domains may be required to achieve sufficient diffusion in one or more directions. If the refractive index difference is large, then fewer domains (lower concentration) are typically required to achieve sufficient diffusion and luminance uniformity. The difference in refractive index between the domains and the matrix may be zero or larger than zero in one or more of the x, y, or z directions.

The refractive index of the individual polymeric domains is one factor that contributes to the degree of light scattering by the optical composite. Combinations of low- and high-refractive-index materials result in larger diffusion angles. In cases where birefringent materials are used, the refractive indexes in the x, y, and z directions can each affect the amount of diffusion or reflection for a particular polarization state in the material. In some applications, one may use specific polymers for specific qualities such as thermal, mechanical, or low-cost, however, the refractive index difference between the materials (in the x, y, or z directions, or some combination thereof) may not be suitable to generate the desired amount of diffusion or other optical characteristic such as reflection. In these cases, it is known in the field to use small domains, typically less than 100 nm in size to increase or decrease the average bulk refractive index. In one embodiment, light does not directly scatter from added domains, and the addition of domains does not substantially increase the absorption or backscatter.

During production of the optical composite or one of its regions, the refractive index of the domains or the matrix or both may change along one or more axes due to crystallization, stress- or strain-induced birefringence or other molecular or polymer-chain alignment technique.

Additive materials can increase or decrease the average refractive index based on the amount of the materials and the refractive index of the polymer to which they are added, and the effective refractive index of the material. Such additives can include: aerogels, sol-gel materials, silica, kaolin, alumina, fine domains of $MgF_2$ (its index of refraction is 1.38), $SiO_2$ (its index of refraction is 1.46), $AlF_3$ (its index of refraction is 1.33-1.39), $CaF_2$ (its index of refraction is 1.44), LiF (its index of refraction is 1.36-1.37), NaF (its index of refraction is 1.32-1.34) and $ThF_4$ (its index of refraction is 1.45-1.5) or the like can be considered, as discussed in U.S. Pat. No. 6,773,801, the contents incorporated herein by reference. Alternatively, fine domains having a high index of refraction, may be used such as fine particles of titania ($TiO_2$) or zirconia ($ZrO_2$) or other metal oxides.

By substantially matching the refractive index of the optical film continuous phase material with the light transmitting material, the optical efficiency is improved due to the reflection intensity reduction from the interface. In one embodiment, the refractive index of the continuous phase material substantially matches the refractive index of the light transmitting region along at least one axis. In one embodiment, the difference between the refractive index of the optical film continuous phase material and the light transmitting material along a first axis is less than 0.05.

Low Refractive Index Region

In one embodiment of this invention, a low refractive index material is used as the first, second, third or fourth light transmitting material. In a further embodiment, a low refractive index region is disposed between two high refractive index regions. The term "low refractive index", for the purposes of the present invention, shall generally mean a material, when applied as a layer, substrate, film, coating, injection molded region, or deposition forms a region having a refractive index along the x axis of less than about 1.49, and more preferably less than about 1.47. In a further embodiment, the low refractive index in the x direction is less than one of 1.46, 1.43 or 1.4. In one embodiment of this invention, the low refractive index material comprises a fluoropolymer such as perfluoroalkoxy (PFA), a copolymer of a fluoropolymer, a polymer of tetrafluoroethylene, hexafluoropropylene and vinylidene fluoride (THV), polymethylpentene, fluorinated elastomers (FKM), perfluoro elastomers (FFKM), tetrafluoro ethylene/propylene rubbers (FEPM), an aerogel, a polymer cross-linked aerogel.

Fluoropolymer materials used in the low refractive index region may be amorphous fluoropolymers comprising interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers contemplated by this invention are, for example, VDF-chlorotrifluoroethylene copolymers. One such VDF-chlorotrifluoroethylene copolymer is commercially known as Kel-F™ 3700, available from 3M Company. As used herein, amorphous fluoropolymers are materials that contain essentially no crystallinity or possess no significant melting point as determined for example by differential scanning calorimetry (DSC). For the purpose of this discussion, a copolymer is defined as a polymeric material resulting from the simultaneous polymerization of two or more dissimilar monomers and a homopolymer is a polymeric material resulting from the polymerization of a single monomer.

In another embodiment of this invention, the fluoropolymers are homo and copolymers based on fluorinated monomers such as TFE or VDF which do contain a crystalline melting point such as polyvinylidene fluoride (PVDF, available commercially from 3M company as Dyneon™ PVDF) or thermoplastic copolymers of TFE such as those based on the crystalline microstructure of TFE-HFP-VDF. Examples of such polymers are those available from 3M under the trade name Dyneon™ Fluoroplastics THV™ 200.

Low refractive index materials suitable for use in the present invention include those which are suitable for use in applications such as anti-reflection coatings or for cladding on optical fibers. In addition, other fluoroplastic materials are also contemplated by the present invention. For example, PVDF-containing fluoroplastic materials having very low molar levels of HFP are also contemplated by the present invention and are sold under the trade name Dyneon™ PVDF 6010 or 3100, available from Dyneon LLC, of St. Paul, Minn.; and Kynar™ 740, 2800, 9301, available from Elf Atochem North America Inc. Furthermore, other fluoroplastic materials are contemplated wherein the microstructure can also contain additional non-fluorinated monomers such as ethylene, propylene, and butylene. Examples of such microstructures having non-fluorinated monomers commercially available include Dyneon™ ETFE and THE fluoroplastics.

In one embodiment of the invention, the low refractive index material comprises a fluoroelastomer composition (amorphous). One example of a commercially available elastomeric compound of this type is available from Dyneon LLC, St. Paul Minn., under the trade name Dyneon™ Fluoroelastomer FC 2145.

Additional fluoroelastomeric compositions useful in the present invention are elastomeric TFE containing terpolymers. One example of a commercially available elastomeric compound of this type is available from Dyneon LLC, St. Paul, Minn., and is sold under the trade name Dyneon™ Fluoroelastomer FT 2430. Other examples of fluoroelastomers used in an embodiment of this invention include propylene-containing fluoroelastomers, also known as base resistant elastomers ("BRE") which are commercially available from Dyneon under the trade name Dyneon™ BRE 7200, available from 3M Company of St. Paul, Minn. Other examples of TFE-propylene copolymers can also be used and are commercially available under the tradename Aflaf™, available from Asahi Glass Company of Charlotte, N.C.

Other examples of fluoropolymers and low refractive index materials may be used in a further embodiment of this invention such as those described US Patent Application Publication No.'s 20060148996, 20080158675, and 20020146555 the contents of each are incorporated by reference herein.

In one embodiment of this invention, the low refractive index region is a transparent silicone elastomer of a two-liquid RTV type (Sylgard™ 184, available from Dow Corning, Midland, Mich.) and having a refractive index of 1.430, or a silicone elastomer of a two-liquid RTV type (SE1740, available from Toray-Daw) which has a refractive index of 1.403.

In one embodiment of this invention, the low refractive index material or light transmitting material may be polymer, homopolymer, copolymer, blend or polymer alloy of PHFPO (Poly(hexafluoropropylene oxide), Hydroxypropyl cellulose, Poly(tetrafluoroethylene-co-hexafluoropropylene), FEP (Fluorinated Ethylene Propylene), Poly(pentadecafluorooctyl acrylate), Poly(tetrafluoro-3-(heptafluoropropoxy)propyl acrylate), Poly(tetrafluoro-3-(pentafluoroethoxy)propyl acrylate), PTFE [Poly(tetrafluoroethylene)], Poly(undecafluorohexyl acrylate), PFA (Perfluoroalkoxy), ETFE (Ethylene Tetrafluoroethylene), Poly(nonafluoropentyl acrylate), Poly(tetrafluoro-3-(trifluoromethoxy)propyl acrylate), Poly (pentafluorovinyl propionate), Poly(heptafluorobutyl acrylate), Poly(trifluorovinyl acetate), Poly(octafluoropentyl acrylate), Poly(methyl 3,3,3-trifluoropropyl siloxane), Poly (pentafluoropropyl acrylate), Poly(2-heptafluorobutoxy) ethyl acrylate), PCTFE (Poly(chlorotrifluoroethylene)), Poly (2,2,3,4,4-hexafluorobutyl acrylate), Poly(methyl hydro siloxane), Poly(dimethyl siloxane), Poly(trifluoroethyl acrylate), Poly (2-(1,1,2,2-tetrafluoroethoxy)ethyl acrylate), Poly (trifluoroisopropyl methacrylate), Poly(2,2,2-trifluoro-1-methylethyl methacrylate), Poly(2-trifluoroethoxyethyl acrylate), PVDF (Poly(vinylidene fluoride)), ECTFE (Ethylene Chlorotrifluorotheylene), Poly(trifluoroethyl methacrylate), Poly(methyl octadecyl siloxane), Poly(methyl hexyl siloxane), Poly(methyl octyl siloxane), Poly(isobutyl methacrylate), Poly(vinyl isobutyl ether), Poly(methyl hexadecyl siloxane), PEO (Poly(ethylene oxide)), PPDX (Poly(propylene oxide), Poly(3-butoxypropylene oxide), Poly(3-hexoxypropylene oxide), Poly(ethylene glycol), Poly(vinyl n-pentyl ether), Poly(vinyl n-hexyl ether), Poly(4-fluoro-2-trifluoromethylstyrene), Poly(vinyl octyl ether), Poly(vinyl n-octyl acrylate), Poly(vinyl 2-ethylhexyl ether), Poly(vinyl n-decyl ether), Poly(2-methoxyethyl acrylate), Poly(acryloxypropyl methyl siloxane), PMP Poly(4-methyl-1-pentene), Poly(3-methoxypropylene oxide, Poly(t-butyl methacrylate), Poly(vinyl n-dodecyl ether), Poly(3-ethoxypropyl acrylate), Poly(vinyl propionate), Poly(vinyl acetate), Poly(vinyl propionate), Poly(vinyl methyl ether), Poly(ethyl acrylate), Poly (vinyl methyl ether)(isotactic), Poly(3-methoxypropyl acrylate), Poly(1-octadecene), Poly(2-ethoxyethyl acrylate), Poly (isopropyl acrylate), Poly(1-decene), Poly(propylene)(atactic), Poly(lauryl methacrylate), Poly(vinyl sec-butyl ether) (isotactic), Poly(n-butyl acrylate), Poly(dodecyl methacrylate), Poly(ethylene succinate), Poly(tetradecyl methacrylate), Poly(hexadecyl methacrylate), Cellulose acetate butyrate, Cellulose acetate, Poly(vinyl formate), Ethylene/vinyl acetate copolymer-40% vinyl acetate, Poly(2-fluoroethyl methacrylate), Poly(octyl methyl silane), Ethyl cellulose, Poly(methyl acrylate), Poly(dicyanopropyl siloxane), Poly(oxymethylene), Poly(sec-butyl methacrylate), Poly(dimethylsiloxane-co-alpha-methylstyrene), Poly(1,1,1,3,3,3-hexafluoroisopropyl acrylate), Poly(2,2,3,3,4,4,4-heptafluorobutyl acrylate), Poly(2,2,3,3,4,4,4-heptafluorobutyl methacrylate), Poly(2,2,3,3,3-pentafluoropropyl acrylate), Poly(1,1,1,3,3,3-hexafluoroisopropyl methacrylate), Poly(2,2,3,4,4,4-hexafluorobutyl acrylate), Poly(2,2,3,4,4,4-hexafluorobutyl methacrylate), Poly(2,2,3,3,3-pentafluoropropyl methacrylate), Poly(2,2,2-trifluoroethyl acrylate), Poly(2,2,3,3-tetrafluoropropyl acrylate), Poly(2,2,3,3-tetrafluoropropyl methacrylate), or Poly(2,2,2-trifluoroethyl methacrylate).

High Refractive Index Region

Light transmitting materials with a high refractive index can include thermoplastics, thermoset, or radiation cured polymers. Polycarbonate, PEN, Polystyrene, PET and other materials are known to have high refractive indexes. In one embodiment of this invention, a composite comprises a light transmitting material that is radiation curable. In one embodiment of this invention, a composite comprises a high refractive index material as disclosed in U.S. Pat. Nos. 6,107,364; 6,355,754; 6,359,170; 6,533,959; 6,541,591; 6,953,623; or U.S. Patent Application Publication No. 20060241220, the contents of each are incorporated by reference herein.

Light Scattering Region Location

The optical composite or a light emitting device comprising the optical composite may comprise one or more light scattering regions which may be anisotropic, isotropic, or substantially symmetrically scattering. The scattering region may be volumetric or surface relief based. On or more of the light scattering regions may be located within the first light transmitting material, second light transmitting material, third light transmitting material, fourth light transmitting material; within a region near light collimating features, within region near inverted light collimating features, within a substrate, near the lenticular lens structure, within the lenticular lens substrate, within the light absorbing region, within the light reflecting region, within the light transmitting region, within or adhered to the waveguide, between the optical composite and the light emitting device light output surface, between the optical composite and the waveguide or between the waveguide and one or more light emitting sources such as LED's. The light scattering region may be optically coupled to one or more elements, regions or layers of the optical composite or one or more elements of the light emitting device. In one embodiment of this invention, the light scattering material is optically coupled to one or more components of the optical composite or the light emitting device using a low refractive index adhesive or polymer. In a further embodiment of this invention, an optical composite comprises an anisotropic light scattering film optically coupled using a pressure sensitive adhesive to the apex region of a film comprising convex light collimating surface relief features such that the anisotropic light scattering film provides a substantially planar output surface that is more resistant to scratches. In a further embodiment of this invention, the contact angle between the surface relief features (such as lens arrays) and a polymer or adhesive layer is less than 20 degrees. In a further embodiment, the contact angle is less than 10 degrees. In a further embodiment, the contact angle is less than 5 degrees. In one embodiment, the loss of the refractive power at the apex of the light collimating surface relief features where the pressure sensitive adhesive effectively index matches out the interface increases the FWHM angular intensity output in a plane perpendicular to the plane of collimation for the light collimating features by less than one selected from the group of 2 degrees, 5 degrees, 10 degrees, or 20 degrees relative to the anisotropic light scattering film separated from the light collimating surface feature component by an air gap.

In a further embodiment, of this invention the anisotropic light scattering region is position such that it is substantially beneath the light emitting diode output surface relative to the light output surface. In one embodiment, the volumetric anisotropic light scattering film is disposed to receive light directly from a point on the light emitting source surface at an incidence angle in the light transmitting material of less than 20 degrees from a normal to the first light output surface. In a further embodiment, the anisotropic light scattering film is disposed to receive light directly from the light source output surface at an incidence angle in the light transmitting material parallel to the normal to the first output surface.

Surface Relief Structure

One or more surfaces or interfaces of the optical composite may contain a non-planar surface relief feature. As used herein, a surface relief feature or structure may include the interfacial boundary between two or more materials. In one embodiment of this invention a surface relief feature is formed in a first light transmitting material which is subsequently substantially planarized by a second light transmitting material. In this embodiment, the resulting composite is substantially planar, however, due to the difference in refractive index of the first and second light transmitting materials, the interface, which was previously the outer surface relief feature of the first light transmitting material, is now a surface relief feature formed at the interface between the first and second light transmitting materials and can provide light re-direction functions such as diffusion, collimation or angular spreading of light. The resulting composite in this embodiment is substantially planar, yet has a light redirecting surface relief features within the volume.

The surface relief features of one embodiment of this invention may contain protrusions, pits, structures, shapes or undulations that may range from 1 nm to 3 mm in the x, y, or z directions. The profile or individual features may have periodic, random, semi-random, or other uniform or non-uniform structures. The surface features may be designed to provide functions to the optical composite, such as light redirection or anti-blocking. Light can be redirected by surface relief features to provide optical functions such as collimation, refraction, focusing, light divergence, symmetric diffusion, asymmetric diffusion, light extraction from a waveguide, or diffraction. In some embodiments of this invention, the surface relief features are a linear array of prismatic structures that provide collimation properties. In another embodiment, the surface includes hemispherical protrusions that prevent wet-out or provide anti-blocking properties or light-collimating properties.

Surface relief features that re-direct light can be called light redirecting features and include refractive, reflective or scattering features such a lenses, prisms, hemispherical, defined optical shapes with functionality, or arrays or patterns of these features. In one embodiment of this invention, a composite or light emitting device comprising a composite has improved optical or mechanical performance by comprising a light redirecting feature, a layer configuration, an additive, material, light source, or article with optical properties as described in US Patent Application Publication Nos. 20070201246, 20060056166, 2006/0227546, or 20060290253, the entirety of each are incorporated herein by reference. In a further embodiment of this invention, the method of manufacturing a composite comprises a step or process described in the aforementioned patent applications.

In one embodiment of this invention, a composite comprises a surface relief feature or prismatic structure or lens structure with refractive or diffractive properties as described in U.S. Pat. Nos. 6,354,709, 4,984,144, 6,862,141 and U.S. Patent Application Publication No. 20060204720, the contents of the patents and patent application are incorporated by reference herein.

In one embodiment of this invention, a composite or light emitting device comprising a composite comprises at least one optical film or surface relief or optical or mechanical feature of a film selected from the group of BEF, BEF II, BEF III, TBEF, BEF-RP, BEFII 90/24, BEF II 90/50, DBEF-MF1-650, DBEF-MF2-470, BEFRP2-RC, TBEF2 T 62i 90/24, TBEF2 M 65i 90/24, NBEF, NBEF M, Thick RBEF, WBEF-520, WBEF-818, OLF-KR-1, and 3637T OLF Transport sold by 3M, PORTGRAM V7 sold by Dai Nippon Printing Co., Ltd., LUMTHRU that sold by Sumitomo Chemical Co., Ltd. and ESTINAWAVE W518 and W425 DI sold by Sekisui Chemical Co., Ltd.

In one embodiment of this invention, a composite or light emitting device comprising a composite comprises a surface relief structure which comprises a non-symmetrical prismatic structure such as those found on Image Directing Film (IDF or IDFII) or Transmissive Right Angle Film (TRAF or TRAFII) sold by 3M.

In a further embodiment of this invention, a composite (or light emitting device comprising a composite) comprises a surface relief structure in the form of a "reverse prism film"

such as sold by Mitsubishi Rayon Co., Ltd. under the trade names of DIA ART H150, H210, P150 and P210, or comprises a surface relief structure as disclosed in the embodiments within U.S. Pat. Nos. 6,545,827, 6,151,169, 6,746,130, and 5,126,882, the contents of which are incorporated by reference herein.

In one embodiment of this invention, the surface relief features or interfaces between materials in one region or surface of an optical composite substantially collimate incident light. In another embodiment of this invention, the regularity of a surface feature, such as an array of prisms, is modified in order to introduce diffusion, color mixing, reduce moiré interference, increased angular spread, provide anti-blocking properties, or to reduce damage to other films by adding particles to the surface or in the volume, changing the height, depth, shape, pitch, regularity of pitch, degree of randomness of a feature, or curvature of surfaces on one or more sides in one or more directions of the composite or surface of the composite or surface relief feature. In one embodiment of this invention, the depth of the prism features is changed and introduces curvature into the surface of the prisms. In one embodiment of this invention, a coating of beads is applied to the surface feature or the opposite side of the composite.

Light Collimating Surface Features

One or more surfaces or interfaces of the optical composite may include surface profiles that provide collimation properties. The collimation properties direct light rays incident from large angles into angles closer to the direction substantially perpendicular to the composite (smaller angles) within one or more planes such as the x-z plane or the y-z plane. The features may be in the form of a array of prisms, an array of pyramids, an array of cones, an array of hemispheres, an array of lenses, or other feature that is known to direct more light into the direction normal to the surface of the light emitting device. The array of features may be regular, irregular, random, ordered, semi-random or other arrangement where light can be collimated through refraction, reflection, total internal reflection, diffraction, or scattering.

In one embodiment of this invention, light collimating surface features are convex in shape wherein a convex surface is a surface of a material wherein a line drawn between two points along the smallest feature on the surface of the material pass through the material. In one embodiment of this invention, light collimating surface features are convex in shape wherein the convex surface is a surface profile curving or bulging outward material that collimates light through refraction.

In one embodiment of this invention, the light output from a light emitting device comprising a composite such as an optical film or light collimating film is more collimated relative to the device without the composite or film.

Inverted Light Collimating Surface Features

Inverted light collimating surface features are the three-dimensional inverse of light collimating features. In one embodiment, these features are concave in shape or recess into a material. In one embodiment of this invention, inverted light collimating surface features are concave in shape wherein a concave surface is a surface of a material wherein a line drawn between two points along the smallest feature on the surface of the material does not pass through the material. In one embodiment of this invention, light collimating surface features are concave in shape wherein the concave surface is a surface profile curving or bulging inward such as a depression or groove in the material. In one embodiment of this invention, the inverted light collimating surface features are concave hemispherical recesses, conical recesses, prism or groove recesses, curved or other recessed shapes.

Light Redirection Features

In another embodiment of this invention, the surface relief features are light redirection features that increase the off-axis intensity at an angle larger from the optical axis within one or more planes. In a further embodiment of this invention, the incident light passing through light redirection features is directed through a total angle larger than one selected from the group consisting of 10 degrees, 30 degrees, 45 degrees, 60 degrees, 90 degrees, 120 degrees, or 160 degrees. In one embodiment of this invention, the light redirection features are not symmetrical in a first plane substantially parallel to the incident light.

Surface Relief Feature Transmission

More than one surface feature relief feature may be used. In one embodiment, the surface relief feature is within the volume of the composite at the interface between two materials and a second surface relief feature is on an outer surface of the composite. In a further embodiment, the optical efficiency of the system is increased through the use of surface relief features to the increased coupling into the film due to reflected light from the surface reaching a second portion of the surface and being able to pass through. In one embodiment, the transmission of the surface relief region is greater than one selected from the group consisting of 80%, 85%, 90%, 94%, 96% as measured according to ASTM D1003 with the light incident on the relief surface. In one embodiment, the transmission of the surface relief region combined with the volumetric anisotropic region is greater than one selected from the group consisting of 70%, 80%, 85%, 90%, 94%, 96% as measured according to ASTM D1003 with the light incident on the relief surface.

Pitch of Surface Relief Features

A surface relief feature wherein the feature has a substantially constant pitch or regularity among a feature can interfere with a substantially constant pitch or regularity among a feature of another surface relief feature creating lines or patterns of luminance non-uniformity. In one embodiment of this invention, the moiré pattern viewable on an optical composite or between the optical composite and a second film or element in a light emitting device is alleviated by effectively randomizing the pitch, height, shape or spacing between the apex or valleys of at least one of the elements. In one embodiment of this invention, the moiré contrast can be reduced producing a random or predetermined variation on the pitch or slop angle of a refracting or TIR element as described in reference to brightness enhancing films in U.S. Pat. Nos. 5,919,551, 6,354,709, 5,771,328, 7,092,163, and 6,862,141, the contents of which are incorporated by reference herein. In one embodiment of this invention, the luminance contrast due to moiré is less than 30%, 20%, 10%, or 5%.

Optical Composite Composition

The optical composite in one embodiment of this invention includes one or more light-transmitting regions. The light transmitting region may also scatter light as a light scattering region. In a further embodiment, the composite comprises a light scattering region comprising matrix material (continuous phase) including dispersed domains (dispersed phase). In one embodiment of this invention, the light transmitting material is a continuous phase material. In another embodiment of this invention, the light transmitting material is a dispersed phase material. In another embodiment, the light transmitting or light-scattering region may include a region of light-scattering surface features that exhibit asymmetric scattering properties. In another embodiment, one or more of the light transmitting or light scattering regions may be an adhesive joining two or more components of the light emitting device system. The optical composite may also include a substrate, carrier, capping layer, protective layer or light transmitting material one on or more surfaces that may be substantially optically transparent. In one embodiment of this invention, the material chosen for the light transmitting material, such as the continuous phase material, dispersed phase material, substrate, carrier, capping layer, or protective layer comprises one or more polymeric or inorganic materials.

In one embodiment of this invention, the light transmitting material comprises polymers which include, but are not limited to acrylics, styrenics, olefins, polycarbonates, polyesters, cellulosics, and the like. Specific examples include poly(methyl methacrylate) and copolymers thereof, polystyrene and copolymers thereof, poly(styrene-co-acrylonitrile), polyethylene and copolymers thereof, polypropylene and copolymers thereof, poly(ethylene-propylene) copolymers, poly(vinyl acetate) and copolymers thereof, poly(vinyl alcohol) and copolymers thereof, bisphenol-A polycarbonate and copolymers thereof, poly(ethylene terephthalate) and copolymers thereof; poly(ethylene 2,6-naphthalenedicarboxylate) and copolymers thereof, polyarylates, polyamide copolymers, poly(vinyl chloride), cellulose acetate, cellulose acetate butyrate, cellulose acetate propionate, polyetherimide and copolymers thereof, polyethersulfone and copolymers thereof, polysulfone and copolymers thereof, and polysiloxanes.

Numerous methacrylate and acrylate resins are suitable for one or more phases of the present invention. The methacrylates include but are not limited to polymethacrylates such as poly(methyl methacrylate), poly(ethyl methacrylate), poly (propyl methacrylate), poly(butyl methacrylate), poly(isobutyl methacrylate), methyl methacrylate-methacrylic acid copolymer, methyl methacrylate-acrylate copolymers, and methyl methacrylate-styrene copolymers (e.g., MS resins). Suitable methacrylic resins include poly(alkyl methacrylate)s and copolymers thereof. In particular embodiments, methacrylic resins include poly(methyl methacrylate) and copolymers thereof. The acrylates include but are not limited to poly(methyl acrylate), poly(ethyl acrylate), and poly(butyl acrylate), and copolymers thereof.

A variety of styrenic resins are suitable for polymeric phases of the present invention. Such resins include vinyl aromatic polymers, such as syndiotactic polystyrene. Syndiotactic vinyl aromatic polymers useful in the present invention include poly(styrene), poly(alkyl styrene)s, poly (aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly (phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, suitable styrene resin polymers include polystyrene, polyp-methyl styrene), poly(m-methyl styrene), polyp-tertiary butyl styrene), poly(p-chlorostyrene), poly(m-chloro styrene), polyp-fluoro styrene), and copolymers of styrene and p-methyl styrene. In particular embodiments, styrenic resins include polystyrene and copolymers thereof.

Particular polyester and copolyester resins are suitable for phases of the present invention. Such resins include poly (ethylene terephthalate) and copolymers thereof, poly(ethylene 2,6-naphthalenedicarboxylate) and copolymers thereof, poly(1,4-cyclohexandimethylene terephthalate) and copolymers thereof, and copolymers of poly(butylene terephthalate). The acid component of the resin can comprise terephthalic acid, isophthalic acid, 2,6-naphthalenedicarboxylic acid or a mixture of said acids. The polyesters and copolyesters can be modified by minor amounts of other acids or a mixture of acids (or equivalents esters) including, but not limited to, phthalic acid, 4,4'-stilbene dicarboxylic acid, 2,6-naphthalenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid and trans-1,4-cyclohexanedicarboxylic acid. The glycol component of the resin can comprise ethylene glycol, 1,4-cyclohexanedimethanol, butylene glycol, or a mixture of said glycols. The copolyesters can also be modified by minor amounts of other glycols or a mixture of glycols including, but not limited to, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4,4-tetramethyl-1,3-cyclobutanediol, diethylene glycol, bisphenol A and hydroquinone. Suitable polyester resins include copolyesters formed by the reaction of a mixture of terephthalic acid and isophthalic acid or their equivalent esters with a mixture of 1,4-cyclohexanedimethanol and ethylene glycol. In particular embodiments, the polyester resins include copolyesters formed by the reaction of terephthalic acid or its equivalent ester with a mixture of 1,4-cyclohexanedimethanol and ethylene glycol.

Certain polycarbonate and copolycarbonate resins are suitable for materials of the present invention. Polycarbonate resins are typically obtained by reacting a diphenol with a carbonate precursor by solution polymerization or melt polymerization. The diphenol is preferably 2,2-bis(4-hydroxyphenyl)propane (so-called "bisphenol A"), but other diphenols may be used as part or all of the diphenol. Examples of the other diphenol include 1,1-bis(4-hydroxyphenyl)ethane, 1,1-bis(4-hydroxyphenyl)cyclohexane, 2,2-bis(4-hydroxy-3, 5-dimethylphenyl-)propane, 2,2-bis(4-hydroxy-3-methylphenyl)propane, bis(4-hydroxyphenyl)sulfide and bis(4-hydroxyphenyl)sulfone. The polycarbonate resin can be a resin which comprises bisphenol A in an amount of 50 mol % or more, particularly 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Particularly suitable are phosgene and diphenyl carbonate.

A number of poly(alkylene) polymers are suitable for phases of the present invention. Such polyalkylene polymers include polyethylene, polypropylene, polybutylene, polyisobutylene, poly(4-methyl)pentene), copolymers thereof, chlorinated variations thereof, and fluorinated variations thereof.

Particular cellulosic resins are suitable for phases of the present invention. Such resins include cellulose acetate, cellulose acetate butyrate, cellulose acetate propionate, cellulose propionate, ethyl cellulose, cellulose nitrate. Cellulosic resins including a variety of plasticizers such as diethyl phthalate are also within the scope of the present invention. Other materials known to be used in optical elements described in this disclosure, patent or patent application references incorporated herein, or known to those in the optical films for displays or lighting industries may also be used as the light transmitting material in accordance with an embodiment of this invention.

Optical Composite Additives

Additives, components, blends, coatings, treatments, layers or regions may be combined on or within the aforementioned regions to provide additional properties. These may be inorganic or organic materials. They may be chosen to provide increased rigidity to enable support of additional films or light emitting device components. They may be chosen to provide increased thermal resistance so that the composite or film does not warp. They may be chosen to increase moisture resistance, such that the composite does not warp or degrade other properties when exposed to high levels of humidity. The additive materials may be designed to provide improved optical performance by reducing wet-out when in contact with other components in the light emitting device. Additives may be used to absorb ultra-violet radiation to increase light resistance of the product. They may be chosen to increase, decrease, or match the scratch resistance of other components in the display or backlight system. They may be chosen to decrease the surface or volumetric resistance of the optical composite or region of the optical composite to achieve antistatic properties.

The additives may be components of one or more layers of the optical composite. The additives may be coatings that are added onto a surface or functional layers that are a combined during the manufacturing process. The additives may be dispersed throughout the volume of a layer or coating or they could be applied to a surface.

Various functional layers or coatings may be added to the composites and light emitting devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, or substrates designed to improve the mechanical integrity or strength of the film or device.

Anti-Reflection Coatings

The composites and light emitting devices made in accordance with the invention may include one or more anti-reflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the composites and light emitting devices of the present invention through appropriate surface treatment, such as coating or sputter etching. In some embodiments of the present invention, it is desired to maximize the transmission and/or minimize the specular reflection for certain polarizations of light. In these embodiments, the composite may comprise two or more layers in which at least one layer comprises an anti-reflection system in close contact with a layer providing the continuous and disperse phases. Such an anti-reflection system acts to reduce the specular reflection of the incident light and to increase the amount of incident light that enters the portion of the body comprising the continuous and disperse layers. Such a function can be accomplished by a variety of means well known in the art. Examples are quarter wave anti-reflection layers, two or more layer anti-reflective stack, graded index layers, and graded density layers. Such anti-reflection functions can also be used on the transmitted light side of the composite to increase transmitted light if desired.

Anti-Fogging Properties

The composites and light emitting devices made in accordance with the invention may also be provided with a film or coating which imparts anti-fogging properties. In some cases, an anti-reflection layer as described above will serve the dual purpose of imparting both anti-reflection and anti-fogging properties to the composite or device. Various anti-fogging agents are known to the art which are suitable for use with the present invention. Typically, however, these materials will comprise substances, such as fatty acid esters, which impart hydrophobic properties to the composite surface and which promote the formation of a continuous, less opaque film of water. Several inventors have reported coatings that reduce the tendency for surfaces to "fog". For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkylbenzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994]41,335 discloses a clouding and drip preventive composition comprising colloidal alumina, colloidal silica and an anionic surfactant. U.S. Pat. No. 4,478,909 (Taniguchi et al) discloses a cured anti-fogging coating film which comprises polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. World Patent No. PCT 96/18,691 (Scholtz et al) discloses means by which coatings may impart both anti-fog and anti-reflective properties.

UV Stability

The composites and light emitting devices of the present invention may also be protected from UV radiation through the use of UV stabilized films or coatings. Suitable UV stabilized composites and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such composites or coatings will be particularly important when the composites and devices of the present invention are used in outdoor applications or in luminaires where the source emits significant amount of light in the UV region of the spectrum.

Antioxidants

The composites and light emitting devices of the present invention may also include antioxidants such as, for example, 4,4'-thiobis-(6-t-butyl-m-cresol), 2,2'-methylenebis-(4-methyl-6-t-butyl-butylphenol), octadecyl-3,5-di-t-butyl-4-hydroxyhydrocinnamate, bis-(2,4-di-t-butylphenyl)pentaerythritol diphosphite, Irganox™ 1093 (1979) (((3,5-bis(1,1-dimethylethyl)-4-hydroxyphenyl)methyl)-dioctadecyl ester phosphonic acid), Irganox™ 1098 (N,N'-1,6-hexanediylbis (3,5-bis(1,1-dimethyl)-4-hydroxy-benzenepropanamide), Naugaard™ 445 (aryl amine), Irganox™ L 57 (alkylated diphenylamine), Irganox™ L 115 (sulfur containing bisphenol), Irganox™ LO 6 (alkylated phenyl-delta-napthylamine), Ethanox 398 (fluorophosphonite), and 2,2'-ethylidenebis(4,6-di-t-butylphenyl)fluorophosnite. A group of antioxidants that are especially preferred are sterically hindered phenols, including butylated hydroxytoluene (BHT), Vitamin E (di-alpha-tocopherol), Irganox™ 1425WL (calcium bis-(O-ethyl (3,5-di-t-butyl-4-hydroxybenzyl))phosphonate), Irganox™ 1010 (tetrakis(methylene(3,5,di-t-butyl-4-hydroxyhydrocinnamate))methane), Irganox™ 1076 (octadecyl 3,5-di-tert-butyl-4-hydroxyhydrocinnamate), Ethanox™ 702 (hindered bis phenolic), Etanox 330 (high molecular weight hindered phenolic), and Ethanox™ 703 (hindered phenolic amine).

Inks, Dyes or Pigments

The composites and light emitting devices of the present invention may also be treated with inks, dyes, or pigments to alter their appearance or to customize them for specific applications. Thus, for example, the films may be treated with inks or other printed indicia such as those used to display product identification, advertisements, warnings, decoration, or other information. Various techniques can be used to print on the film, such as screen printing, letterpress, offset, flexographic printing, stipple printing, laser printing, and so forth, and various types of ink can be used, including one and two component inks, oxidatively drying and UV-drying inks, dissolved inks, dispersed inks, and 100% ink systems. The appearance of the composite and light emitting device may also be altered by coloring the device such as by laminating a dyed film to the composite, applying a pigmented coating to the surface of the optical device, or including a pigment in one or more of the materials used to make the composite. Both visible and near IR dyes and pigments are contemplated in the present invention, and include, for example, optical brighteners such as dyes that absorb in the UV and fluoresce in the visible region of the color spectrum. Other additional layers that may be added to alter the appearance of the optical composite include, for example, opacifying (black) layers, diffusing layers, holographic images or holographic diffusers, and metal layers. Each of these may be applied directly to one or both surfaces of the composite, or may be a component of a second film or foil construction that is laminated to the composite. Alternately, some components such as opacifying or diffusing agents, or colored pigments, may be included in an adhesive layer which is used to laminate the optical composite to another surface.

Metal Coatings

The composites and light emitting devices of the present invention may also be provided with metal coatings. Thus, for example, a metallic layer may be applied directly to the optical film by pyrolysis, powder coating, vapor deposition, cathode sputtering, ion plating, and the like. Metal foils or rigid metal plates may also be laminated to the optical film, or separate polymeric films or glass or plastic sheets may be first metallized using the aforementioned techniques and then laminated to the optical films and devices of the present invention.

Dichroic Dyes

Dichroic dyes are a particularly useful additive for many of the applications to which the composites and light emitting devices of the present invention are directed, due to their ability to absorb light of a particular polarization when they are molecularly aligned within the material. When used in a composite or light emitting device, the dichroic dye causes the material to absorb one polarization of light more than another. Suitable dichroic dyes for use in the present invention include Congo Red (sodium diphenyl-bis-α-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN. Still other dichroic dyes, and methods of making them, are discussed in the Kirk Othmer Encyclopedia of Chemical Technology, Vol. 8, pp. 652-661 (4th Ed. 1993), and in the references cited therein. Dychroic dyes in combination with certain polymer systems exhibit the ability to polarize light to varying degrees. Polyvinyl alcohol and certain dichroic dyes may be used to make films with the ability to polarize light. Other polymers, such as polyethylene terephthalate or polyamides, such as nylon-6, do not exhibit as strong an ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light. Combinations of a dichroic dye with a multilayer optical polarizer are described in U.S. patent application Ser. No. 08/402,042 entitled "Optical Polarizer" filed Mar. 10, 1995; in U.S. Pat. No. 6,123,811 (Kausch et al.) entitled "Dichroic Polarizing Film and Optical Polarizers Containing the Film" filed Jan. 13, 1998; and in U.S. Pat. No. 6,111,697 (Merrill et al.) entitled "Optical Device with a Dichroic Polarizer and a Multilayer Optical Film" filed Jan. 13, 1998.

In addition to the films, coatings, and additives noted above, the light transmitting materials of the composite in the present invention may also comprise other materials or additives as are known to the art. Such materials include binders, coatings, fillers, compatibilizers, surfactants, antimicrobial agents, foaming agents, reinforcers, heat stabilizers, impact modifiers, plasticizers, viscosity modifiers, and other such materials.

The composites and light emitting devices made in accordance with the present invention may be subjected to various treatments which modify the surfaces of these materials, or any portion thereof, as by rendering them more conducive to subsequent treatments such as coating, dying, metallizing, or lamination. This may be accomplished through treatment with primers, such as PVDC, PMMA, epoxies, and aziridines, or through physical priming treatments such as corona, flame, plasma, flash lamp, sputter-etching, e-beam treatments, or amorphizing the surface layer to remove crystallinity, such as with a hot can.

Adhesives

Adhesives such as pressure-sensitive or UV-cured adhesives may also be used between one or more layers to achieve optical coupling. Materials known to those in the field of optical films, plates, diffuser plates, films, backlights, light fixtures and other light emitting devices to provide optical, thermal, mechanical, environmental, electrical and other benefits may be used in the volume or on a surface, coating, or layer of the optical composite or one of its regions. The adhesive layer may also contain symmetric, asymmetric, or a combination of symmetric and asymmetric domains in order to achieve desired light-scattering properties within the diffusion layer.

The composites and optical devices made in accordance with the invention may also be provided with one or more adhesives to laminate the composite or components of the composite of the present invention to another film, surface, or substrate or to another component to manufacture the composite. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above. Additionally, the adhesives can contain additives such as tackifiers, plasticizers, fillers, antioxidants, stabilizers, pigments, diffusing particles, curatives, and solvents. In some applications, as where the composites of the present invention are to be used as a component in an adhering optical composite it may be desirable to treat the films with low adhesion backsize (LAB) coatings or films such as those based on urethane, silicone or fluorocarbon chemistry. Composites treated in this manner will exhibit proper release properties towards pressure sensitive adhesives (PSAs), thereby enabling them to be treated with adhesive and wound into rolls. When a laminating adhesive is used to adhere a composite of the present invention to another surface, the adhesive composition and thickness are preferably selected so as not to interfere with the optical properties of the composite. For example, when laminating additional layers to an optical composite comprising a polarizer or mirror wherein a high degree of transmission is desired, the laminating adhesive should be optically clear in the wavelength region that the polarizer or mirror is designed to be transparent in.

Slip Agents

It is well known in the art of polymer optical films to include small amounts of fine particulate materials, often referred to as "slip agents," to provide such surface roughness or texture. The use of slip agents can be incorporated into the inventive optical films. However, the inclusion of slip agent particulates can introduce a small amount of haze and can decrease the optical transmission of the film. In accordance with the present invention, Newton's Rings can be effectively prevented, without the use of slip agents, if surface roughness or texture is provided by contacting the cast web with a micro-embossing roll during film casting. Preferably, the micro-embossing roll will serve as a nip roll to the casting wheel. Alternatively, the casting wheel itself may be micro-textured to provide a similar effect. Further, both a micro-embossing casting wheel and a micro-embossing nip roll may be used together to provide a film that is micro-embossed on both sides.

The optical films of the present invention may comprise a slip agent that is incorporated into the film or added as a separate coating in order to improve roll formation and convertibility of the film. In most applications, slip agents will be added to only one side of the film, ideally the side facing the rigid substrate in order to minimize haze. The films and composites of the present invention may be given good slip properties by treating them with low friction coatings or slip agents, such as polymer beads coated onto the surface. Alternately, the morphology of the surfaces of these materials may be modified, as through manipulation of extrusion conditions, to impart a slippery surface to the film; methods by which surface morphology may be so modified are described in U.S. Pat. No. 5,759,467 (Carter et al.).

Lubricants

Various lubricants may also be used during the processing (e.g., extrusion) of the composite or a component thereof such as a film. Suitable lubricants for use in the present invention include calcium stearate, zinc stearate, copper stearate, cobalt stearate, molybdenum neodocanoate, and ruthenium (III) acetylacetonate. In addition, the composite or film may undergo subsequent processing steps such as converting, wherein the film may be slit into rolls or finished sheets for a particular use, or the film may be slit or converted into strips, fibers, or flakes such as are used for glitter. Depending on the end-use application, additional coatings or layers as described above may be added either prior to or after a converting operation.

Conductive Coatings

The composites and light emitting devices of the present invention may also be provided with one or more conductive layers. Such conductive layers may comprise metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

Barrier Properties

The composites and light emitting devices of the present invention may also be provided with one or more barrier films or coatings that alter the transmitting properties of the optical film towards certain liquids or gases. Thus, for example, the devices and composites of the present invention may be provided with films or coatings that inhibit the transmission of water vapor, organic solvents, $O_2$, or $CO_2$ through the film. Barrier coatings will be particularly desirable in high humidity environments, where components of the film or device would be subject to distortion due to moisture permeation.

Flame Retardants

The composites and light emitting devices of the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

Abrasion Resistance

The composites and light emitting devices of the present invention may also be provided with abrasion-resistant or hard coatings, which will frequently be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

Shatter Resistance

The composites and light emitting devices of the present invention may also be provided with shatter resistant films and coatings. Films and coatings suitable for this purpose are described, for example, in publications EP 592284 and EP 591055, and are available commercially from 3M Company, St. Paul, Minn.

Anti-Static Additives

Anti-static monomers or inert additives may be added to one or more regions or domains of the optical composite. Reactive and inert anti-static additives are well known and well enumerated in the literature. High temperature quaternary amines or conductive polymers may be used. As an anti-static agent, stearyl alcohol, behenyl alcohol, and other long-chain alkyl alcohols, glyceryl monostearate, pentaerythritol monostearate, and other fatty acid esters of polyhydric alcohols, etc., may be used. In particular embodiments, stearyl alcohol and behenyl alcohol are used.

The composites and light emitting devices of the present invention may also be provided with antistatic coatings or films. Such coatings or films include, for example, $V_2O_5$ and salts of sulfonic acid polymers, carbon or other conductive metal layers.

Optical Composite Size

The dimensions of the optical composite or an included region may extend to be substantially located between the light paths from the light sources to the display or light emitting device output surface. In case of small displays, the optical composite may have a dimension in one direction of 1 cm or less, such as the case of a watch display. In larger displays, a dimension of the optical composite will, in general, be at least as large as one dimension of the final viewing screen. The thickness of the optical composite or a region may be from 7 mm to less than 100 microns. In one embodiment, the thickness of the optical composite is less than 50 microns. In a particular embodiment, a optical composite includes an anisotropic scattering region that is 200 microns in thickness optically coupled to a substrate that is approximately 1 mm in thickness. The capability of using a thin anisotropic scattering region to achieve sufficient diffusion for luminance uniformity allows for lower cost substrates to be used. Since the substrate can be substantially optically clear, low cost substrates may be used and they may have reduced weight, making lighter displays. The thin, asymmetrically diffusing layer also permits the capability of using a thinner substrate and therefore achieving a thinner light emitting device system.

In one embodiment of this invention, an optical composite comprises a substantially thick region of light transmitting material in order to achieve specific mechanical, optical, or other properties as discussed herein. In one embodiment of this invention, the optical composite is a rigid lens used in a light fixture. In a further embodiment of this invention, the optical composite is a diffusing plate or sheet used in a backlight for illuminating an LCD. In another embodiment of this invention, the composite is a waveguide used for illumination. In some embodiments of this invention, the optical composite is greater than 200 microns in thickness. In further embodiments of this invention, the optical composite is greater than 400, 600 or 1000 microns in thickness.

Improved Optical Properties

In one embodiment of this invention, the optical properties of the composite are improved over that of the film or component. In one embodiment, the percent transmission as measured by ASTM D1003 is improved while substantially maintaining the morphology or shape of the light manipulating features. In a further example, the spherulite crystal size is reduced or eliminated by a secondary thermal process operation such as extrusion casting or insert-molding. In one embodiment, one or more of the components of the film or composite is raised above its melting temperature and cooled at a sufficiently fast rate such that the percent haze produced is reduced or the percent transmission is increased. In one embodiment, the haze decreases by at least 2 percent. In a further embodiment, the transmission increases by at least 2 percent as measured according to ASTM D1003.

In one embodiment, the percent transmission of the composite is increased by at least 2 percent over that of the individual components due to the loss of two air-component interfaces. In specular systems, the transmission loss in the air-polymer or air-glass interface is about 4%. However in systems with forward and backward light scattering properties, this loss may be less. This also depends on the surface profile of the film or component.

The optical composite of one embodiment of this invention may be used to increase the luminance uniformity or angular light distribution of a light emitting device such as a light fixture, information display, or illuminator.

In one embodiment of this invention, the film or component has protrusions or surface relief with at least one feature size greater than 2 µm along one axis that is effectively indexed matched out in the secondary processing operation forming the composite.

In a further embodiment of this invention, the air-polymer or air-component interface is transferred to the air-composite interface and the spatial luminance uniformity as used in the system is greater than 70%. In one example of an embodiment of this invention, a 200 micron polycarbonate anisotropic light scattering film is insert-molded onto a transparent 3 millimeter PMMA light transmitting component forming a composite. A portion of the spatially non-uniform incident light from parallel linear bulbs incident on the polycarbonate material will scatter such that the angles leaving the polycarbonate matrix material does not totally-internal-reflect at the polycarbonate-PMMA interface and subsequently totally internally reflects from the PMMA-air interface and is redirected back toward the polycarbonate. A portion of this re-directly light will scatter such that it escapes the composite. The spatial position of the light escaping the composite is translated within the plane of the composite based on the thickness of the PMMA and location where it subsequently reflects. A significant portion of this reflected light will be located substantially further from the location it first entered the PMMA, thus increasing the spatial luminance of the composite light emitting structure. In one embodiment, the ratio of the thickness of the film to the second optical component to which it is combined is at least 2. In a further embodiment, the ratio of the thickness of the film to the second optical component to which it is combined is at least 5.

In one embodiment of this invention the light scattering properties of the composite are substantially different than that of the film. In another embodiment, the light scattering properties of the film component are modified due to the secondary process forming the composite. The secondary process forming the composite can alter the size, shape, orientation, refractive index, of the dispersed domains or the spherulite diameter (or number of spherulites) along at least one axis within the optical film. The properties of the process affecting these parameters can include temperature, pressure, shear, polymer flow, rheological properties of the materials, heating rate, cooling rate, interfacial adhesion or tension between the secondary component and the optical film. In one embodiment of this invention, the secondary process reaches a high temperature of substantially the glass transition temperature of at least one of the matrix and dispersed phase domain materials. In a further embodiment of this invention, the secondary process reaches a high temperature of substantially the melt temperature of at least one of the matrix and dispersed phase domain materials.

In one embodiment of this invention, the dispersed domains of the anisotropic optical film are asymmetrically shaped before the secondary process and are more symmetrically shaped after the process. In one embodiment, the domain asymmetry ratio, DAR, is decreased. In a further embodiment, the anisotropic ratio, AR, is decreased. In one embodiment, during the secondary processing of the film, the matrix and domain are above their glass transition temperature and the domains and matrix are at a high enough temperature such that the surface tension pulls the domain shape toward a less asymmetric or toward a spherical domain.

In one embodiment of this invention, the dispersed domains of the anisotropic optical film are symmetrically shaped before the secondary process and are more asymmetrically shaped after the process in one or more regions of the composite. In one embodiment, the domain asymmetry ratio, DAR, is increased. In a further embodiment, the anisotropy ratio, AR, is increased. In one embodiment, during the secondary processing of the film, the matrix and domain are above their glass transition temperature and the shear imparted on the domain by the matrix is sufficient to distort the shape of the domain to a more asymmetric or non-spherical domain.

In a further embodiment of this invention, the AR of the composite is at most one of the group consisting of 80%, 50%, 10%, or 5% of the value of the film before the secondary processing. In another embodiment, a substantially symmetric forward light scattering composite is formed from the secondary processing of a film with substantially asymmetric forward light scattering properties. In a further embodiment, the AR ratio is decreased and the light transmission is increased. In another embodiment of this invention, average dimension along one axis of the dispersed phase domain increases. In a further embodiment of this invention, average dimension of the dispersed phase domain along one axis in the plane of the film increases such that it is greater than 1.5 µm. In a further embodiment of this invention, the AR of the composite is at least one of the group consisting of 110%, 200%, 500%, or 1000% of the value of the film before the secondary processing. In another embodiment, a substantially symmetric forward light scattering composite is formed from the secondary processing of a film with substantially asymmetric forward light scattering properties.

In one embodiment of this invention, the optical composite comprises asymmetric dispersed phase domains aligned in substantially radial directions from a central region. In one embodiment of this invention, a region comprising domains of a light transmitting material is exposed to radial shear forces from an injection molding apparatus such that the domains are elongated and/or aligned in a radial direction from a central region. In a further embodiment of this invention, a light emitting device comprises a composite comprising light scattering domains aligned in a radial direction within a plane of the composite such that the illuminance from the device at a first distance, k, at 0 degrees from the optical axis of the light illuminating the composite is less than the illuminance at 5 degrees, 10 degrees, 20 degrees or 30 degrees along a first output plane. Typically, optical elements comprising light scattering features have optical output profiles wherein the illuminance falls off gradually from 0 degrees to the optical axis of light incident on the optical element. By using an optical composite with domains aligned in a radial direction in a plane of the composite, a significant portion of incident light at an angle near the optical axis is scattered to angles further from the optical axis, causing the illuminance to be less near zero degrees to the optical axis of the light incident on the optical composite. In a further embodiment of this invention, a composite comprises light scattering domains aligned in a radial direction within a plane of the composite wherein the composite is substantially circular in shape such as a disc. In a further embodiment of this invention, a composite comprises light scattering domains aligned in a radial direction within the light output surface. In another embodiment of this invention, a composite comprises light scattering domains aligned in a radial direction within a curved or hemispherical light output surface.

In one embodiment of this invention an enhanced optical composite is formed by the combination of the optical properties of the film and the optical properties of the materials and design used in the secondary processing. The resulting composite may have improved optical properties over the optical film. In one embodiment of this invention the optical film has at least one light manipulating property from the group consisting of symmetric or asymmetric light scattering, refracting, reflecting or other properties described herein and the secondary process adds a second light manipulating property through the process, design, and materials used in the secondary process.

In one embodiment of this invention, the composite provides one or more of the following optical functions: absorptive polarizer, reflective polarizer, scattering polarizer, substantially symmetrically scattering diffuser, anisotropically scattering diffuser, forward scattering diffuser, backward scattering diffuser, collimating element, light redirecting element, refracting element, spatial light homogenizer, increased axial luminance, increased spatial luminance uniformity along at least one axis, reduced speckle from coherent sources, non-depolarizing transmission, non-depolarizing reflection, increased angular luminance uniformity, increased forward specular transmission.

Improved Mechanical Properties

The optical composite of this invention has improved rigidity along at least one axis. In one embodiment, the anisotropic light scattering region has a flexural modulus along a first in-plane axis FM1 and a flexural modulus along a second axis orthogonal to the first FM2 such that FM1>FM2. In a further embodiment, FM1>(2×FM2) or FM1>(4×FM2) or FM1>(10×FM2). In some applications it is desirable to have a flexural modulus greater along one axis than the other. Such applications include curved lenses for light fixtures, circular lenses, light tubes and applications requiring non-planar light manipulating surfaces. The mechanical properties of the optical composite may be anisotropic along with the light scattering properties. Typically, it is difficult to achieve uniform anisotropic light scattering properties in thick extrusion or thick injection molding applications. By optically coupling the anisotropic region to a substantially thicker non-scattering region, the optical properties can be maintained or improved while also increasing the average flexural modulus along one axis or two orthogonal axes. In one embodiment, the asymmetry of the flexural modulus can be maintained by using a thick material with a low flexural modulus material such that FM1>FM2. In a further embodiment, the flexural modulus of the composite is higher than a similar thickness non-composite material. In one embodiment, a composite of a thickness d3 is formed by optically coupling two anisotropic light scattering films of thickness d4 and d5 to opposite sides of a substantially non-scattering region of a first material of thickness d6 such that the flexural modulus FM3 of the composite has a higher flexural modulus than a sheet of the non-scattering region of the first material of thickness d7 wherein d7=d3. In one embodiment, the substantially non-scattering material is a composite comprising of two materials wherein the refractive index is substantially matched with the resulting composite having a high flexural modulus. In one embodiment, the non-scattering material is a blend of a polycarbonate, a PCCD and a glass fiber material such that the refractive index of the miscible blend of the PC-PCCD substantially matches the refractive index of the glass fiber. Other combinations of materials and compositions with improved mechanical properties and optical properties including PCCD based materials are disclosed in U.S. Pat. No. 7,119,140 and US Patent App. Publication No. 20060287429, the entirety of each are incorporated herein by reference. These materials have a high flexural modulus and can be optical coupled through insert molding, extrusion lamination or other methods to one or more anisotropic light scattering regions to provide an optical composite with improved flexural modulus and optical properties such as spatial luminance uniformity.

In one embodiment of this invention, the optical composite provides increased toughness relative to that of a non-composite formed from the material of the substantially non-scattering region. In one embodiment, two anisotropic light scattering films with polycarbonate continuous phases are extrusion laminated to a polystyrene sheet to provide improved toughness over that of a polystyrene sheet of similar thickness.

In another embodiment of this invention, the strength of the bond between the light scattering region and the substantially non-scattering region is increased through the use of compatibilizers, adhesion promoters, tie-layers, corona treatments, or other materials or processes commonly used to increase the bond strength between two materials.

In a further embodiment of this invention, the anisotropic light scattering region is formed in a material capable of being bonded to glass. In one embodiment of this invention, the light scattering region is in a PVB material and is optically bonded to at least one glass layer. In one embodiment, the anisotropic light scattering region can be formed in an extrusion coating process onto the glass or an extrusion lamination process.

Improved Thermal Properties

In one embodiment of this invention, the optical composite comprises an anisotropic light scattering region with a continuous phase material of heat deflection temperature HDT1 and a substantially non-scattering region of heat deflection temperature HDT2 such that the heat deflection temperature of the composite HDT3 is greater than HDT1. In a further embodiment of this invention, HDT3>(1.1×HDT1) or HDT3>(1.2×HDT1) or HDT3>(1.5×HDT1).

In one embodiment of this invention, the optical composite comprises an anisotropic light scattering region with a continuous phase material of glass transition temperature $T_{g1}$ and a substantially non-scattering region of glass transition temperature $T_{g2}$ such that the glass transition temperature of the composite $T_{g3}$ is greater than $T_{g1}$. In a further embodiment of this invention, $T_{g3}>(1.1\times T_{g1})$ or $T_{g3}>(1.2\times T_{g1})$ or $T_{g3}>(1.5\times T_{g1})$.

In one embodiment of this invention, a composite comprises an anisotropic light scattering region and a substantially non-scattering region with improved thermal insulation or conduction properties.

In one embodiment of this invention, an optical composite with improved optical and thermal properties comprises an anisotropic light scattering region optically coupled to a thicker substantially non-scattering region wherein the dispersed domains within the anisotropic light scattering region provide increased thermal conduction or insulation along one or more axes while the continuous phase material is optically coupled to the non-scattering region. This optical coupling may include bonding by insert molding, extrusion lamination, thermal bonding or adhesive lamination.

One or more of the dispersed phase or the matrix may be thermally insulating such that the thermal resistance of the combination is greater than that of the matrix material alone. The thermal properties may be anisotropic such that thermal insulation or conduction is higher along one axis relative to an orthogonal axis. The dispersed phase material may be a material with high thermal conduction properties such that the oriented light scattering region also preferentially conducts heat along one direction of the composite. In one embodiment of this invention, the heat is preferentially conducted along an axis substantially normal to the surface of the light scattering region.

The dispersed domains may include materials with high thermal resistance and sufficient optical properties to provide predetermined optical scattering properties.

The dispersed domains may provide optical scattering of electromagnetic radiation outside of the visible spectrum. In one embodiment, the composite anisotropically scatters infrared light while conducting the heat along one or more axis of composite. The composite may also scatter ultraviolet radiation.

The dispersed phase domains may contain dies or other materials that are birefringent or that anisotropically absorb light of one polarization state. These materials are commonly used in dye-type, dichroic and other polarizers and are known in the field.

In one embodiment, the light scattering region is coupled to a glass substrate. This could be coupled through lamination, autoclave, or other techniques such as used to incorporate laminates to glass substrates. In one embodiment, the asymmetrically shaped domains increase the flexural modulus such that a glass composite has a combined higher modulus or improved shatter-resistant properties due to the preferential absorption of compression waves along one or more axis. In a further embodiment, the matrix material is a PVB.

The matrix material may also be an adhesive to promote further bonding of another component or material. Examples of light scattering properties, materials, and adhesives are included in U.S. Pat. No. 6,727,313, the contents of which are included by reference herein.

In one embodiment of this invention, the dispersed domains anisotropically conduct electricity along one or more axes. The composite of this invention can be combined with one or more of the group consisting of electrical connectors, light sources, driver electronics, conductors and other electrical components used in an electronic device, display or light emitting device.

Improved Physical Properties

In one embodiment of this invention, the dispersed phase component has a substantially lower density than the matrix or the light transmitting material. The combination of the optical properties and the reduced weight can provide an enhanced optical composite.

In one embodiment, the dispersed domains are voids comprising of a gas or air such that the optical composite has a weight less than that of a composite comprising of substantially the same volume of the light transmitting material.

In one embodiment, the rigidity and impact resistance of the composite is increased relative to that of a composite comprising of substantially the same volume of the light transmitting material. In a further embodiment, at least one of the flexural modulus, environmental stability, UV absorption, tensile strength, or scratch resistance of the composite is increased relative to that of a component comprising substantially the same volume of one of the light transmitting materials.

One or more of the optical, physical, thermal, mechanical and other properties disclosed herein may be combined to provide an enhanced composite.

In one embodiment of this invention, the light transmitting material is a support-structure of molten plastic that can be injection-molded, or extrusion-cast through a die onto a plastic in-volume diffusion film. In one embodiment, the temperature of the molten plastic is well above the resin's melting point during this process, allowing the resin to flow smoothly over the face of the plastic film, before solidifying into the desired shape. Pressure is applied by either a molding ram (injection equipment) or a nip-roll (with continuous extrusion-casting of a sheet) to promote bonding of the materials. In another embodiment, to ensure adhesion of the resin and the diffusion film, the film surface in contact with the resin forms a chemical or mechanical bond.

In one embodiment, during the molding/casting process, the diffusion film exceeds its glass-transition temperature as the molten resin is forced against it, and conforms to the metal mold (or casting nip-roll) on the opposite side. This process could damage or destroy any film surface features that existed on the film previously. In another embodiment, the in-volume microlenses, dispersed domains (including dispersed phase domains) in the diffusion film survive high-temperature processing with little or no change in shape, despite the softening—and subsequent re-hardening of the polymer matrix material or light transmitting material.

In one embodiment of this invention, one or more of the aforementioned functionalities or properties of an optical component is improved in a secondary process including at least one of the steps of extrusion, co-extrusion, casting, extrusion casting, molding, injection molding, rotation molding; insert molding, in-mold labeling, in-mold decoration, thermoforming, coating.

In another embodiment of this invention, a composite is created wherein the property or functionality is improved relative to the original component. In one embodiment, the property is improved relative to the sum of the individual properties of the composite.

Additional Composite Properties

The optical composite of embodiment of this invention may contain materials, additives, components, blends, coatings, treatments, layers or regions that provide additional optical, mechanical, environmental, thermal or electrical benefits. The properties of the optical composite or a region of the optical composite may include one or more of the following:

| | |
|---|---|
| Optical: | increased optical throughput, increased/decreased diffusion along one or more axis, reduced or increased birefringence, increased luminance uniformity, improved color stability, reduced haze. |
| Mechanical/Physical: | increase rigidity, reduced thickness, reduced weight, increased scratch resistance, reduced/increased pencil hardness, anti-blocking features, increased modulus, increased flexural modulus |
| Environment: | reduced warpage, increased light resistance, increased moisture resistance, increased light resistance, increased ultraviolet absorption, |
| Thermal: | increased thermal resistance, increased softening temperature, increased Vicat softening temperature |
| Electrical: | decreased electrical surface resistance |

Other properties that are known in the optical film or component industry to improve the performance of a optical body, film, sheet, or plate may also be incorporated into one of these regions.

Method of Manufacturing of an Optical Composite

The optical regions of the optical composite of this invention can include plates, sheets, coatings, and films of a variety of thicknesses. These structures may be manufactured using means such as film casting, sheet casting, profile extrusion, blown film extrusion, co-extrusion, injection molding, etc in accordance with embodiments of this invention. The optical composite may be used as an individual element or it may be combined with other materials or features to provide an enhanced optical composite or light emitting device such as a backlight, display, or light fixture or other illumination device. The optical composite can be combined with other elements or contain features that improve the optical performance in terms of diffuse or specular transmission or reflection, gain, haze, clarity, backscatter, angular modification of the exiting light profile (reflecting or transmitting) in one or more directions, angular modification of the exiting (reflecting or transmitting) profile for at least one polarization state in one or more directions, percent of polarization preserved, and spectral transmission or absorption properties.

There are a number of different mechanisms for producing a composite comprising asymmetric light scattering (diffusion) profiles in the volume of the region. These include creating a volumetric asymmetric region by aligning domains through stretching a material or stretching a material to cause domains to become asymmetric in shape. Other methods of alignment such as extrusion and other methods known in the industry can be used. In one embodiment of this invention, the dispersed phase domains are formed substantially spherical in shape. In another embodiment of this invention, the dispersed phase domains are formed substantially ellipsoidal in shape. In one embodiment of this invention, the dispersed phase domains are plate-like, ribbon-like, amoeba-like, fibrous, or a predetermined three-dimensional shape. In one embodiment of this invention, a method for manufacturing a composite comprises a manufacturing method for achieving dispersed domains within a volume of a material to achieve asymmetric light scattering, reflection based on polarization, light redirection, light collimation, or other optical properties comprises a method or step disclosed in U.S. Pat. Nos. 5,932, 342; 6,346,311; 5,837,346; 6,881,473; 4,983,016; 5,751,388; 5,070,157; 4,767,675; 5,473,454; 6,805,925; 6,917,396; 6,517,914; 5,783,120; 6,987,612; 6,590,705; 6,727,313; 6,111,696; 6,031,665; or 6,819,486; or U.S. Patent Application Publication No. 20060255486; 20060257679; 20060193593; 20060194487; or 20050068759, the entire contents of each patent and patent application are incorporated by reference herein.

Other modifications and methods of manufacturing anisotropic light scattering regions, and light emitting devices and configurations incorporating anisotropic light scattering elements are disclosed in U.S. Pat. No. 7,278,775, the contents of which are incorporated by reference herein. The modifications and configurations disclosed therein may be employed in an embodiment of this invention to create a uniform, efficient light emitting device comprising a composite of one embodiment of this invention.

Insert molding and extrusion lamination are two examples of processes that can be used to achieve a thickness of an optical component or composite of greater than 1 mm. In one embodiment of this invention an optical composite comprises an anisotropic light scattering region of less than 1 mm in thickness and a second substantially light transmitting region that is greater than 1 mm in thickness. In a further embodiment, the second light transmitting region is substantially transparent to light in the visible wavelength spectrum. In another embodiment, the second light transmitting region is substantially non-scattering. In a further embodiment, the composite has light redirecting features within the volume or on the surface of the light transmitting region. The mold tool or roller may include a light redirecting feature or the film inserted may contain the light redirecting feature.

In one embodiment of this invention, a linear array of LED's is optically coupled along with a light scattering film in an extrusion lamination process to a substantially non-scattering region that is thicker than the light scattering region. In a further embodiment, the linear array of LED's are formed with high temperature materials such that the melting temperature of the LED materials is higher than that of the molten extrusion material. In a further embodiment, the LED array is cooled below ambient temperature in the extrusion process such that the heat from the molten polymer is dissipated through the LED materials before causing damage.

In one embodiment of this invention, a method of manufacturing an article comprises providing a mold for injection molding, providing a light source comprising a light emitting diode with a first light emitting source surface, providing a first volumetric anisotropic light scattering diffuser film comprising a first light scattering region comprising asymmetrically shaped domains, placing the light source in a first predetermined location and first angular orientation in the mold, placing the first diffuser film a in a second predetermined location and second angular orientation in the mold, injecting a light transmitting thermoplastic material or light transmitting liquid polymer precursor material into the mold such that the light transmitting material is optically coupled to the anisotropic diffuser film. In one embodiment of this invention, the article is an optical composite. In a further embodiment, the optical composite is a component of an illuminating device such as a light fixture or backlight for a liquid crystal display.

In one embodiment of this invention the method of manufacturing an article comprises placing a second volumetric anisotropic light scattering diffuser film comprising asymmetrically shaped domains in a third predetermined location and third angular orientation in the mold before injecting material into the mold.

In a further embodiment of this invention, the mold further comprises a light collimating feature disposed to reduce the angular extent of the light incident on the light redirecting features within the light transmitting material within a plane perpendicular to the first output surface and parallel to the optical axis.

In a further embodiment of this invention, the method of manufacturing an article further comprises positioning the light source such that the light transmitting material is optically coupled to the output surface of the light source. In one embodiment of this invention, the mold comprises a patterned surface with light extracting surface features disposed thereon.

In one embodiment of this invention, the method of manufacturing an article further comprises orienting the anisotropic light scattering diffuser film containing asymmetric domains such that the asymmetric domains are aligned with their longer dimension substantially parallel to the first optical axis of the first light source.

In a further embodiment, the light source comprises an array of light emitting diodes with a first light source array axis. In one embodiment of this invention, the anisotropic diffuser film is oriented in the mold with its asymmetric domains substantially aligned with light source array axis.

In a further embodiment of this invention, a method of manufacturing a composite comprises aligning the light source such that its optical axis is substantially parallel to the first light output surface and the volumetric anisotropic light scattering film is oriented in the mold with the asymmetric domains aligned with their longer dimension substantially parallel to the first optical axis of the first light source.

In one embodiment of this invention, the light source is positioned such that the optical axis passes through a non-scattering region of the volumetric anisotropic light scattering diffuser film. In a further embodiment of this invention, the anisotropic light scattering diffuser film comprises a second light scattering region separated from the first light scattering region by a substantially non-scattering region.

In one embodiment of this invention, the optical composite includes more than one light scattering region that is co-extruded or co-laminated or extrusion laminated on one or more sides of a component, light scattering film or region or light transmitting region. In a further embodiment of this invention, a method of manufacturing a composite comprises extruding the first light transmitting material onto a substrate or carrier film. A substrate as used herein includes light transmitting materials, light scattering materials and other layers or regions suitable for coating, extruding, laminating onto. A carrier film includes substrates wherein the coating, material, layer or article is combined with the carrier film and the carrier film may be removed.

In another embodiment of this invention, a surface relief structure that asymmetrically scatters incident light is created on one or more surfaces of a optical composite through film casting, sheet casting, profile extrusion, blown film extrusion, co-extrusion, injection molding. In one embodiment, the refractive index of the non-scattering region is substantially isotropic.

The optical composite can incorporate additional features or materials to provide additional optical qualities. Examples of features include an embossment on one or more surfaces of the substrate or diffuser with a regular, random, semi-random surface feature. This surface feature can be a diffractive, holographic, prismatic, microlens, kinoform, or other structure, as described above. Additives can be used within the material to improve a number of performance requirements, including optical, mechanical, thermal, and environmental resistance.

Extrusion-casting one or more light transmitting materials can produce a sheet laminate in a continuous process. This laminate can be thermoformed into non-flat shapes in a later process.

Other methods of attaching diffusion film to a structural plastic are not as robust or a low-cost as direct insert-molding or casting. For instance, the use of optical-grade pressure-sensitive adhesive (PSA) is costly, time-consuming and has the propensity to bubble (outgas) or delaminate at high temperature. Also, merely adding pre-manufactured light-diffusion materials to the molded or cast plastic resin is expensive, limited in directional optical performance, and can have low light transmission.

In one embodiment of this invention, the dispersed domains in the volume of the light diffusion film are not damaged or deformed during high-temperature and high-pressure processing such as the addition of plastic resin structure by injection-molding or extrusion-casting. In one embodiment, the domains hold their shape during processing due to the matrix material of the light diffusing film holding its shape. In another embodiment of this invention, the domains hold their shape during processing due to their high melt temperature. In one embodiment of this invention, the melt temperature of the dispersed domain is less than the temperature of the light transmitting material used in the injection molding or extrusion process and the melting temperature of the matrix material of the light diffusing film is higher than the temperature used in the injection molding or extrusion process. In another embodiment of this invention, the glass transition temperature of the dispersed domain is less than the temperature of the light transmitting material used in the injection molding or extrusion process and the glass transition temperature of the matrix material of the light diffusing film is higher than the temperature used in the injection molding or extrusion process. In a further embodiment of this invention, the Vicat softening temperature of the dispersed domain is less than the temperature of the light transmitting material used in the injection molding or extrusion process and the Vicat softening temperature of the matrix material of the light diffusing film is higher than the temperature used in the injection molding or extrusion process. As used herein, the Vicat softening temperature refers to the ASTM D1525 (50 Newton) Vicat softening temperature.

In one embodiment of this invention, the diffusion film is wrapped around the corners of the molded structure. In a further embodiment of this invention, a method for manufacturing a composite comprises injection molded or extruded a light transmitting material such that it wraps around or encapsulates a light diffusing film, a light redirecting film, or optical composite of one embodiment of this invention.

The optical composite used in the light fixture or backlight of one embodiment of this invention may be manufactured by extrusion or casting techniques and may be embossed, stamped, or compression molded or otherwise processed wherein a light transmitting material within the composite comprises asymmetric particles substantially aligned in one direction. The optical composite, diffuser film, plate, or lens may be used with one or more light sources, reflectors, collimating films or symmetric or asymmetric scattering films to produce a light fixture. Embodiments of the invention fabricated as film or composite can be laminated or otherwise attached to plates, reflectors, or primary or secondary lens components used in light fixtures and solid state light fixtures. In this manner an article of one embodiment of this invention can be converted into a transmitting plate, reflector, or molded lens component.

One embodiment of this invention is an optical composite formed by a secondary process creating at least one additional light manipulating property such as the addition of light redirecting surface relief features.

In one embodiment of this invention, a composite comprises an anisotropic light scattering component on one side of a thicker, substantially non-scattering region with at least one additional light scattering region optically coupled to the non-scattering region. In a further embodiment, the composite comprises two anisotropic light scattering films are optically coupled to a thicker substantially non-scattering region. This can be achieved by insert molding two films or extrusion laminating on a sheet with two film feeds. In a further embodiment, a light scattering component comprising a polycarbonate continuous phase region is optically coupled to polystyrene region by extrusion laminating to the polystyrene sheet during the extrusion process. An adhesive promoter or adhesive such as a compatibilizer may be used. In this example, the refractive indexes of the polycarbonate and polystyrene are substantially indexed matched along a first axis. In this example, the composite has an increased shatter resistance or impact strength over the polystyrene due to the polycarbonate matrix film bonded to the polystyrene. In a further embodiment, an optical composite comprises two anisotropic light scattering films insert-molded on opposite sides of a PMMA region. In one embodiment of this invention, an optical composite has an impact resistance greater than that of a similar volume, size, and shape composite of one of the individual materials from with the composite is comprised. In one embodiment of this invention, a composite has an impact resistance (Izod Notched) of greater than 6 J/cm, greater than 8 J/cm, or greater than 10 J/cm.

In one embodiment of this invention, a method of making an optical composite comprises extruding a first light transmitting material as an embossed film. This first light transmitting material may be a low refractive index material such as the fluoropolymer FEP. The surface relief features are embossed or otherwise formed in the surface of the first light transmitting material and may be in the form of an array, random arrangement, or semi-random arrangement. In one embodiment the features are a linear array oriented such that the features are oriented parallel to the machine direction in a film extrusion process. In another embodiment the features are a linear array oriented such that the features are oriented perpendicular to the machine direction in a film extrusion process. In another embodiment the features are a two-dimensional array of curved features. In a further embodiment, the surface relief features are inverted light collimating features.

In one embodiment of this invention, a method of making an optical composite comprises extruding a first light transmitting material as an embossed film wherein both surfaces are embossed during the extrusion of the first light transmitting material into a first film. In a further embodiment of this invention, a method of making an optical composite comprises co-extruding a first light transmitting material and a second light transmitting material into a film wherein both surfaces are embossed during the extrusion process, such as when they are at a temperature above their Vicat softening temperature.

In one embodiment of this invention, a method of making an optical composite comprises extruding a first light transmitting material as an embossed film and subsequently feeding this film into a second extrusion process wherein a second light transmitting material is extruded onto, embossed, and bonded to the first light transmitting material. In one embodiment of this invention the first embossed film comprising inverted light collimating features is fed into an extrusion process which embosses light collimating features on a second surface or second light transmitting material extruded onto the first embossed film. In one embodiment of this invention, a composite comprises inverted light collimating features formed in a linear array substantially orthogonal to a linear array of light collimating features. In a further embodiment of this invention, a composite comprises inverted light collimating features formed as concave structures in a low refractive index material and light collimating features formed as convex structures or a substantially linear array of prismatic structures such as 90 degree prisms.

In one embodiment of this invention, a method of making an optical composite comprises: extruding a first light transmitting material as an embossed film with inverted light collimating features on a first surface; extruding a second light transmitting material onto the inverted light collimating features such that the resulting second surface becomes substantially planar. In a further embodiment, the method of making an optical composite comprises extruding a third light transmitting material onto the second surface of the first film. In a further embodiment, the method of making an optical composite comprises embossing the third light transmitting material to achieve a third surface comprising a plurality of light collimating surface features.

In a further embodiment, the method of making an optical composite comprises extruding a fourth light transmitting material onto the third light transmitting material such that the resulting fourth surface becomes substantially planar. In a further embodiment, the method of making an optical composite comprises extruding a fifth light transmitting material onto the fourth surface. In a further embodiment, the method of making an optical composite comprises embossing the fifth light transmitting material to achieve a fifth surface comprising a plurality of light collimating surface features.

In one embodiment of this invention, a method of making an optical composite comprises: extruding a first light transmitting material as an embossed film with inverted light collimating features on a first surface; extruding a second light transmitting material comprising a first plurality of dispersed phase domains of a sixth light transmitting material onto the inverted light collimating features such that the resulting second surface becomes substantially planar. In a further embodiment, the resulting dispersed phase domains are spherical or ellipsoidal in shape. In a further embodiment, the dispersed phase domains create a volumetric light scattering region within the second light transmitting material. In a further embodiment, the method of making an optical composite comprises extruding a third light transmitting material onto the second surface of the first film. In a further embodiment, the method of making an optical composite comprises embossing the third light transmitting material to achieve a third surface comprising a plurality of light collimating surface features. By incorporating light scattering domains as well as inverted collimating features and collimating features, the optical composite can increase the spatial luminance uniformity, increase color or angular luminance uniformity of incident light while providing light collimating functionality in a thinner optical composite.

Injection Molding Process

Methods, techniques, and materials suitable for injection molding of optical films are known in the art and include those referenced in U.S. Pat. No. 7,270,465 by Keh et al, U.S. Pat. No. 6,490,093 by Guest, and US Patent Application Publication No. US20070110948, the entire contents of each are incorporated herein by reference.

In one embodiment of this invention, the composite comprises a first diffuser surface in optical contact with the light transmitting material wherein the first diffuser surface substantially comprises a first diffuser film material with a melt temperature $T_{m1}$ and the light transmitting material has a second melt temperature $T_{m2}$ such that $T_{m1}-T_{m2}>20$ degrees Celsius. In another embodiment of this invention, $T_{m1}-T_{m2}$ is greater than 40 degrees Celsius. In a further embodiment, $T_{m1}-T_{m2}$ is greater than 60 degrees Celsius.

In one embodiment of this invention, the method of manufacturing the optical composite is a 2-shot injection molding process. In one embodiment, a first light transmitting material of a melt temperature $T_{m3}$ is injection molded into a mold comprising the light source. In a further embodiment, a surface of the mold is removed and a second light transmitting material of a melt temperature $T_{m4}$ is injected into the mold such that the first light transmitting material is optically coupled to the second light transmitting material and $T_{m3}-T_{m4}$ is greater than 20 degrees Celsius. In a further embodiment of this invention, $T_{m3}-T_{m4}$ is greater than 40 degrees Celsius. In another embodiment, $T_{m3}-T_{m4}$ is greater than 60 degrees Celsius. In one embodiment of this invention, the light transmitting material comprising at least one of the light redirection features or a light diffusing film is protected from thermal damage during operation of the light emitting device by a thermal buffer material of a second light transmitting material with a higher melt temperature that is optically coupled and bonded to the first light transmitting material. In one embodiment, a high temperature material such as a polycarbonate or fluoropolymer can be injection molded and optically coupled to the LED light emitting surface and material with a lower injection molding temperature such as PMMA can be used to generate the light redirecting features or optically couple to the light diffusing film such that the film does not melt nor need to be made of a high temperature material. In one embodiment, a first light transmitting polymer material is injection molded onto the light source to optically couple the light from the light source and to spread the heat during operation of the device from the light source into a larger surface area before making contact with a second light transmitting material. In this manner the heat is spread into a larger area and the material used for the second light transmitting material can have a melt temperature, glass transition temperature or Vicat softening temperature less than were it optically coupled direct to the light source (such as an LED or it's encapsulant). In one embodiment, optically coupling a first light transmitting material to the light source emitting surface transmits more light than having an air gap in-between since there is not a material-air interface upon which light will reflect.

Mold or Tool

A vacuum plate can be incorporated into the mold to securely hold the diffusion film during the insert-molding process. This ensures a flat surface or conformal surface for the incoming molten resin, and prevents the film from distorting or tearing during the injection molding processing. Also, the vacuum plate provides some cooling to the adjacent film surface, to moderate the temperature rise during molding. This minimizes the risk—and subsequent yield loss—from diffusion film distortion in the lamination. In one embodiment, the back surface of the film is actively or passively cooled to reduce thermal degradation upon contact with the molten polymer. In one embodiment, at least one of a heat sink, heat pipe, fan, thermoelectric cooler, or Synjet module (Nuventix Inc.), circulation or open loop liquid cooling is used to lower the temperature of the film to below that of either room temperature, 20° F. below room temperature, or more than 30° F. below room temperature.

The mold surface that contacts the diffusion film during processing can have physical features which will be transferred to the film surface during molding (such as a prism structure to collimate light).

The mold may contain light redirecting features that may be concave, convex, prismatic or other structure that when the inverse is formed into a light transmitting material, the light incident to the structure from a pre-determined angular range is collimated, extracted from the lightguide, diffused or scattered from the waveguided, etc.

Extrusion Process

In one embodiment of this invention, a method of manufacturing an article comprises: a) providing a first light transmitting material of refractive index $n_{L1x}$ in a first axis x; b) extruding the first light transmitting material into a first film comprising a first surface and a second surface; c) embossing the first surface of the first film to achieve a first plurality of inverted light collimating surface features on the first surface; d) extruding a second light transmitting material of refractive index $n_{H2x}$ in the first axis x onto the first surface of the first film forming a substantially planar third surface; e) extruding a third light transmitting material of refractive index $n_{H3x}$ in the first axis x onto the second surface of the first film; f) embossing the third light transmitting material to achieve a fourth surface comprising a plurality of light collimating surface features.

In one embodiment of this invention, the method of manufacturing a composite comprises thermally embossing one or more surfaces of the optical composite, an intermediate film or layer or light transmitting material.

In one embodiment of this invention, the method of manufacturing a composite comprises thermally embossing the first surface of the first film during extrusion of the first light transmitting material. In one embodiment of this invention, the method of manufacturing a composite comprises extruding the second light transmitting material such that the inverted light collimating features have a dimensional size after the second light transmitting material is extruded onto the inverted light collimating surface features that is between 80% to 120% of the size before extrusion of the second light transmitting material along each of the first axis x direction, a second axis y direction orthogonal to the first axis x direction, and third axis z direction orthogonal to the first axis x direction and second axis y directions.

In one embodiment of this invention, the method of manufacturing a composite comprises extrusion wherein light wherein $n_{H2x} > 1.56$ and $n_{L1x} < 1.47$. In one embodiment of this invention, the high refractive index of the second light transmitting material and the low refractive index of the first light transmitting material form a surface relief feature.

In one embodiment of this invention, the method of manufacturing a composite comprises extruding the second light transmitting material and the third light transmitting material substantially at the same time. In one embodiment, the second and third materials are co-extruded on the same manufacturing line such that the heated polymers are extruded onto the first film and optically coupled to the first film or embossed before they cool to room temperature. In another embodiment of this invention, the method of manufacturing a composite comprises extruding the second light transmitting material wherein the third light transmitting material and the second light transmitting material are substantially the same material.

In a further embodiment of this invention, the optical coupling and embossing of the third light transmitting material occur substantially at the same time. In a further embodiment of this invention, the optical coupling and embossing of the third light transmitting material occur in substantially same region of a manufacturing line. For example, the third light transmitted material may be a thermoplastic material extruded from a die onto the first light transmitting material, onto an embossing roll, or onto both wherein the embossing roll forms surface features while pressing the thermoplastic material onto the first light transmitting material before the thermoplastic has cooled to its Vicat softening temperature or melt temperature.

In one embodiment of this invention, the method of manufacturing a composite comprises UV embossing, vacuum forming, stamping, bulk casting, machining or thermally embossing a light transmitting material as disclosed in U.S. Pat. Nos. 5,056,892; 4,906,070; 5,183,597; 6,096,247; 6,808,658; 6,445,504; 5,126,882; 6,110,401; 7,092,163; 6,585,920, 6,469,830; 6,896,755 or U.S. Patent Application Publication Nos. 20060204720; 20070275215; 20060142448; or 20020154406; the contents of each are incorporated by reference herein.

Other methods suitable for embossing or otherwise forming surface relief structures are known in the field of optical film production including stamping and holographic or diffractive structures and may be used in accordance with an embodiment of this invention In one embodiment of this invention, the method of manufacturing a composite comprises embossing the first surface of the first light transmitting material using a radiation cured embossing process wherein the first light transmitting material is a radiation curable polymer.

In one embodiment of this invention, the method of manufacturing a composite comprises embossing the second light transmitting material using a radiation cured embossing process wherein the second light transmitting material is a radiation curable polymer. In one embodiment of this invention, the method of manufacturing a composite comprises extruding the second light transmitting material and curing the material when it is in contact with a substantially smooth roll or surface wherein the second light transmitting material is a radiation curable polymer.

In one embodiment of this invention, the method of manufacturing a composite comprises embossing the third light transmitting material using a radiation cured embossing process wherein the third light transmitting material is a radiation curable polymer.

In one embodiment of this invention, the method of manufacturing a composite comprises embossing the first surface wherein the first light transmitting material is extruded onto a substrate or carrier film.

In another embodiment of this invention, the method of manufacturing a composite comprises embossing the first surface wherein the first light transmitting material further comprises a first plurality of dispersed domains of a light transmitting material of refractive index $n_{H4x}$.

In one embodiment of this invention, the method of manufacturing a composite comprises extruding the first light transmitting material wherein the extrusion elongates the plurality of first dispersed domains along a first elongation direction.

In another embodiment of this invention, the method of manufacturing a composite comprises embossing a surface with inverted light collimating surface features wherein the inverted light collimating surface features comprise an array of grooves within the first light transmitting material and the light collimating surface features comprise an array of protruding prisms of the third light transmitting material oriented substantially orthogonal to the array of grooves.

In another embodiment of this invention, the method of manufacturing a composite comprises embossing a surface with inverted light collimating surface features wherein the article is an optical film or composite and the average separation, d, between the valley regions of the inverted light collimating surface features and the valley regions of the light collimating surface features is less than 25 microns or less than 15 microns in the thickness direction of the optical film or composite. The use of a low refractive index material as the first light transmitting material with embossed inverted light collimating features can enable the thickness of the composite to be substantially reduced due to the ability coat the light collimating surface features directly onto the low refractive index material without requiring a separate, substantially planar supporting substrate as is commonly used with light collimating films such as BEFII from 3M. In addition, the average separation between the valley regions of the inverted light collimating surface features and the valley regions of the light collimating surface features, d, can be less than that wherein two films are coupled by lamination or adhesive since at least one of the second or third light transmitting materials do not need a substantially planar supporting substrate.

In one embodiment of this invention, the composite has an average separation, d, between the valley regions of the inverted light collimating surface features and the valley regions of the light collimating surface features that is less than 25 microns or less than 15 microns in the thickness direction of the optical film or composite wherein the total thickness, t, of the composite is greater than 200 microns. In one embodiment of this invention, a first composite has a separation d is less than 25 microns or less than 15 microns in the thickness direction and a second composite is formed by optically coupling the first composite to a light transmitting material such that the thickness of the second composite is greater than 200 microns.

In one embodiment, the thickness of the optical composite, t, is less than 50 microns more than the combined maximum height of the light collimating surface features, h, and maximum depth of the inverted light collimating surface features, g, such that t−(h+g)<50 microns. In one embodiment, the thickness of the optical composite, t, is less than 30 microns more than the combined maximum height of the light collimating surface features, h, and maximum depth of the inverted light collimating surface features, g, such that t−(h+g)<30 microns. In one embodiment, the thickness of the optical composite, t, is less than 20 microns or less than 10 microns more than the combined maximum height of the light collimating surface features, h, and maximum depth of the inverted light collimating surface features, g, such that t−(h+g)<20 microns or such that t−(h+g)<10 microns.

In another embodiment of this invention, a light emitting device comprises an optical composite wherein the light emitted is more collimated relative to the device without the composite.

In another embodiment of this invention, the method of manufacturing a composite comprises a) manufacturing a light transmitting film with inverted light collimating surface features in a first light transmitting material; b) coupling optically a second light transmitting material to the inverted light collimating surface features; and c) coupling optically and embossing a third light transmitting material onto the light transmitting film.

In another embodiment of this invention, the method of manufacturing a composite comprises coupling optically and embossing the third light transmitting material on the same processing or manufacturing line.

In another embodiment of this invention, the method of manufacturing a composite comprises extruding, coating, or laminating a first light transmitting material and extruding, coating, or applying a third light transmitting to the first light transmitting material wherein the refractive index of the first light transmitting material is less than 1.47 and the refractive index of the third light transmitting material is greater than 1.56 in a first axis x.

In one embodiment of this invention, a composite or layer or film used in the production thereof comprises skin layers. Skin layers can be added to the composite to protect layers comprising dispersed domains or other optical layers from the effects of wall stress and possible resulting flow instabilities. Other reasons for adding a thick layer at the surface(s) of the film include, e.g., surface properties such as adhesion, coatability, release, coefficient of friction, and barrier properties, weatherability, scratch and abrasion resistance, and others. In multilayer films that are subsequently uniaxially or very unequally biaxially drawn, "splittiness," (i.e., the tendency to tear or fail easily along the more highly drawn direction), can be substantially suppressed by choosing a skin layer polymer that (1) adheres well to the sub-skin or nearest optical layer polymer and (2) is less prone to orientation upon draw. An example of a useful skin layer, where the optical stack contains a PEN homopolymer, is a copolymer of PEN having a comonomer content sufficient to suppress crystallinity and/or crystalline orientation. Marked suppression of splittiness is observed in such a structure, compared to a similar film without the coPEN skin layer(s), when the films are highly drawn in one planar direction and undrawn or only slightly drawn in the orthogonal planar direction. One skilled in the art will be able to select similar skin layer polymers such as PET homopolymers to complement other optical layer polymers and/or sub-skin polymers.

Temperature control is important in the feedblock and subsequent flow leading to casting at the die lip. While temperature uniformity is often desired, in some cases, deliberate temperature gradients in the feedblock or temperature differences of up to about 40° C. in the feed streams can be used to narrow or widen the stack layer thickness distribution. Feed streams into the PBL or skin blocks can also be set at different temperatures than the feedblock average temperature. Often, the PBL or skin streams are about 40° C. higher than the feed stream temperature to reduce viscosity or elasticity in the protective streams and thus enhance their effectiveness as protective layers. Sometimes, the protective streams' temperature can be decreased up to about 40° C. to improve the rheology matching between them and the rest of the flow stream. For example, decreasing the temperature of a low viscosity skin may enhance viscosity matching and enhance flow stability. Other times, elastic effects need to be matched.

Conventional means for heating the feedblock-multiplier-die assembly, namely, the use of insertion- or rod- or cartridge-type heaters fitted into bores in the assembly, are frequently incapable of providing the temperature control required for the inventive optical films. Preferably, heat is provided uniformly from outside the assembly by (i) tiling its exterior with plate-type heaters, (ii) insulating thoroughly the entire assembly, or (iii) combining the two techniques. Plate-type heaters typically use a resistance-heating element embedded in a metal material, such as cast aluminum. Such heaters can distribute heat uniformly to an apparatus, such as, e.g., the feedblock.

In one embodiment of this invention, a polymer web is cast onto casting roll, sometimes referred to as a casting wheel or casting drum. The casting roll is preferably chilled to quench the web and begin the formation of a film or composite. Preferably, casting is assisted by electrostatic pinning, the details of which are well-known in the art of polyester film manufacture. For the inventive optical films, care should be exercised in setting the parameters of the electrostatic pinning apparatus. Periodic cast web thickness variations along the extrusion direction of the film, frequently referred to as "pinning chatter," should be avoided to the extent possible. Adjustments to the current, voltage, pinning wire thickness, and pinning wire location with respect to the die and the casting chill roll are all known to have an affect, and should be set on a case-by case basis by one skilled in the art.

The web can sometimes attain a sidedness in surface texture, degree of crystallinity, or other properties due to wheel contact on one side and merely air contact on the other. This can be desirable in some applications and undesirable in others. When minimization of such sidedness differences is desired, a nip roll can be used in combination with the casting roll to enhance quenching or to provide smoothing onto what would otherwise be the air side of the cast web.

In some cases, it is desired to provide the composite, film or layer with a surface relief structure or roughness or surface texture to improve handling in winding and/or subsequent conversion and use such removing wetting out or Newton's Rings.

Optical Composite as a Light Emitting Device or Component Thereof

In one embodiment of this invention, a light emitting device comprises a composite and at least one light source. In one embodiment of this invention, a light fixture comprises the injection molded article of one embodiment of this invention and a housing. In another embodiment of this invention, a backlight or light emitting device comprises the optical composite of one embodiment of this invention. In another embodiment of this invention, a backlight or light emitting device further comprises at least one of a light diffusing film, light collimating film, brightness enhancing film, polarizer or other film or optical component known to provide light control or re-direction in a backlight or light fixture. In one embodiment of this invention, a liquid crystal display comprises the backlight of one embodiment of this invention. In another embodiment of this invention, a light fixture or illumination apparatus comprises the light emitting device of one embodiment of this invention. In one embodiment, a light emitting device comprises a composite wherein the light emitted is more collimated relative to the device without the optical composite.

In one embodiment of this invention, a light fixture comprising an optical composite has a first glare ratio, G1 of less than 30% wherein the first glare ratio is defined as the luminance at 50 degrees divided by the luminance at 0 degrees in a first output plane. In a further embodiment of this invention, a light fixture comprising an optical composite has a first glare ratio less than 20%, 10% or 5% in a first output plane.

In one embodiment of this invention, a light fixture comprising an optical composite has a second glare ratio, G2 of less than 30% wherein the second glare ratio is defined as the luminance at 50 degrees divided by the luminance at 0 degrees in a second output plane orthogonal to the first output plane. In a further embodiment of this invention, a light fixture comprising an optical composite has a second glare ratio less than 20%, 10% or 5% in a second output plane.

In one embodiment of this invention, a light fixture comprising an optical composite has a first glare ratio less than 30% and a second glare ratio greater than 30%.

In one embodiment of this invention, the composite comprises a low refractive index first light transmitting material with inverted light collimating surface features and high refractive index materials optically coupled to both surfaces of the first light transmitting material and light collimating surface features such that the glare is reduce at higher angles such as 50 degrees due to increased collimation along one or more output planes.

In one embodiment of this invention, the optical composite creates a lightguide with luminance uniformity greater than 70% when illuminated by one or more light sources.

The composite of this invention can be used to provide improved luminance uniformity and angular light distribution when illuminated from the edge. The optical composite can be used to provide illumination to an area such as a room, hallway, building, exterior surface, etc. In one embodiment of this invention a light fixture comprises an optical composite and a light source. The optical composite of this invention can be used as a lightguide for illuminating a spatial light modulating device such as an LCD. In one embodiment, the optical composite illuminates an LCD providing spatial luminance uniformity. The backlight or optical composite may comprise one or more light re-directing, brightness enhancement, prismatic films, reflective or absorptive polarizers, non-polarization dependent light homogenizer, polarization-dependent light homogenizer, or other optical films commonly used in backlights for displays or light fixtures may also be used to provide improved light efficiency, re-direction, or recycling.

Optical Composite Location

The optical composite may be located in a backlight between the light-emitting sources and the display. In one embodiment, the optical composite is located between a linear array of light sources and a liquid crystal cell. In another embodiment, the optical composite is disposed between a light source and a light output surface of a light emitting device.

Light Emitting Device Thickness

In one embodiment of this invention, the light emitting device is a direct-lit type. In another embodiment of this invention, the light emitting device is an edge-lit type which can generally be made thinner than a direct-lit type. In one embodiment of this invention, the optical composite increases the uniformity, reduces the thickness and provides increased collimation. In one embodiment of this invention, the light recycling and uniformity derived from the light reflecting region and the spatial filtering from the light transmitting region and lenticular lens array reduces the thickness of an edge-lit light emitting device. In one embodiment of this invention, a light emitting device comprises at least one LED light source, a waveguide, and a optical composite and the distance between the surface of the waveguide the furthermost from the light output surface and light output surface of the light emitting device is less than one selected from the group of 1.5 millimeters, 1 millimeter and 0.5 millimeters.

In a further embodiment of this invention, a light emitting device comprises an optical composite (comprising the light output surface of the light emitting device), an optical waveguide, and a white diffusely reflecting film opposite the light output side of the waveguide.

In a further embodiment of this invention, a light emitting device comprises an optical composite and at least one of the light sources, optical elements, films or waveguides disclosed in an embodiment of U.S. Pat. No. 5,594,830, the contents of which are incorporated by reference herein.

Other Films and Components

In one embodiment of this invention, a optical composite comprises a lenticular lens array, at least one of a light absorbing or light reflecting region designed to direct light along a direction such that the light can effectively be coupled out from the waveguide spatially such that the uniformity of the light exiting the element is improved when illuminated from the edge. In one embodiment of this invention, an optical composite comprises a lenticular lens array optically coupled to at least one of a light reflecting region with light transmitting apertures or a light absorbing region with light transmitting apertures, where one region is optically coupled to a waveguide.

In another embodiment of this invention a light emitting device comprises an optical composite and at least one additional collimating element such as a 90 degree apex angle prismatic film. By pre-conditioning the light incident on the light filtering collimating element, more light is transmitted and the FWHM angular output angles of the light emitting device along one or more output planes is reduced relative to a light emitting device comprising just the light recycling directional control element. In one embodiment of this invention, a light emitting device comprises two crossed 90 degree prismatic collimating films and an optical composite such that the angular width of the FWHM intensity profile within one output plane is less that 15 degrees. In an additional embodiment of this invention, a light emitting device comprises two crossed 90 degree prismatic collimating films and a optical composite such that the angular width of the FWHM intensity profile within one output plane is less that 10 degrees. In another embodiment of this invention, a light emitting device comprises two crossed 90 degree prismatic collimating films and an optical composite such that the FWHM along one output plane is less than 8 degrees. In another embodiment of this invention, a light emitting device comprises one 90 degree prismatic collimating film and an optical composite such that the FWHM along one output plane is less than 70 degrees.

In another embodiment of this invention, a light emitting device comprises a composite further comprising dispersed phase domains dispersed within the substrate or light transmitting region as describe in U.S. Patent Application Publication No. 20070201246, the contents of which is incorporated herein by reference. In this embodiment, the angular width of the FWHM intensity profile within one output plane is less than one selected from the group of 8 degrees, 10 degrees, 15 degrees or 20 degrees. In another embodiment of this invention, a light emitting device comprises a 90 degree prismatic collimating film disposed above a optical composite wherein the prisms are oriented substantially orthogonal to the dispersed phase domains and further comprises a second 90 degree prismatic film disposed on the opposite side of the optical composite providing brightness and uniformity enhancement, a waveguide, and at least one light emitting diode. In one embodiment of this invention, the use of at least one brightness enhancing or collimating film along with an optical composite which comprises a light reflecting region permits more light to pass through the optical composite due to the more highly collimated incident light profile upon the light recycling directional control element. In one embodiment of this invention, a light filtering collimating element, backlight, light fixture, or light emitting device comprising the same, comprises at least one collimating film selected from the group of BEF, BEF II, BEF III, TBEF, BEF-RP, BEFII 90/24, BEF II 90/50, DBEF-MF1-650, DBEF-MF2-470, BEFRP2-RC, TBEF2 T 62i 90/24, TBEF2 M 65i 90/24, NBEF, NBEF M, Thick RBEF, WBEF-520, WBEF-818, OLF-KR-1, and 3637T OLF Transport sold by 3M, PORTGRAM V7 sold by Dai Nippon Printing Co., Ltd., LUMTHRU that sold by Sumitomo Chemical Co., Ltd. and ESTINAWAVE W518 and W425 DI sold by Sekisui Chemical Co., Ltd.

The light emitting device may also comprise an optical composite and a light re-directing component that re-directs a substantial portion of the light into an off-axis orientation. In one embodiment of this invention, a light emitting device comprises a optical composite and a non-symmetrical prismatic film such as a Image Directing Film (IDF or IDFII) or Transmissive Right Angle Film (TRAF or TRAFII) sold by 3M. In one embodiment of this invention, a light emitting device comprises a optical composite and a non-symmetrical prismatic film. In one embodiment of this invention, a light emitting device comprises an optical composite and a symmetrical prismatic film to re-distribute the light symmetrically about an axis such as a prismatic film with a 60 degree apex angle with the prisms oriented toward the output surface. In other embodiments of this invention, a composite or a light emitting device comprising a composite, comprises a lenticular lens array, a light reflecting region, light transmitting regions, and a linear prism film with an apex angle between 45 degrees and 75 degrees where the substrate of the linear prism film is coupled directly or through another layer to the light reflecting regions with the prisms oriented away from the lenticules. In another embodiment of this invention, the linear prism film is a "reverse prism film" such as sold by Mitsubishi Rayon Co., Ltd. under the trade names of DIA ART H150, H210, P150 and P210, or is a prismatic film of a similar type as disclosed in the embodiments within U.S. Pat. Nos. 6,545,827; 6,151,169; 6,746,130; and 5,126,882, the contents of which are incorporated by reference herein.

Polarization sensitive light homogenizers such as those discussed in U.S. patent application Ser. No. 11/828,172, the contents of which are incorporated by reference herein, may be used as the anisotropic light scattering film, an additional film within the optical composite or in conjunction with the optical composite to form a backlight or light fixture. One or more of the anisotropic light scattering films or regions disclosed herein may be a high clarity scattering layer such as those described in U.S. patent application Ser. No. 11/958,361, the contents of which are incorporated by reference herein. Multi-functional non-imaging optical components such as those discussed in U.S. patent application Ser. No. 12/030,203, the contents of which are incorporated by reference herein, may be used as the anisotropic light scattering film, an additional film within the optical composite or in conjunction with the optical composite to form a backlight or light fixture.

In one embodiment of this invention, a light emitting device comprises an LED array on a flexible circuit disposed in a circular or arc shape in proximity to a waveguide within an optical composite or as a separate component from the light recycling directional control element. In one embodiment of this invention, a light emitting device comprising a composite further comprises a circular array of LED's on flexible circuit such that the light from the LED's is directed inward toward the center of a circular disc-shaped waveguide comprising light extraction elements of at least one type selected from the group of embossed features, laser-ablated features, stamped features, inked surface patterns, injection molded features, etched surface patterns, sand or glass-blasted micro-patterns, UV cured embossing patterns, dispersed phase particle scattering, scattering from region comprising beads, fibers or light scattering or diffracting shapes. In one embodiment of this invention, the light emitting device in the previous embodiment further comprises a light recycling directional control element. In this embodiment, the light emitting device can illuminate a circular display.

One or more elements or films within the light emitting device or optical composite may be combined by using adhesives (such as pressure sensitive adhesives), thermally bonding, co-extrusion, insert molding, and other techniques known to combine two polymeric films or elements. In one embodiment of this invention, a optical composite comprises an element with surface relief structures of a first material with a first refractive index $n_s$ that is at least one of a lenticular lens array and light collimating element wherein the element is physically coupled to second optical element by using second material with a second refractive index $n_c$ such that $n_s-n_c>0.01$. In this embodiment, the lenticular lens array or collimating element can be physically coupled to another element while still retaining a level of refraction or reflection. In another embodiment, the value $n_s-n_c$ is greater than one selected from the group of 0.05, 0.1, 0.2, 0.4 or 0.5. In one embodiment, the lenticular lens array or collimating element or light transmitting material with a surface relief structure is made of a high refractive index UV curable material.

In one embodiment of this invention, the optical composite (or light emitting device comprising the same) comprises at least one coating or component selected from the group of anti-reflection coating or film, anti-glare film or coating, tinted film or coating, colored coating or tint, light scattering coating or film, hard-coating or film comprising a hard-coating, housing or element to hold more than one component together, element to enable rotation or translation of one or more elements relative to the other.

In another embodiment of this invention, a light emitting device comprises an electrical device for controlling the color (such as individually adjusting the output from a red, green and blue LED), angular light output profile (such as by moving a lens), direction of the light output profile, intensity of the light output, and mode of operation.

The composite may comprise additional layers to provide functional properties such as improved extrusion, UV protection, slip promotion, increased toughness, adhesion promotion, conductive layers, anti-static properties, shatter resistance, etc.

As further steps in the process of making the optical composite of the present invention, various layers or coatings may be applied to at least a portion of one or both sides of the composite to modify or enhance the physical, chemical, or optical characteristics of the film. These layers or coatings may be integrated at the time of film formation, either by coextrusion or in a separate coating or extrusion process, or they may be applied to the finished optical film at a later time.

The composites and light emitting devices of the present invention may further be laminated to rigid or semi-rigid substrates, such as, for example, glass, metal, acrylic, polyester, and other polymer backings to provide structural rigidity, weatherability, or easier handling. For example, the optical films of the present invention may be laminated to a thin acrylic or metal backing so that it can be stamped or otherwise formed and maintained in a desired shape. For some applications, such as when the composite is applied to other breakable backings, an additional layer comprising PET film or puncture-tear resistant film may be used.

Various optical layers, materials, and devices may also be applied to, or used in conjunction with the composites and light emitting devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent film for low emissivity applications; release films or release coated paper; and polarizers or mirrors. Multiple additional layers on one or both major surfaces of the composite are contemplated, and can be any combination of aforementioned coatings or films. For example, when an adhesive is applied to the optical film, the adhesive may contain a white pigment such as titanium dioxide to increase the overall reflectivity, or it may be optically transparent to allow the reflectivity of the substrate to add to the reflectivity of the optical film.

For some applications, it may also be desirable to provide the composites and light emitting devices of the present invention one or more layers having continuous and disperse phases in which the interface between the two phases will be sufficiently weak to result in voiding when the film is oriented. The average dimensions of the voids may be controlled through careful manipulation of processing parameters and stretch ratios, or through selective use of compatibilizers. The voids may be back-filled in the finished product with a liquid, gas, or solid.

In one embodiment of this invention, the composite comprises one or more layers, coatings or films or additives described in U.S. Pat. No. 6,808,658, the contents of which are incorporated by reference herein.

Skin Layers

A non-optical layer of material may be coextensively disposed on one or both major surfaces of the film or composite. The composition of the layer, also called a skin layer, may be chosen, for example, to protect the integrity of the optical layers, to add mechanical or physical properties to the final film or to add optical functionality to the final film. Suitable materials of choice may include the material of one or more of the optical layers. Other materials with a melt viscosity similar to the extruded optical layers may also be useful. It should also be noted that many of the mechanical advantages derived from skin layers can also be derived from an analogous internal thick non-optical layer.

A skin layer or layers may reduce the wide range of shear intensities the extruded multilayer stack might experience within the extrusion process, particularly at the die. A high shear environment may cause undesirable deformations in the optical layers. A skin layer or layers may also add physical strength to the resulting composite or reduce problems during processing, such as, for example, reducing the tendency for the film to split during the orientation process. Skin layer materials that remain amorphous can result in films having a higher toughness, while skin layer materials that are semicrystalline can result in films having a higher tensile modulus. Other functional components such as antistatic additives, UV absorbers, dyes, antioxidants, and pigments, may be added to the skin layer, provided they do not substantially interfere with the desired optical properties of the resulting product. Skin layers or coating may also be used to aid in post-extrusion processing; for example, by preventing sticking of the film to hot rollers or tenter clips.

Skin layers or coatings may also be added to impart desired barrier properties to the resulting film or device. Thus, for example, barrier films or coatings may be added as skin layers, or as a component in skin layers, to alter the transmitting properties of the film or device towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film. Such a skin layer, however, should not unduly compromise the optical properties required for the application to which the film is directed.

Skin layers or coatings may also be added to impart or improve puncture and/or tear resistance in the resulting article. Thus, for example, in embodiments in which the outer layer of the optical film contains coPEN, a skin layer of monolithic coPEN may be coextruded with the optical layers to impart good tear resistance to the resulting film. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the optical film. Adhering these layers to the optical film during the manufacturing process, such as by a coextrusion process, provides the advantage that the optical film is protected during the manufacturing process. In some embodiments, one or more puncture or tear resistant layers may be provided within the optical film, either alone or in combination with a puncture or tear resistant skin layer.

The skin layers may be applied to one or two sides of the extruded optical composite at some point during the extrusion process, i.e., before the extruded and skin layer(s) exit the extrusion die. This may be accomplished using conventional coextrusion technology, which may include using a three-layer coextrusion die. Lamination of skin layer(s) to a previously formed film or composite is also possible. Total skin layer thicknesses may range from about 2% to about 50% of the total optical stack/skin layer thickness.

In some applications, additional layers may be coextruded or adhered on the outside of the skin layers during manufacture of the composite. Such additional layers may also be extruded or coated onto the optical film in a separate coating operation, or may be laminated to the optical film as a separate film, foil, or rigid or semi-rigid substrate such as polyester (PET), acrylic (PMMA), polycarbonate, metal, or glass.

Many light transmitting materials such as polymers are suitable for skin layers. Of the predominantly amorphous polymers, suitable examples include copolyesters based on one or more of terephthalic acid, 2,6-naphthalene dicarboxylic acid, isophthalic acid phthalic acid, or their alkyl ester counterparts, and alkylene diols, such as ethylene glycol. Examples of semicrystalline polymers suitable for use in skin layers include 2,6-polyethylene naphthalate, polyethylene terephthalate, and nylon materials Skin layers that may be used to increase the toughness of the optical film include high elongation polyesters such as ECDEL™ and PCTG 5445 (available commercially from Eastman Chemical Co., Rochester, N.Y.) and polycarbonates. Polyolefins, such as polypropylene and polyethylene, may also be used for this purpose, especially if they are made to adhere to the optical film with a compatibilizer.

Collimating and Diffusing Films

One or more collimating films and diffuser films may be used within light emitting device of this invention including an optical composite in order to achieve the desired light output profile from the light emitting device such as in a backlight illuminating a display and a display having a particular light output profile. In one preferred embodiment, a prismatic collimating film is used in the backlight to direct light from large angles in the vertical direction (as viewed in a typical television display application) toward the direction normal to the display. Two collimating films of linear arrays of prisms that are arranged perpendicular to each other (crossed prismatic films) may be used to further increase the amount of light directed perpendicular to the surface of the backlight or display. Diffusing films that contain surface features may provide collimating properties as well as diffusion properties. The diffusing properties may also help to reduce the visibility of features such as the tips of the prismatic arrays. In some embodiments, a diffusion film is located between the optical composite and the prismatic collimating film. In another embodiment, a diffuser film is located between the prismatic film and the display. In another embodiment, more than one diffuser film is located between the optical composite and the display and a prismatic film is not used.

Polarizers

Reflective polarizers may be used to improve the light recycling of the optical composite. This provides additional recycling of polarization that would normally be absorbed in the bottom polarizer of a liquid crystal display. Reflective polarizers may reflect linear or circularly polarized light. In some embodiments a linear reflective polarizer is used between the collimating film and liquid crystal display. In another preferred embodiment, a reflective polarizer is used between the optical composite and the display.

Light Sources

The light source used within one embodiment of this invention is at least one selected from the group of fluorescent lamp, cold-cathode fluorescent lamp, compact fluorescent, radiofluorescent, halogen, incandescent, Mercury vapor, sodium vapor, high pressure sodium, metal halide, tungsten, carbon arc, electroluminescent, LED, OLED, laser, photonic bandgap based light source. In one embodiment of this invention, the light source is a transparent OLED such as those produced by Universal Display Corporation. In a further embodiment of this invention, at least one of the light transmitting regions (or material) comprises a phosphor or phosphorescent material and the light source emits light capable of exciting the phosphor. In one embodiment of this invention, the light transmitting region contains at least one phosphor material such that substantially blue or UV light from at least one LED incident on the phosphor will cause the phosphor to emit light which will be substantially collimated or directed by the lenticular lens array or beads. By using a phosphor material in the light transmitting regions which will effectively convert the wavelength and transmit light, the light emitting device can be made more uniform by light recycling and reflection from the light reflecting regions of a optical composite and the output will direction will be efficiently controlled. In one embodiment of this invention, a light emitting device comprises an organic light emitting diode (OLED) and an optical composite where the angular width of the output of the light emitting device is less than the angular width of the output of the OLED light source.

The optical axis of the light source is defined herein as the axis of light emitted from the light source with the highest intensity. With some light sources, this axis may be parallel, perpendicular or at an angle to a physical edge or surface of the light source. With top emitting LEDs, the optical axis is typically normal to the output surface. With side emitting LEDs the optical axis can be parallel to a mounting plane or in the case of an LED with a side-emitting primary optic, the LED may have more than one optical axis extending in a radial plane or cone from the light source.

In one embodiment of this invention, the light source comprises an array of light emitting devices. In a further embodiment, the light source is a linear array of LEDs aligned parallel to an axis, thus defining the light source axis.

Other Configurations or Components

The different variations in features and designs of the optical composite light emitting device and method of manufacture described herein can be envisioned and include one or more combinations of the features described below:

1. Light sources: CCFL; LED; OLED; electroluminescent material; laser diode; carbon nanotube; fluorescent bulb; substantially planar fluorescent bulb; halogen bulb; incandescent bulb; metal halide bulb;
2. Light source color: Red; green; blue; white; cyan; magenta; yellow;
3. Light source location: in a plane substantially parallel to the display surface; beneath the display; one edge of the waveguide; more than one edge of a waveguide; opposite side of the waveguide than the liquid crystal cell; within the waveguide;
4. Light source configuration: linear array; grid array; regularly positioned; irregularly positioned; in red, green and blue clusters; color based arrays;
5. Spacing between light-scattering regions, collimating films, display, polarizers, diffuser films, and diffusing plates: air gap; optically coupled.
6. Scattering region:
    a. Scattering region location: above the light source; beneath the display; above collimating film(s); below collimating film(s); in-between collimating films; within the collimating structures; in the substrate of the collimating structures; on the surface of the optical composite; within the volume of the optical composite; in regions of the substrate or collimating structures separated by a non-scattering region; within a polarizer; on the surface of a polarizer; within an adhesive layer;

b. Diffusing domain shapes: symmetric domains; asymmetric domains; a combination of asymmetric and symmetric domains.
c. Diffusing domains refractive index: average refractive index $n_d$ wherein $|n_d-n_m|>0.001$; domain refractive index $n_{dx}$, $n_{dy}$, and $n_{dz}$ in the x, y, and z directions, respectively, and matrix refractive index $n_{mx}$ and $n_{my}$ and $n_{mz}$ in the x, y, and z directions respectively, wherein $|n_{dx}-n_{mx}|>0.01$; $|n_{dy}-n_{my}|>0.01$; or $|n_{dz}-n_{mz}|>0.01$; $|n_{dx}-n_{mx}|<0.005$; $|n_{dy}-n_{my}|<0.005$; or $|n_{dz}-n_{mz}|<0.005$;
d. Diffusing domains concentration: less than 1% by weight; greater than 1% and less than 40% by weight; between 40% and 50% by weight; greater than 50% by weight;
e. Asymmetric domain alignment: substantially parallel to an edge of the display; substantially perpendicular to an edge of the display; or at an angle beta with respect to an edge of the display; substantially parallel to an array of light sources; substantially perpendicular to a an array of light sources or at an angle beta with respect to an array of light sources; substantially parallel to an array of collimating features; substantially perpendicular to a an array of collimating features or at an angle beta with respect to an array of collimating features.
7. Collimating region type: Prismatic; microlens; pyramidal; conical; hemispherical; array of refractive features; array of diffractive features; array of light-scattering features;
8. Collimating region orientation: substantially parallel to an array of light sources; substantially perpendicular to a an array of light sources or at an angle beta with respect to an array of light sources; substantially parallel to an edge of the display; substantially perpendicular to an edge of the display; or at an angle beta with respect to an edge of the display;
9. Light redirecting region type: Prismatic; microlens; pyramidal; conical; hemispherical; array of refractive features; array of diffractive features; array of light-scattering features;
10. Light redirecting region orientation: substantially parallel to an array of light sources; substantially perpendicular to a an array of light sources or at an angle beta with respect to an array of light sources; substantially parallel to an edge of the display; substantially perpendicular to an edge of the display; or at an angle beta with respect to an edge of the display;
11. Light-collimating region or light-redirecting region containing arrays of prisms:
a. Prism Pitch: Constant; non-constant (irregular); random.
b. Prism Orientation: At an angle, phi, with respect to a predetermined edge; or at an angle phi2, wherein phi2 varies across the length of the prisms.
c. Prism height: Constant; varying lengthwise across the length of the prisms; varying from one prism to another.
d. Prism Apex angle: At a constant angle, alpha; or at an angle alpha2, wherein alpha2 varies across the length of the prisms; or at an angle alpha3, wherein alpha3 can vary from one prismatic structure to the next
e. Prism structure refractive index: $n_m$, with the region in optical contact with the prism structure having a refractive index $n_1$ wherein $n_m>n_1$.
f. Surface structure on sheet face opposite prism face: planar; prismatic; microlens array; surface relief structure providing pre-determined angular scattering (included ruled structure, holographic diffuser); any combination of the above structures.
12. Polarization-sensitive light-scattering region type: Reflective; absorptive; linear; circular; partially reflective and absorptive;
13. Polarization-sensitive light-scattering region location: between the display and light source; between a collimating film and the optical composite; between a diffuser film and a collimating film; between the optical composite and a diffuser film;

FIG. 1 is a top view of a light emitting device 100 known in the art wherein LEDs 101 are encapsulated into a lightguide 102 with light extraction features 103.

Figure 2:
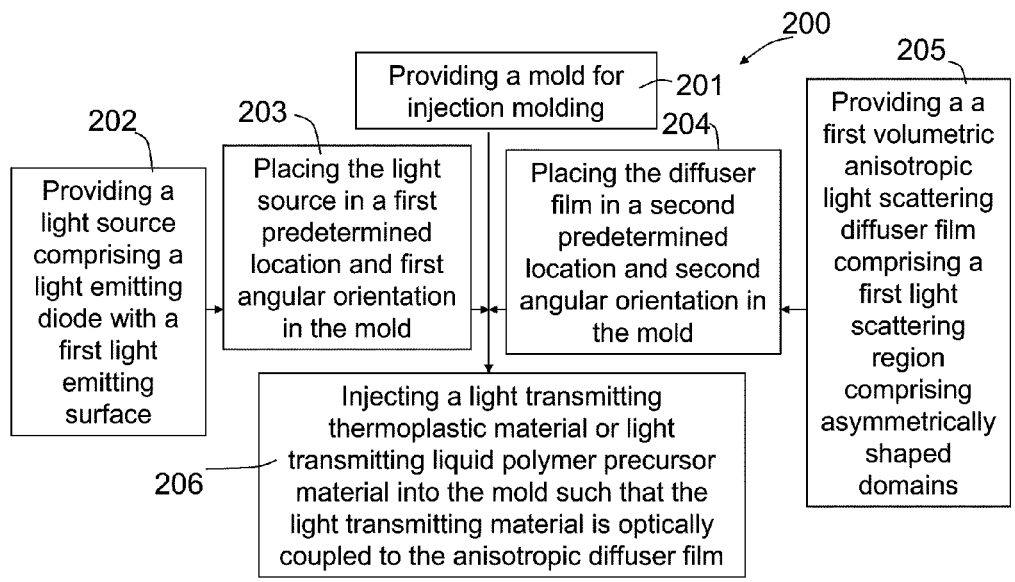
FIG. 2 is a diagram explaining a method for manufacturing an article of this invention.

FIG. 2 details the a method 200 for manufacturing an article (such as 700 in FIG. 7) comprising: providing a mold for injection molding 201, providing a light source comprising a light emitting diode with a first light emitting source surface 202, providing a first volumetric anisotropic light scattering diffuser film comprising a first light scattering region comprising asymmetrically shaped domains 205, placing the light source in a first predetermined location and first angular orientation in the mold 203, placing the first diffuser film a in a second predetermined location and second angular orientation in the mold 204, and injecting a light transmitting thermoplastic material or light transmitting liquid polymer precursor material into the mold such that the light transmitting material is optically coupled to the anisotropic diffuser film 206.

Figure 3:
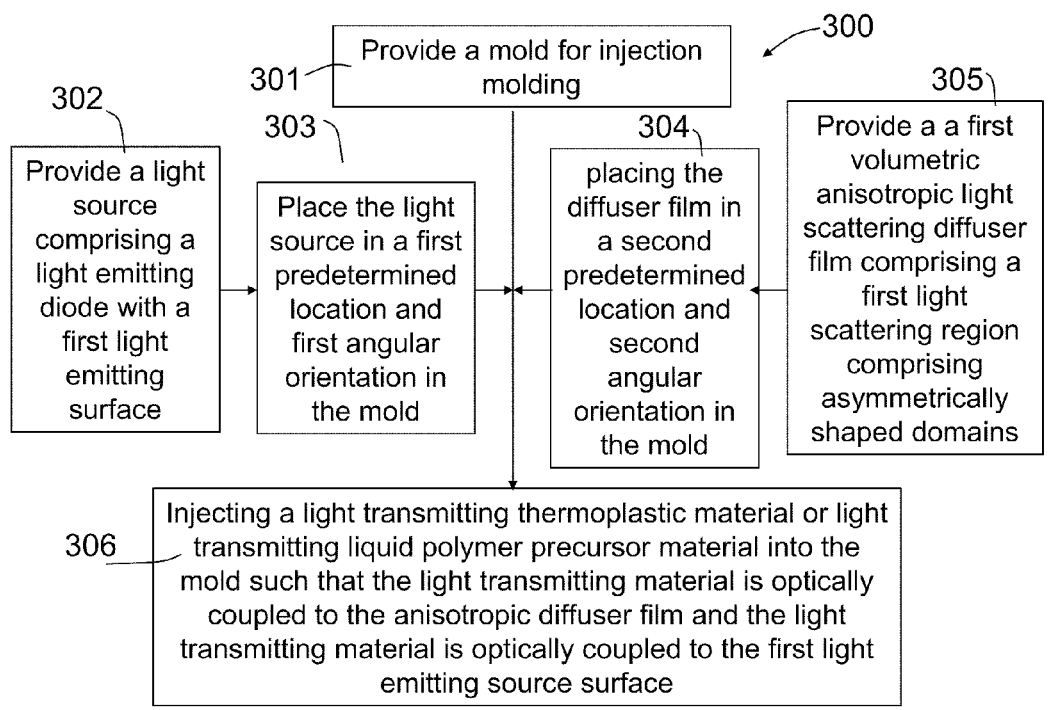
FIG. 3 is a diagram explaining a method for manufacturing an article of this invention.

FIG. 3 details a method 300 for manufacturing an article (such as 700 in FIG. 7) comprising: providing a mold for injection molding 301, providing a light source comprising a light emitting diode with a first light emitting source surface 302, providing a first volumetric anisotropic light scattering diffuser film comprising a first light scattering region comprising asymmetrically shaped domains 305, placing the light source in a first predetermined location and first angular orientation in the mold 303, placing the first diffuser film a in a second predetermined location and second angular orientation in the mold 304, and injecting a light transmitting thermoplastic material or light transmitting liquid polymer precursor material into the mold such that the light transmitting material is optically coupled to the anisotropic diffuser film 306.

Figure 4:
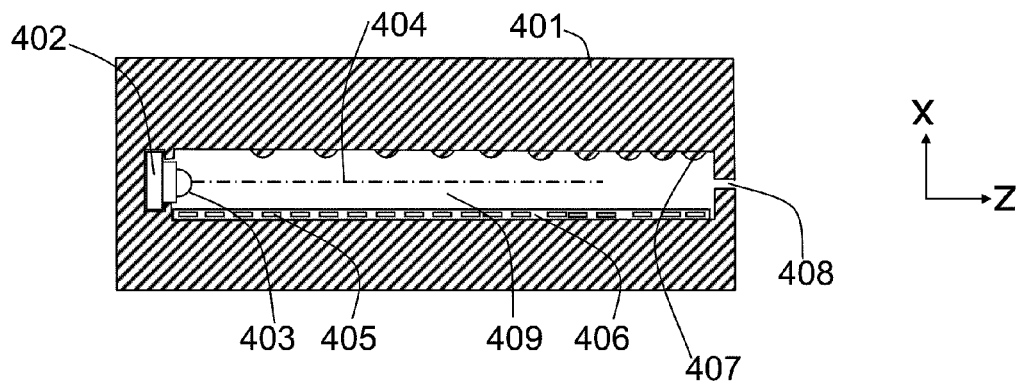
FIG. 4 is a cross-sectional view of a mold with a light source and a diffuser film used to manufacture an article in accordance with one embodiment of this invention.

FIG. 4 is a cross-sectional view illustrating the mold and the location and orientation of components used in the method of manufacturing an article (such as 700 shown in FIG. 7) in one embodiment of this invention. A light source 402 is positioned in the cavity 409 of a mold 401 for injection molding with light redirecting features 407 on a surface of the mold. An anisotropic light scattering diffuser 406 is positioned and oriented in the mold cavity 409 such that the asymmetric domains 405 are aligned substantially parallel to the optical axis 404 of the LED 402 which can emit light from the light output surface 403. The light transmitting material (not shown) is injected through an inlet nozzle 408 and into the mold cavity 409. The inlet nozzle may be configured to be at a different location in the mold in order to provide a more uniform fill or an optimized injection molded article with precise feature replication and minimal damage to coupled components.

Figure 5:
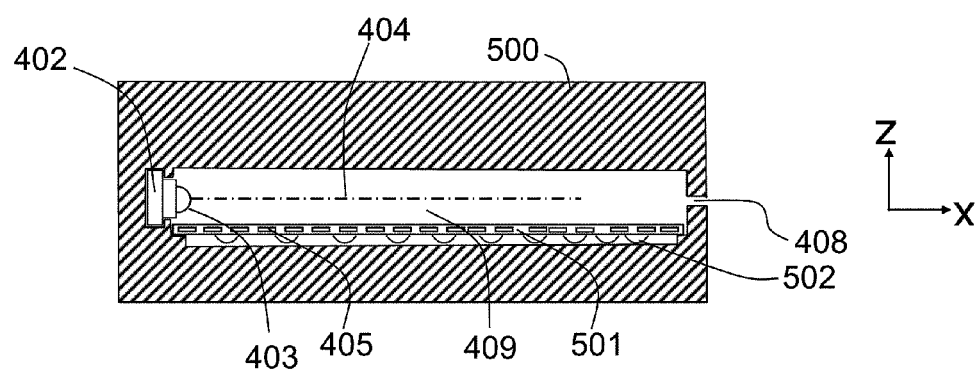
FIG. 5 is a cross-sectional view of a mold with a light source and a diffuser film with light redirecting surface features used to manufacture an article in accordance with one embodiment of this invention.

FIG. 5 is a cross-sectional view illustrating the mold and the location and orientation of components used in the method of manufacturing an article of one embodiment of this invention. A light source 402 is positioned in the cavity 409 of a mold 401 for injection molding. An anisotropic light scattering diffuser film 406 with light redirecting features 502 on the surface of the film is positioned and oriented in the mold cavity 409 such that the asymmetric domains 405 are aligned substantially parallel to the optical axis 404 of the LED 402 which can emit light from the light output surface 403. The light transmitting material (not shown) is injected through an inlet nozzle 408 and into the mold cavity 409. By using a light diffuser film with light redirecting features disposed on the surface of the film on the outer surface from the cavity, the diffuser film insert can be on the same side of the lightguide as the light redirecting features.

In a further embodiment of this invention, a first portion of the light redirecting features are encapsulated in the light transmitting material and the refractive index difference between the light transmitting material and the light redirecting surface features of the film is greater than 0.005. In this embodiment, the refractive index difference is sufficiently high to provide light redirection and the light redirection features that were on the surface of the film are now within the volume of the composite. By designing the composite with light redirecting features to be optically coupled to the light transmitting material (thus within the volume of the composite), the features are more protected from scratching, dust accumulation and other components may be more readily adhered to the corresponding outer surface of the composite. In one embodiment of this invention, a light redirection film or diffusion film with light redirecting features is disposed within the cavity such that light transmitting material injected into the cavity flows onto the surface with the light redirecting features and is optically coupled to the light redirecting surface features. In one embodiment of this invention, a light redirection film or diffusion film with light redirecting features is disposed within the cavity such that light transmitting material injected into the cavity flows onto both opposite surfaces of the film and is optically coupled to the film. Ridges, flanges, frames, other mold constructions may be used to design the flow of the light transmitting material such that it holds the film in place or protects the film. Additionally, or primers, coatings, compatibilizers, adhesion agents, sealants, inks or other similar materials may be used on the mold, in the light transmitting material, on a film or layer or region of a film in order to protect, adhere, decorate or provide reflective or absorbing functionality to the components or composite. Examples of methods for adhering and protecting an optical film in an FIM (film insert molding) or in-mold decoration (IMD) process are described in U.S. Pat. No. 6,490,093, the contents are incorporated by reference herein.

Figure 6:
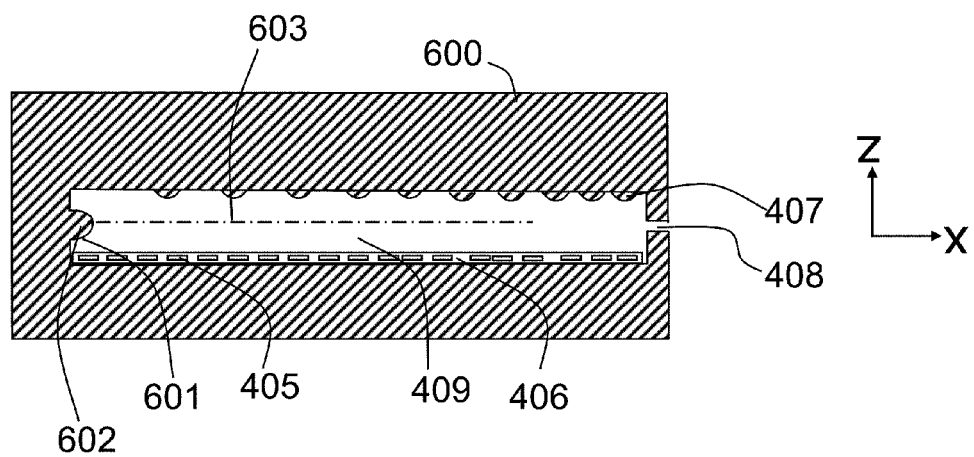
FIG. 6 is a cross-sectional view of a mold with a diffuser film with light redirecting surface features on the mold used to manufacture an article in accordance with one embodiment of this invention.

FIG. 6 is a cross-sectional view illustrating the mold and the location and orientation of components used in the method of manufacturing an article of one embodiment of this invention. A protrusion 602 is designed into a surface of a mold 600 such that the protrusion surface 601 is substantially conformal to the light output surface of an LED. An anisotropic light scattering diffuser 406 is positioned and oriented in the mold cavity 409 such that the asymmetric domains 405 are aligned substantially parallel to an axis 603 corresponding to the optical axis of an LED if it were inserted into the cavity corresponding to the protrusion 602 in a light transmitting material of an optical composite formed from the mold 600. The light transmitting material (not shown) is injected through an inlet nozzle 408 and into the mold cavity 409.

Figure 7:
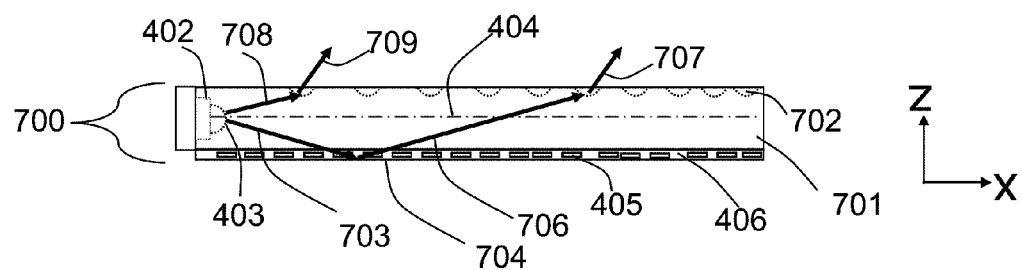
FIG. 7 is a cross-sectional view of an article comprising a light source, an anisotropic light scattering diffuser film and a light transmitting material in accordance to one embodiment of this invention.

FIG. 7 is a cross-sectional view of one embodiment of this invention of an article 700 comprising a light source 402, an anisotropic light scattering diffuser film 406 and light redirecting features 702 in a light transmitting material 701. The light source 402 and the anisotropic light scattering diffuser film 406 are optically coupled to the light transmitting material 701 which has light redirecting surface features 702 on the opposite surface from the anisotropic light scattering diffuser film 406. The anisotropic light scattering diffuser film 406 is oriented with the asymmetric domains 405 oriented parallel to the optical axis 404 of the light source 402. Light 703 from the light output surface 403 of the light source 402 is totally internally reflected (TIR) at the interface defined by air and the outer surface 704 of the diffuser film 406. After this total internal reflection, the light 706 passes through the light transmitting material 701 and is redirected by the light redirection features 702 and ultimately this light is refracted into light ray 707 and escapes the article 700. Light 708 from the light output surface 403 of the light source 402 is directed onto the light redirection features and is further directed into light 709 which leaves the article 700.

Figure 8:
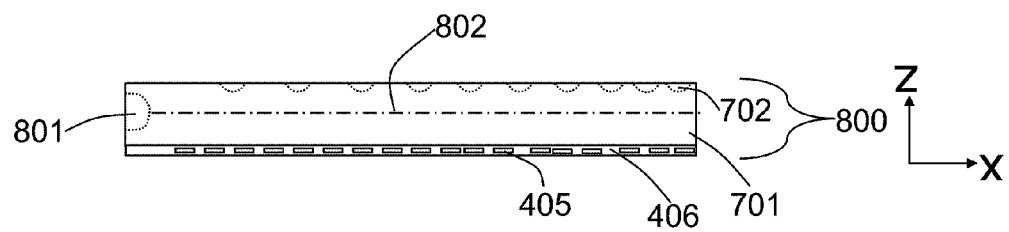
FIG. 8 is a cross-sectional view of an article comprising a cavity, an anisotropic light scattering diffuser film and a light transmitting material in accordance to one embodiment of this invention.

FIG. 8 is a cross-sectional view of one embodiment of this invention of an article 800 comprising an anisotropic light scattering diffuser film 406 and light redirecting features 702 and a cavity 801 for a light source in a light transmitting material 701. The anisotropic light scattering diffuser film 406 is optically coupled to the light transmitting material 701 which has light redirecting surface features 702 on the opposite surface from the anisotropic light scattering diffuser film 406. The anisotropic light scattering diffuser film 406 is oriented with the asymmetric domains 405 oriented parallel to an axis 802 corresponding to the optical axis of an LED if it were inserted into the cavity 801 in the light transmitting material 701.

Figure 9:
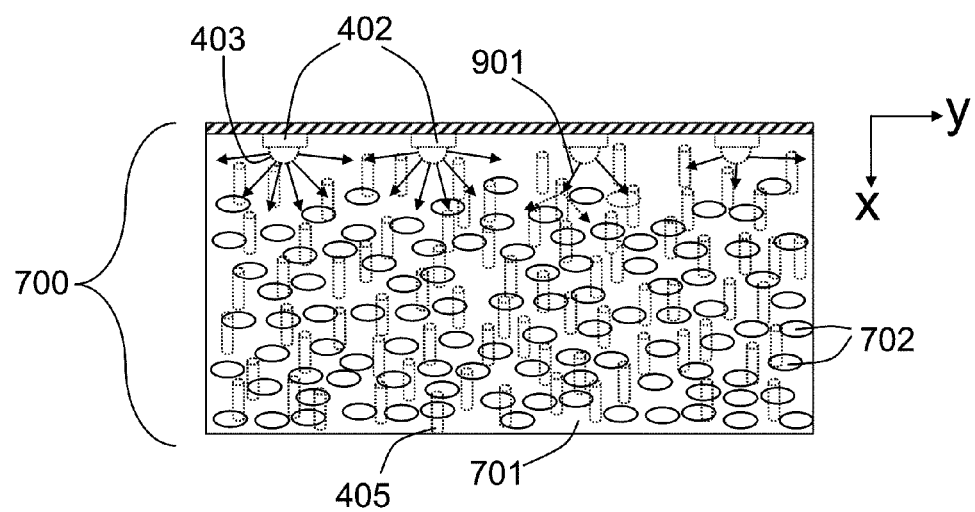
FIG. 9 is top view of the article of FIG. 7.

FIG. 9 is a view looking at the x-y plane of the article 700 of FIG. 7. In this embodiment, the light source 402 is a linear array of LEDs arranged parallel to the y axis with their optical axis oriented in the +x direction. Light 901 from the light output surface 403 of the LEDs 402 is directed onto one of the asymmetric domains 405 and is scattered in the y-z plane while traveling in the +x direction. By orienting the asymmetric particles 405 such that their major plane of diffusion is parallel to the array of LEDs in the light source 402, the spatial luminance of the light extracted from the article becomes more uniform along the axis (y axis) which is parallel to the LEDs.

Figure 10:
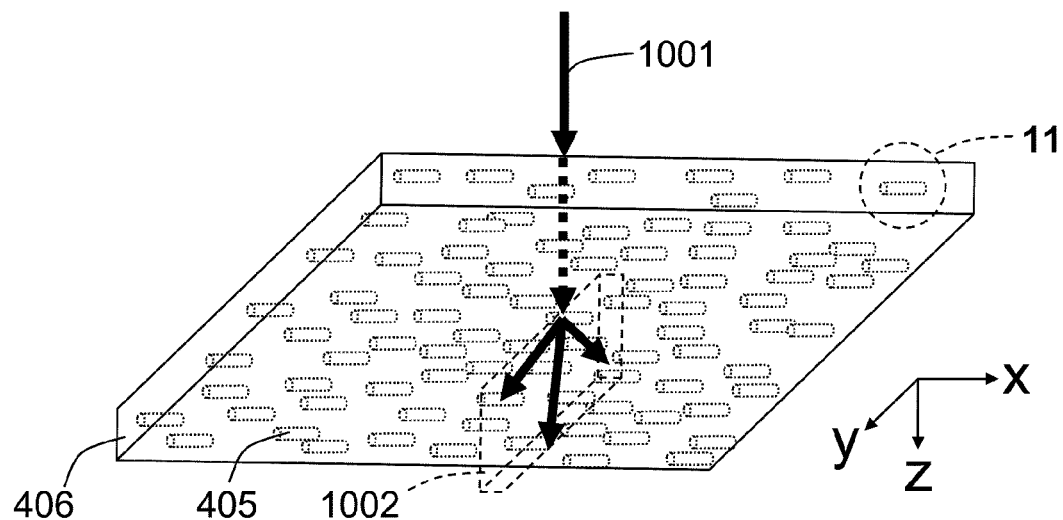
FIG. 10 is a cross-sectional view of an anisotropic light scattering diffuser used as a component in accordance to one embodiment of this invention.
Figure 11:
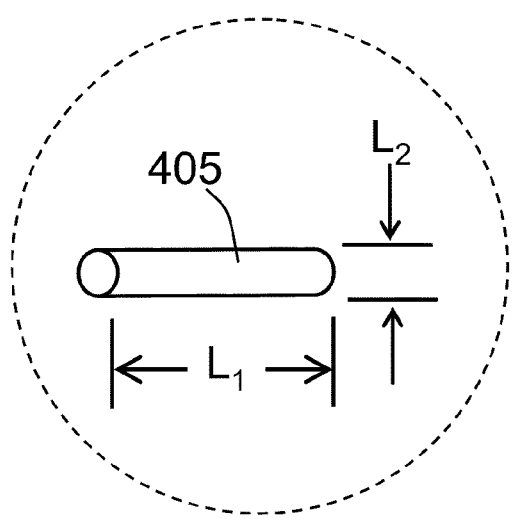
FIG. 11 is an exploded cross-sectional view of an asymmetric domain in the diffuser of FIG. 10.

FIG. 10 is a perspective view looking at anisotropic light scattering diffuser film 406 used as a component in one embodiment of this invention. The anisotropic light scattering diffuser film 406 comprises asymmetrically shaped domains 405. Collimated light 1001 incident orthogonal to the anisotropic light scattering diffuser film 406 will scatter into higher angles in the z-y plane 1002 than the z-x plane. The asymmetrically shaped domains 405, also shown enlarged in FIG. 11, have a dimensional length in the larger dimension of $L_1$ and a dimensional length in the orthogonal direction in the plane (x-y plane) of the film of $L_2$.

Figure 12:
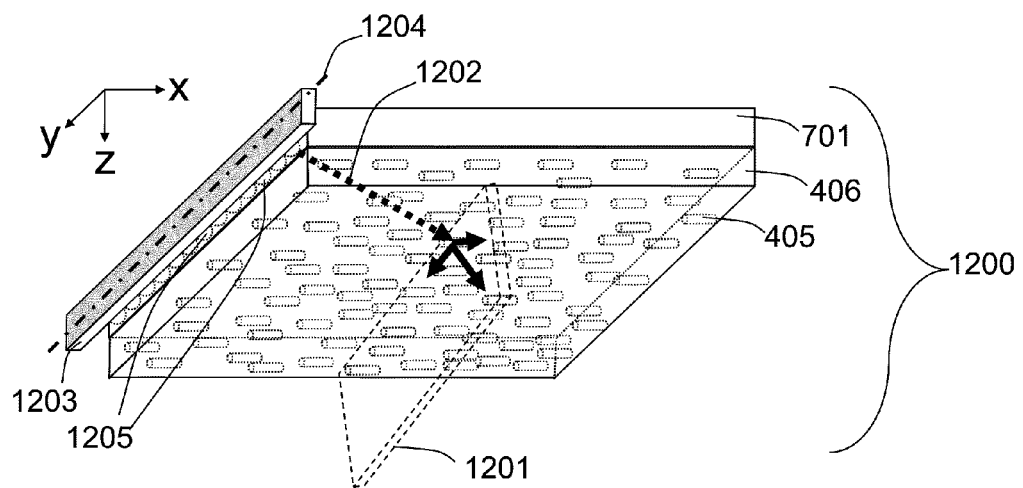
FIG. 12 is a cross-sectional view of an article comprising a light source of an array of LEDs, an anisotropic light scattering diffuser film and a light transmitting material in accordance to one embodiment of this invention.

FIG. 12 is a perspective view of one embodiment of this invention of an article 1200 comprised of a light source 1203 comprised a linear array of LEDs 1205 aligned along a light source array axis 1204 aligned parallel to the y axis. The article further comprises an anisotropic light scattering diffusion film 406 comprising asymmetric domains 405 optically coupled to the light transmitting material 701. The asymmetric domains 405 are oriented substantially perpendicular to the light source array axis 1204. Light 1202 from the light source 1203 incident on the anisotropic light scattering diffuser film is scattered in the y-z plane 1201 by the asymmetric domains 405. In one embodiment, the LEDs 1205 are optically coupled to the light transmitting material 701.

Figure 13:
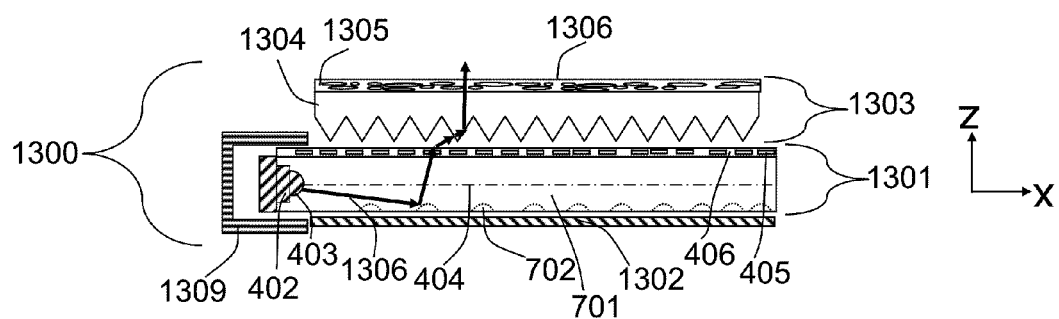
FIG. 13 is a cross-sectional view of an article comprising a light source, an anisotropic light scattering diffuser film, a light redirecting film, and a light transmitting material in accordance to one embodiment of this invention.

FIG. 13 is a cross-sectional view of one embodiment of this invention of a light emitting device 1300 comprising an optical composite 1301 and a light redirecting film 1303 comprising a linear array of prismatic light redirecting features 1304 and an anisotropic light scattering diffuser region 1305. The light emitting device 1300 further comprises a first reflector 1307 and a second reflector 1302. The reflectors may be a reflective film, an insert molded reflection film, extruded aluminum or other metal. The reflector may be specularly reflective, symmetrically reflective, or anisotropically reflecting. The reflector may comprise a substantially symmetric scattering diffuser, an anisotropically scattering diffuser film or contain scratches or surface features designed to reflect light into a predetermined angular range. In one embodiment of this invention, the reflector 1307 is a specularly reflective aluminum reflector and the reflector 1302 is a white diffusely reflecting film. The light emitting device 1300 further comprises light redirecting surface features 702 on the light transmitting material 701 of the optical composite 1301. The optical composite 1301 further comprises a light source 402 with a light output surface 403 optically coupled to the light transmitting material 701. Light 1306 exiting the light source 402 from the light output surface 403 is directed into the light transmitting material 701 and redirected by the light redirecting surface features 702 on the surface of the light transmitting material 701 such that it passes through the anisotropic light scattering diffuser film 405, is refracted at the air-film interface and is redirected by the linear array of light redirecting features 1304 and passes through the anisotropic light scattering region 1305. In one embodiment of this invention, the anisotropic light scattering film 406 optically coupled to the light transmitting material 701 scatters incident light making it more uniform in a direction orthogonal to the optical axis of the light source 404. This light is redirected to an angular range closer to the normal to the light output surface 1306 of the light emitting device 1300 by the linear prismatic light redirecting features 1304. The spatial luminance profile of the light incident on the anisotropic light scattering region of the light redirecting film has a high contrast resulting from the optical artifacts due to the peaks and valleys of the prismatic film. The light exiting the article 1300 has a reduced contrast due to the anisotropic light scattering region 1305 spatially spreading the incident light along the x direction. In one embodiment of this invention, the domains within the anisotropic light scattering region are oriented substantially parallel to the prism features in the light redirecting film and the spatial luminance uniformity of the optical artifacts (micro-uniformity) is greater than 60%.

In one embodiment of this invention, the light redirecting film is a linear prismatic film with an average apex angle between 40 degrees and 80 degrees. In a further embodiment of this invention, the light redirecting film is a linear prismatic film with an average apex angle between 50 degrees and 70 degrees. In a further embodiment of this invention, the light redirecting film is a linear prismatic film with an average apex angle between 55 degrees and 65 degrees.

Figure 14:
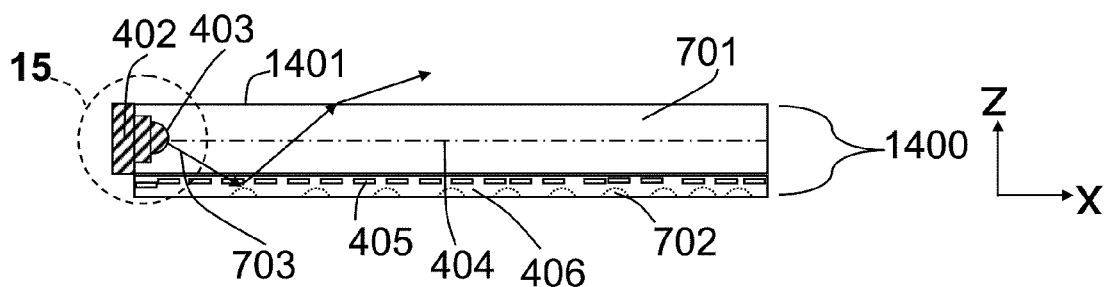
FIG. 14 is a cross-sectional view of an article comprising a light source, an anisotropic light scattering diffuser film with light redirecting features, and a light transmitting material in accordance to one embodiment of this invention.

FIG. 14 is a cross-sectional view of one embodiment of this invention of an article 1400 comprising a light source 402, an anisotropic light scattering diffuser film 406 and light redirecting surface features 702 disposed on the opposite surface of the anisotropic light scattering diffuser film 406 than the light transmitting material 701. The light source 402 and the anisotropic light scattering diffuser film 406 are optically coupled to the light transmitting material 701. The article 1400 has an optical output surface 1401. The anisotropic light scattering diffuser film 406 is oriented with the asymmetric domains 405 oriented parallel to the optical axis 404 of the light source 402. Light 703 from the light output surface 403 of the light source 402 passes through the anisotropic light scattering film and is redirected at the light redirecting surface features 702, passes back through the anisotropic light scattering film 406, through the light transmitting material 701 and leaves the article 1400.

Figure 15:
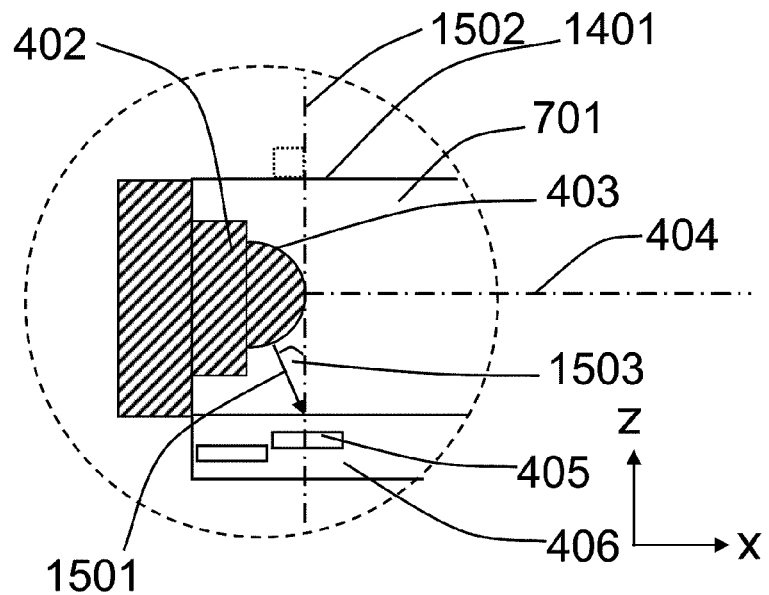
FIG. 15 is an exploded cross-sectional view of the region near the light source from FIG. 14.

FIG. 15 is an exploded side view near the light source 402 of FIG. 14. The anisotropic light scattering diffuser film 406 is disposed to receive light 1501 from the light output surface 403 of the light source 402 at an angle of incidence 1503 that is less than 20 degrees from the axis 1502 orthogonal to the light output surface 1401 within the light transmitting material 701.

Figure 16:
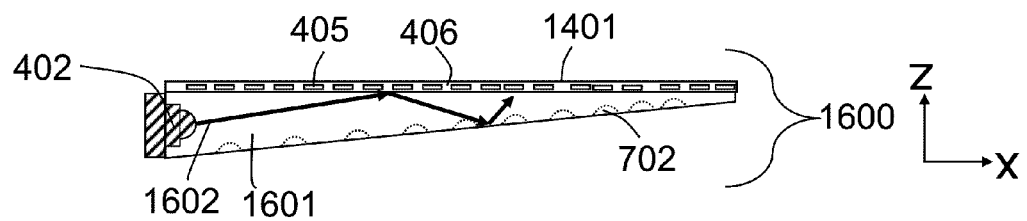
FIG. 16 is a cross-sectional view of an article comprising a light source, an anisotropic light scattering diffuser film and a tapered-thickness light transmitting material in accordance to one embodiment of this invention.

FIG. 16 is a cross-sectional view of one embodiment of this invention of an article 1600 comprising a light source 402, an anisotropic light scattering diffuser film 406 and light redirecting features 702 in a tapered-thickness light transmitting material 1601. The light source 402 and the anisotropic light scattering diffuser film 406 are optically coupled to the tapered thickness light transmitting material 1601 which has light redirecting surface features 702 on the opposite surface from the anisotropic light scattering diffuser film 406. Light 1602 from the light output surface 403 of the light source 402 is totally internally reflected (TIR) and redirected into a smaller angle relative to the normal to the light output surface 1401 due to the wedge shape of the tapered light transmitting material 1601. The tapered shape permits a gradual increase in light output coupling as the light totally internally reflects further from the light source 402.

Figure 17:
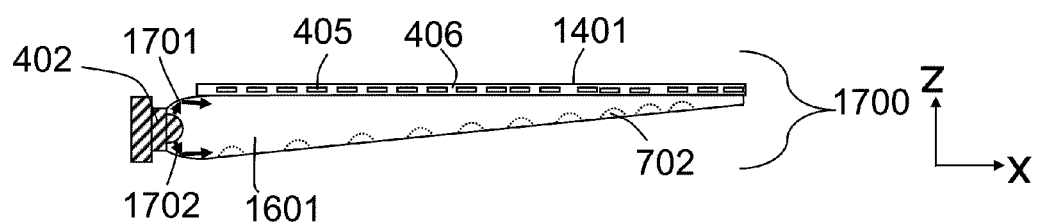
FIG. 17 is a cross-sectional view of an article comprising a light source, an anisotropic light scattering diffuser film and a tapered-thickness light transmitting material with light collimating features in accordance to one embodiment of this invention.

FIG. 17 is a cross-sectional view of one embodiment of this invention of an article 1700 comprising a light source 402, an anisotropic light scattering diffuser film 406 and light redirecting features 702 in a tapered-thickness light transmitting material 1601. The light source 402 and the anisotropic light scattering diffuser film 406 are optically coupled to the tapered thickness light transmitting material 1601 which has light redirecting surface features 702 on the opposite surface from the anisotropic light scattering diffuser film 406. The light transmitting material has a light collimating feature 1701 that reduces the angular extent of the light 1702 incident on the light redirecting features 702 within the tapered light transmitting material 1601 within a plane perpendicular to the first output surface 1401 and parallel to the optical axis. The angular extent is defined by the full angular width at half maximum intensity of the light from the light source 402 within the tapered light transmitting material 1601.

Figure 18:
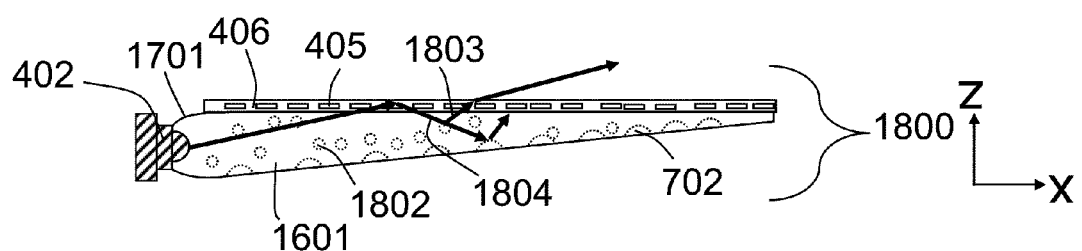
FIG. 18 is a cross-sectional view of an article comprising a light source, an anisotropic light scattering diffuser film and a tapered-thickness light transmitting material with light collimating features and substantially spherical domains in accordance to one embodiment of this invention.

FIG. 18 is a cross-sectional view of one embodiment of this invention of an article 1800 comprising a light source 402, an anisotropic light scattering diffuser film 406 and light redirecting features 702 in a tapered-thickness light transmitting material 1601 comprising substantially spherical light scattering domains 1802. The light source 402 and the anisotropic light scattering diffuser film 406 are optically coupled to the tapered thickness light transmitting material 1601 which has light redirecting surface features 702 on the opposite surface from the anisotropic light scattering diffuser film 406. The light transmitting material has a light collimating feature 1701 that reduces the angular extent of the light 1702 incident on the light redirecting features 702 within the tapered light transmitting material 1601 within a plane perpendicular to the first output surface 1401 and parallel to the optical axis. Light 1804 from the light source 402 incident on the substantially spherical light scattering domains 1802 will scatter such that some light 1803 will exit the article 1800. In one embodiment of this invention, substantially spherical particles can be added to improve the light output coupling uniformity. In another embodiment of this invention, an article comprises a light source, anisotropic light scattering film, a tapered light transmitting material wherein the light transmitting material comprises substantially spherical particles which scatter light and couple the light out of the light transmitting material without requiring light redirecting features on a surface.

Figure 19:
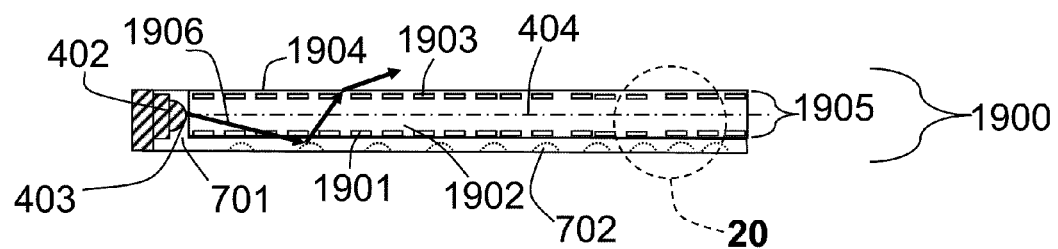
FIG. 19 is a cross-sectional view of an article comprising a light source, an anisotropic light scattering diffuser film with two regions comprising asymmetric domains and a light transmitting material in accordance to one embodiment of this invention.

FIG. 19 is a cross-sectional view of one embodiment of this invention of an article 1900 comprising a light source 402, an anisotropic light scattering diffuser film 1902 comprising a first group of asymmetric particles 1903 and a second group of asymmetric particles 1901 on opposite sides of the light source optical axis 404 of the light source 402. The article further comprises light redirecting features 702 in a light transmitting material 701. The light source 402 and the anisotropic light scattering diffuser film 1902 are optically coupled to the light transmitting material 701 which has light redirecting surface features 702. The anisotropic light scattering diffuser film 1902 is oriented with the first group of asymmetric domains 1903 and second group of asymmetric domains 1901 oriented parallel to the optical axis 404 of the light source 402. Light 1906 from the light output surface 403 of the light source 402 directed onto the light redirecting features 702 is further directed into the anisotropic light scattering diffuser film 1902 and through the light output surface 1904 of the article 1900.

Figure 20:
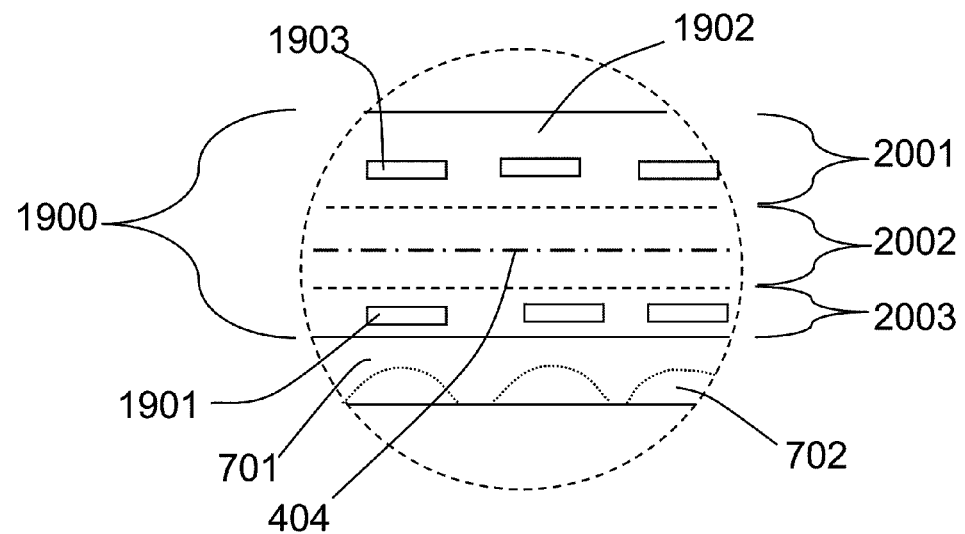
FIG. 20 is an exploded cross-sectional view of the article in FIG. 19.

FIG. 20. is an exploded view of a cross-sectional portion of the article 1900 of FIG. 19. The anisotropic light scattering diffuser film 1902 comprises a first anisotropic light scattering region 2001 with a first group of asymmetric particles 1903, a substantially non-scattering region 2002, and a second anisotropic light scattering region 2003 comprising a second group of asymmetric particles 1901. The optical axis 404 passes through the substantially non-scattering region 2002 of the anisotropic light scattering diffuser film 1902.

Figure 21:
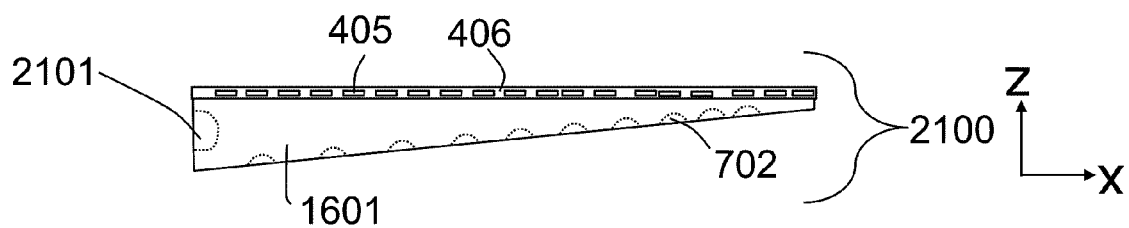
FIG. 21 is a cross-sectional view of an article comprising a cavity, an anisotropic light scattering diffuser film and a tapered-thickness light transmitting material in accordance to one embodiment of this invention.

FIG. 21 is a cross-sectional view of one embodiment of this invention of an article 2100 comprising a cavity 2101 in the tapered thickness light transmitting material 1601, an anisotropic light scattering diffuser film 406 and light redirecting surface features 702 in a tapered-thickness light transmitting material 1601. The anisotropic light scattering diffuser film 406 is optically coupled to the tapered thickness light transmitting material 1601 which has light redirecting surface features 702 on the opposite surface from the anisotropic light scattering diffuser film 406. In one embodiment of this invention, the cavity 2101 substantially conforms to the shape of a light output surface of an LED such that the LED output surface can be inserted into the cavity 2101.

Figure 22:
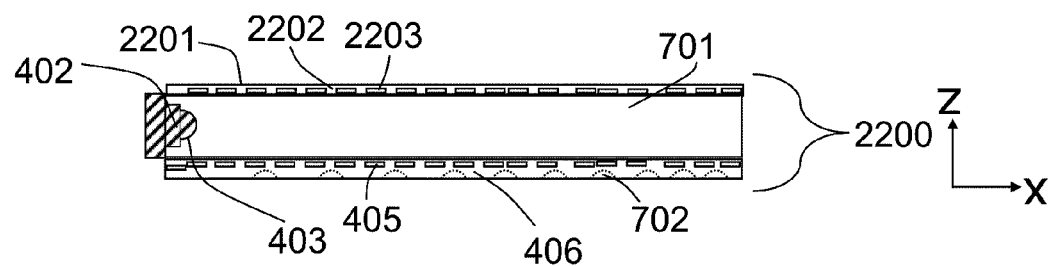
FIG. 22 is a cross sectional view of an article comprising a light source, two anisotropic light scattering diffuser films and a light transmitting material in accordance to one embodiment of this invention.

FIG. 22 is a cross-sectional view of one embodiment of this invention of an article 2200 comprising a light source 402, a first anisotropic light scattering diffuser film 406 and light redirecting surface features 702 disposed on the opposite surface of the anisotropic light scattering diffuser film 406 than the light transmitting material 701. The light source 402 and the first anisotropic light scattering diffuser film 406 are optically coupled to the light transmitting material 701. The article 2200 further comprises a second anisotropic light scattering film 2202 optically coupled to the opposite surface of the light transmitting material than the first anisotropic light scattering film 406. The second light anisotropic light scattering film 2202 comprises asymmetric particles 2203 and has a light output surface 2201. In one embodiment of this invention, the first anisotropic light scattering diffuser film 406 and the second anisotropic light scattering film 2202 are oriented with their asymmetric domains 405 and 2203, respectively, oriented parallel to the optical axis 404 of the light source 402. In one embodiment of this invention, the use of multiple anisotropic light scattering diffusers increases the luminance uniformity on the light output surface 2201 by providing additional scattering in the plane orthogonal to the light source optical axis 404.

Figure 23:
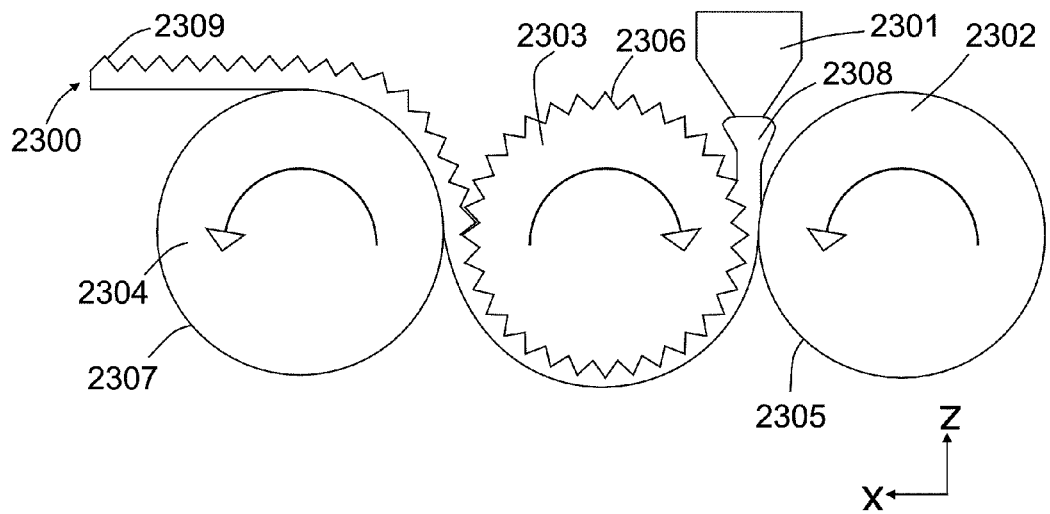
FIG. 23 is a cross-sectional view of one embodiment of this invention of a method for manufacturing a composite comprising extruding and embossing a first light transmitting material.

FIG. 23 is a cross-sectional view of one embodiment of this invention of a method for manufacturing a composite comprising extruding and embossing a first light transmitting material. A first light transmitting material 2308 is extruded from an extrusion film die 2301 onto a casting roll 2302 and embossing roll 2303. The casting roll 2302 has a substantially smooth surface 2305 and the embossing roll 2303 has a surface 2306 for embossing inverted light collimating surface features 2309 on the resulting film 2300. The first light transmitting material 2308 is cooled by one or more of the casting roll 2302 or embossing roll 2303 and is further fed around a third roll 2304 with a substantially smooth surface 2307.

Figure 24:
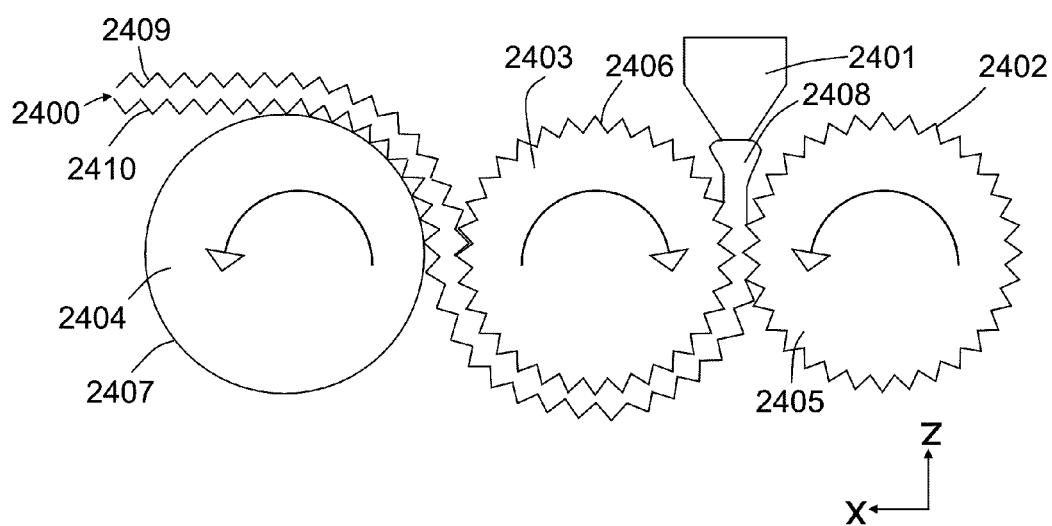
FIG. 24 is a cross-sectional view of one embodiment of this invention of a method for manufacturing a composite comprising extruding and embossing a first light transmitting material.

FIG. 24 is a cross-sectional view of one embodiment of this invention of a method for manufacturing a composite comprising extruding and embossing a first light transmitting material. A first light transmitting material 2408 is extruded from an extrusion film die 2401 onto a first embossing roll 2405 and second embossing roll 2403. The first embossing roll 2405 has a surface 2402 for embossing surface relief features 2410 on a first surface of the resulting film 2400. The second embossing roll 2403 has a surface 2406 for embossing inverted light collimating surface features 2409 on a second surface of the resulting film 2400. The first light transmitting material 2408 is cooled by one or more of the embossing rolls 2405 or 2403 and is further fed around a third roll 2404 with a substantially smooth surface 2407.

Figure 25:
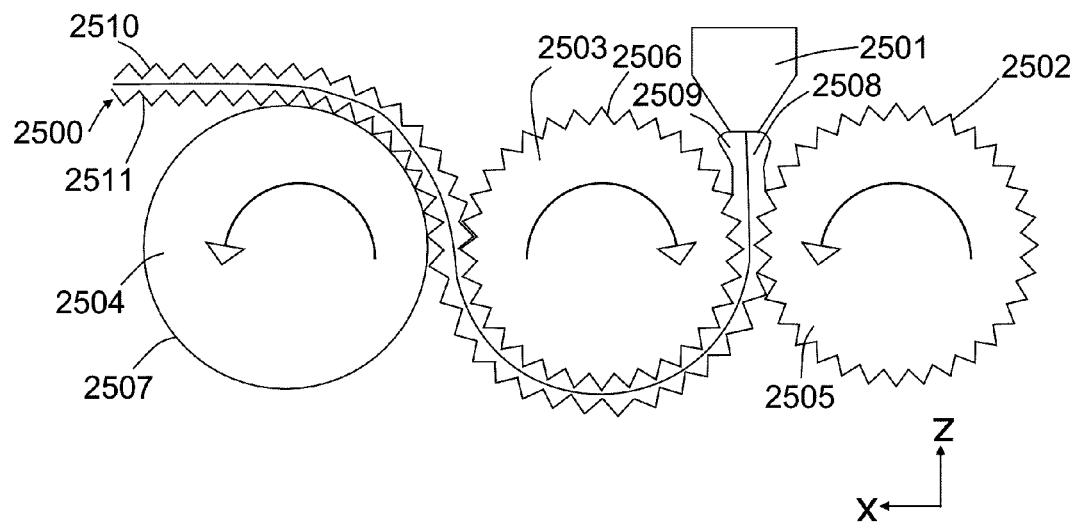
FIG. 25 is a cross-sectional view of one embodiment of this invention of a method for manufacturing a composite comprising extruding and embossing a first light transmitting material and second light transmitting material.

FIG. 25 is a cross-sectional view of one embodiment of this invention of a method for manufacturing a composite comprising extruding and embossing a first light transmitting material and second light transmitting material. A first light transmitting material 2508 is co-extruded with a second light transmitting material 2509 from a multi-layer extrusion film die 2501 onto a first embossing roll 2505 and second embossing roll 2503. The first embossing roll 2505 has a surface 2502 for embossing surface relief features 2511 on a first surface of the resulting film 2500. The second embossing roll 2503 has a surface 2506 for embossing inverted light collimating surface features 2510 on a second surface of the resulting film 2500. The first light transmitting material 2508 and second light transmitting material 2509 are cooled by one or more of the embossing rolls 2505 or 2503 and is further fed around a third roll 2504 with a substantially smooth surface 2507.

Figure 26A:
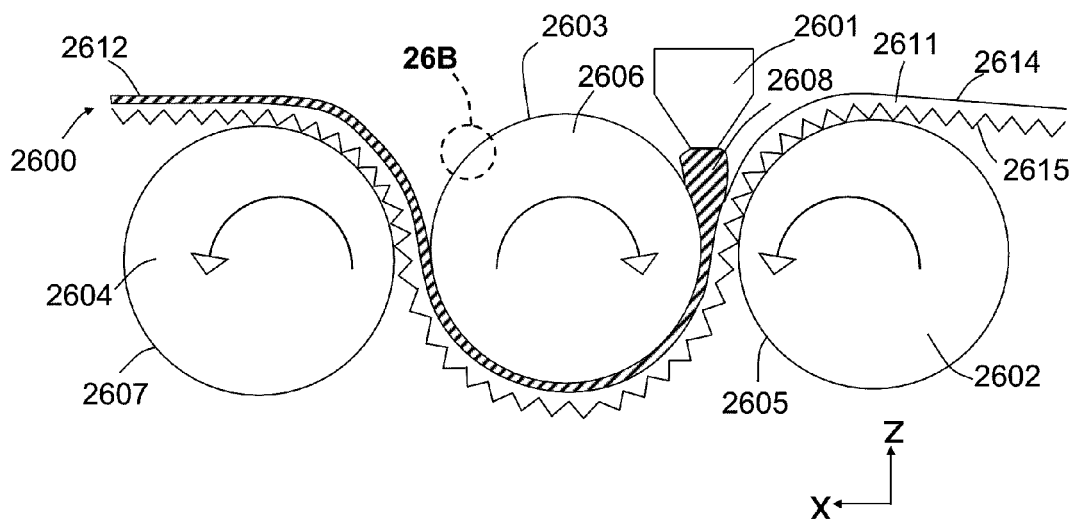
FIG. 26A is a cross-sectional view of one embodiment of this invention of a method for manufacturing a composite comprising extruding and embossing a first light transmitting material onto a film with inverted light collimating features.

FIG. 26A is a cross-sectional view of one embodiment of this invention of a method for manufacturing a composite comprising extruding and embossing a first light transmitting material onto a film with inverted light collimating features. A second light transmitting material 2608 is extruded onto a first light transmitting material 2611 with inverted light collimating surface features 2615 on one surface and a substantially planar second surface 2614 from an extrusion film die 2601. The second light transmitting material is extruded onto a first embossing roll 2606 with a surface 2603 for embossing surface relief features 2612 on a surface of the resulting film 2600. A second roll 2602 has a substantially smooth surface 2605 for nipping the first light transmitting 2611 onto the first embossing roll 2606. The second light transmitting material 2608 is cooled by one or more of the embossing roll 2606 or nip roll 2602 and is further fed around a third roll 2604 with a substantially smooth surface 2607.

Figure 26B:
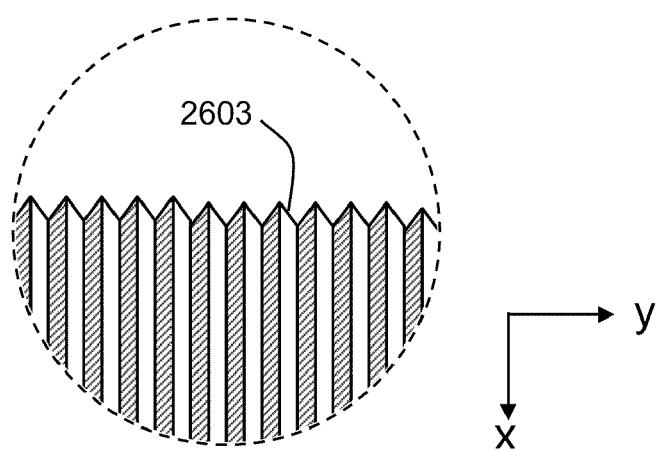
FIG. 26B is an enlarged view of the surface of the first embossing roll shown in FIG. 26A.

FIG. 26B illustrates an enlargement of the surface 2603 of the first embossing roll 2606 shown in FIG. 26A. In one embodiment, the surface of the roll comprises light collimating shaped features and a film embossed onto the roll results in inverted light collimating features on the surface. In another embodiment, the surface of the roll comprises inverted light collimating shaped features and a film embossed onto the roll results in light collimating features on the surface.

Figure 26C:
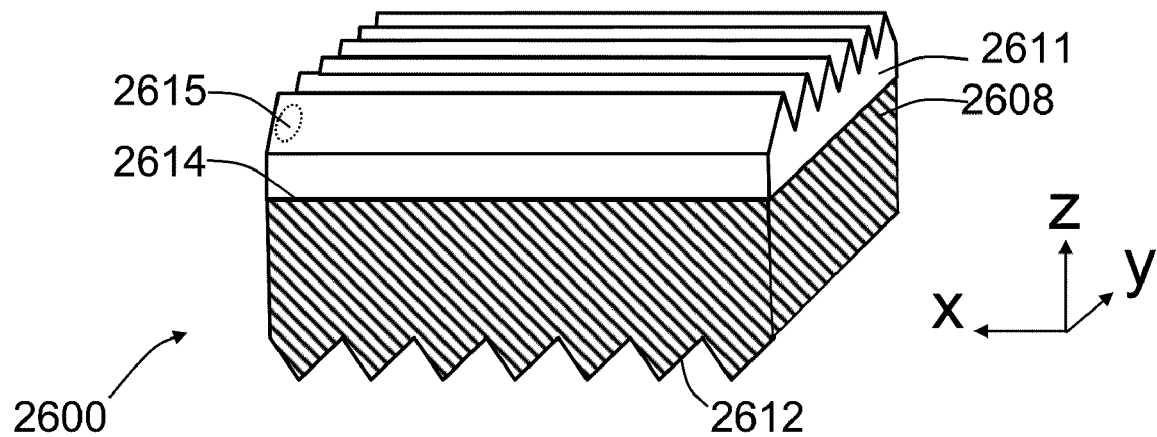
FIG. 26C is a perspective view of one embodiment of this invention of a composite formed by the method shown in FIG. 26A.

FIG. 26C is a perspective view of one embodiment of this invention of a composite formed by the method shown in FIG. 26A. The optical composite 2600 comprises a first light transmitting material 2611 with inverted light collimating surface features 2615 optically coupled at a second surface 2614 to a second light transmitting material 2608 comprising surface relief features 2612 on a surface of the second light transmitting material 2608.

Figure 27:
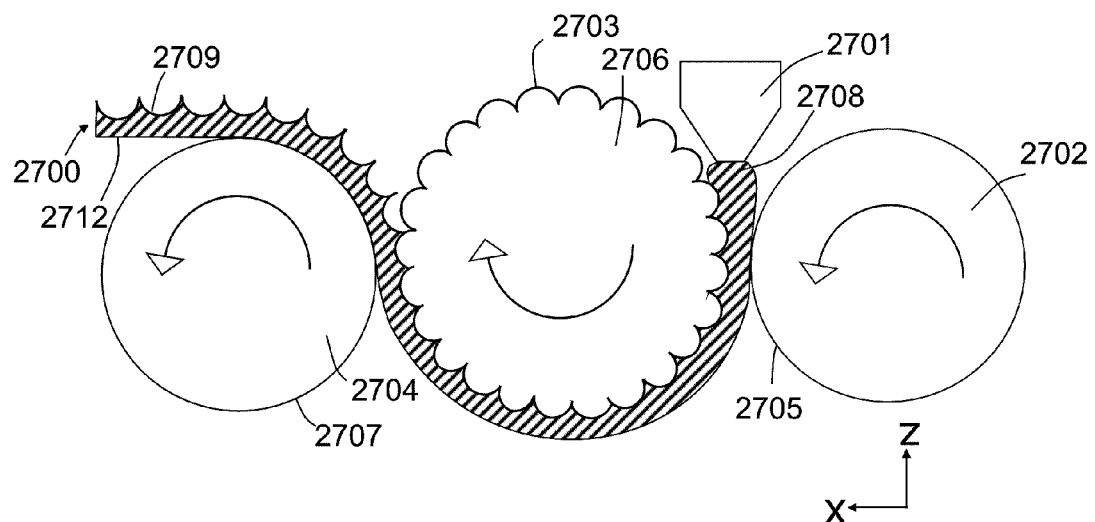
FIG. 27 is a cross-sectional view of one embodiment of this invention of a method for manufacturing a composite comprising extruding and embossing concave shapes into a first light transmitting material.

FIG. 27 is a cross-sectional view of one embodiment of this invention of a method for manufacturing a composite comprising extruding and embossing a first light transmitting material. A first light transmitting material 2708 is extruded from an extrusion film die 2701 onto a casting roll 2702 and embossing roll 2706. The casting roll 2702 has a substantially smooth surface 2705 and the embossing roll 2706 has convex surface features 2703 for embossing convex inverted light collimating surface features 2709 on the resulting film 2700. The first light transmitting material 2308 is cooled by one or more of the casting roll 2702 or embossing roll 2706 and is further fed around a third roll 2704 with a substantially smooth surface 2707.

Figure 28:
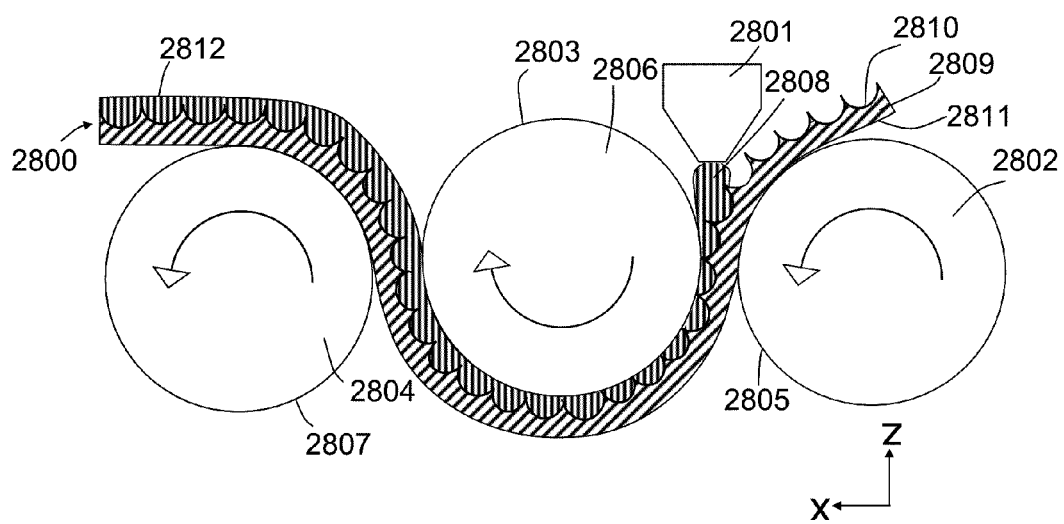
FIG. 28 is a cross-sectional view of one embodiment of this invention of a method for manufacturing a composite comprising extruding a second light transmitting material onto a film with inverted light collimating surface features such that the surface is substantially planarized.

FIG. 28 is a cross-sectional view of one embodiment of this invention of a method for manufacturing a composite comprising extruding a second light transmitting material onto a film with inverted light collimating surface features such that the surface is substantially planarized. A second light transmitting material 2808 is extruded from an extrusion film die 2801 onto a film 2089 comprising a first light transmitting material with concave inverted light collimating surface features 2810 on a first surface and a substantially planar second surface 2811 and a casting roll 2806 with a substantially planar surface 2803. The second light transmitting material 2808 is cooled by one or more of the casting roll 2806 or film 2809 and is further fed around a third roll 2804 with a substantially smooth surface 2807. The casting roll 2806 cools the surface of the second light transmitting material 2808 and forms a substantially planar surface 2812 on the resulting composite 2800.

Figure 29:
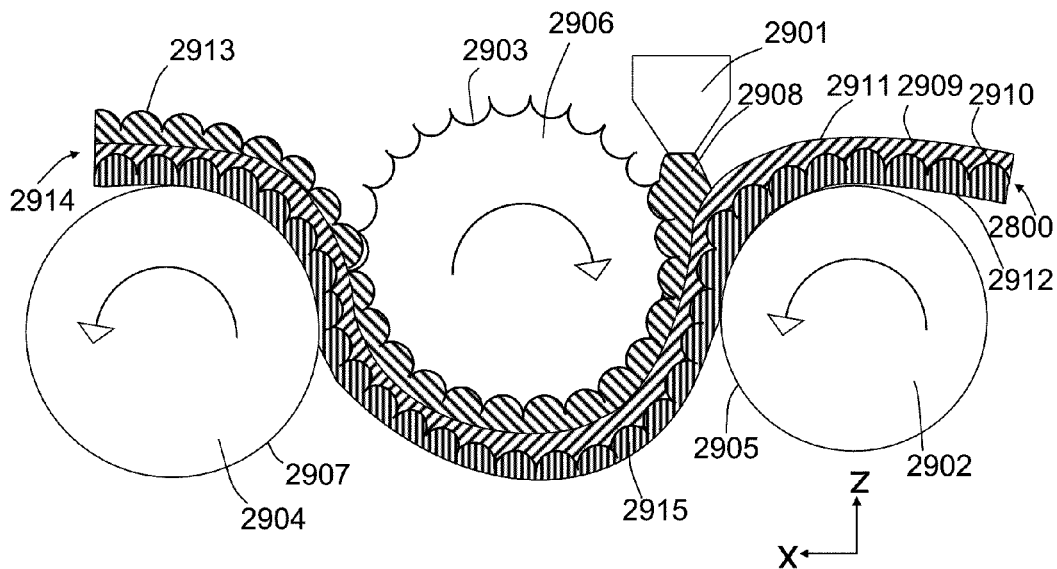
FIG. 29 is a cross-sectional view of one embodiment of this invention of a method for manufacturing a composite comprising extruding a third light transmitting material onto a film comprising inverted light collimating surface features and embossing light collimating surface features into the third light transmitting material.

FIG. 29 is a cross-sectional view of one embodiment of this invention of a method for manufacturing a composite comprising extruding a third light transmitting material onto a film comprising inverted light collimating surface features and embossing light collimating surface features into the third light transmitting material. A third light transmitting material 2908 is extruded from an extrusion film die 2901 onto a film 2800 comprising concave inverted light collimating surface features 2910 on a first light transmitting material 2909 and a substantially planar first surface 2911 on the first light transmitting material 2909 and a substantially planar second surface 2912 on a second light transmitting material 2915. The third light transmitting material 2908 is also fed onto an embossing roll 2906 with concave inverted light collimating surface features 2903 on the surface such that light collimating surface features 2913 are formed on the third light transmitting material 2908 forming the optical composite 2914. The third light transmitting material 2908 is cooled by one or more of the embossing roll 2906 or film 2800 and is further fed around a third roll 2904 with a substantially smooth surface 2907.

Figure 30:
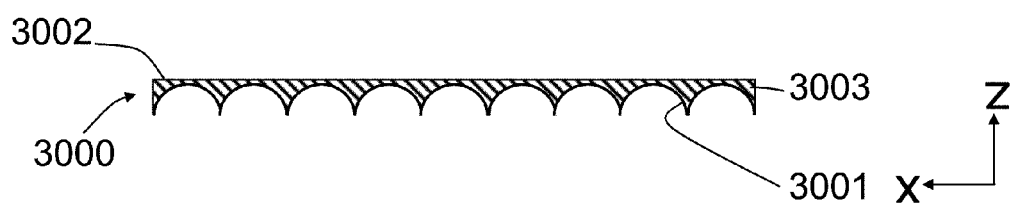
FIG. 30 is a cross-sectional view of one embodiment of this invention of a film formed by a process of manufacturing a composite.

FIG. 30 is a cross-sectional view of one embodiment of this invention of a film formed by a process of manufacturing a composite. A film 3000 is formed by the extrusion and embossing shown in FIG. 27 and comprises concave inverted light collimating features 3001 formed on the first surface of a first light transmitting material 3003 with a substantially planar second surface 3002.

Figure 31:
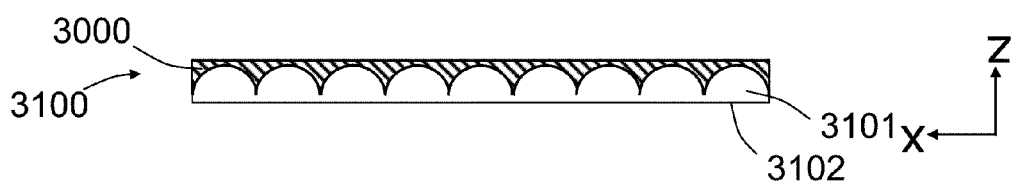
FIG. 31 is a cross-sectional view of one embodiment of this invention of a composite formed by a process of manufacturing a composite of one embodiment of this invention.

FIG. 31 is a cross-sectional view of one embodiment of this invention of a composite formed by a process of manufacturing a composite of one embodiment of this invention. A composite 3100 is formed by the extrusion and planarization process shown in FIG. 28 and comprises the film 3000 of FIG. 30, and a second light transmitting material 3101 optically coupled to the film 3000 and comprising a substantially planar surface 3102.

Figure 32:
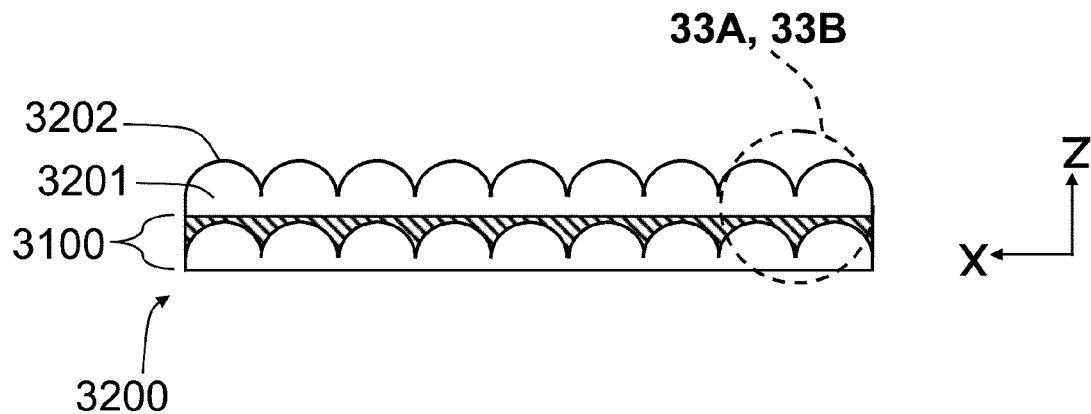
FIG. 32 is a cross-sectional view of one embodiment of this invention of a composite formed by a process of manufacturing a composite of one embodiment of this invention.

FIG. 32 is a cross-sectional view of one embodiment of this invention of a composite formed by a process of manufacturing a composite of one embodiment of this invention. A composite 3200 is formed by the extrusion and embossing process shown in FIG. 29 and comprises the film 3100 of FIG. 31, and a third light transmitting material 3201 optically coupled to the film 3100 and comprising light collimating surface features 3202.

Figure 33A:
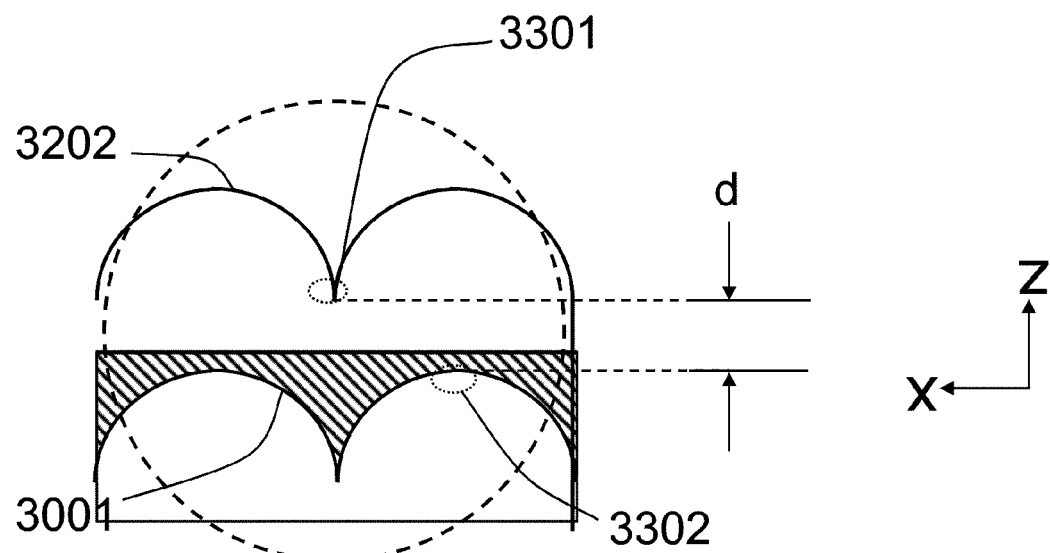
FIG. 33A is an enlargement of one embodiment of this invention of a composite formed by a process of manufacturing a composite of one embodiment of this invention shown in FIG. 32 showing the separation distance d.

FIG. 33A is an enlargement of one embodiment of this invention of a composite formed by a process of manufacturing a composite of one embodiment of this invention shown in FIG. 32. The distance, d, is the average separation between the valleys regions 3302 of the inverted light collimating surface features 3001 and the valley regions 3301 of the light collimating surface features 3202 in the thickness direction z. In one embodiment of this invention, composite comprises a surface with inverted light collimating surface features wherein the composite is an optical film and the average separation, d, between the valley regions of the inverted light collimating surface features and the valley regions of the light collimating surface features is less than 25 microns or less than 15 microns in the thickness direction of the optical film or composite.

Figure 33B:
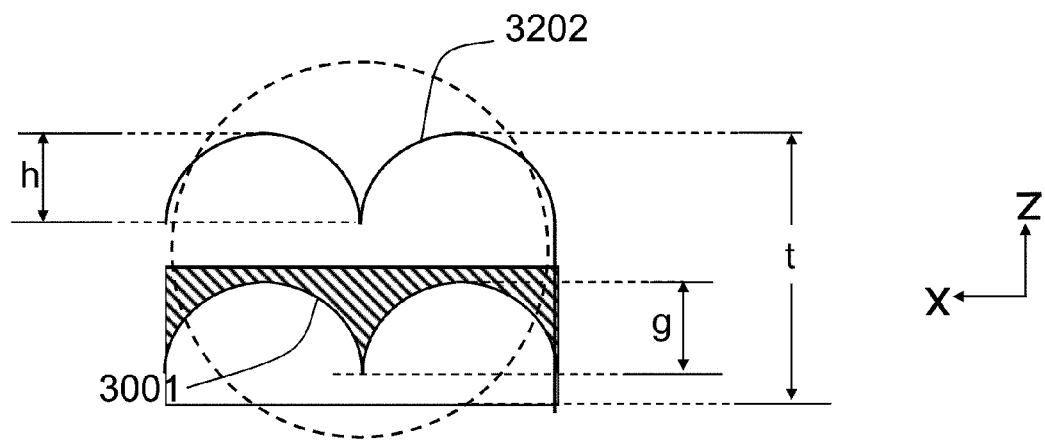
FIG. 33B is an enlargement of one embodiment of this invention of a composite formed by a process of manufacturing a composite of one embodiment of this invention shown in FIG. 32 showing the thickness t.

FIG. 33B is an enlargement of one embodiment of this invention of a composite formed by a process of manufacturing a composite of one embodiment of this invention shown in FIG. 32. The thickness, t, of the composite is less than 50 microns more than the combined maximum depth, g, of the inverted light collimating surface features 3001 and the maximum height, h, of the light collimating surface features 3202 such that t−(h+g)<50 microns.

Figure 34:
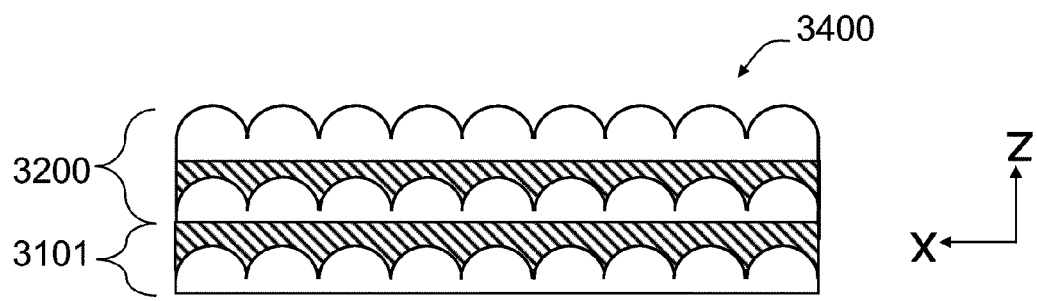
FIG. 34 is a cross-sectional view of one embodiment of this invention of a composite comprising more than one inverted light collimating features formed by a process of manufacturing a composite of one embodiment of this invention.

FIG. 34 is a cross-sectional view of one embodiment of this invention of a composite formed by a process of manufacturing a composite of one embodiment of this invention. A composite 3400 is formed by optical coupling or manufacturing an optical composite 3101 on the optical composite 3200 of FIG. 32. In one embodiment of this invention, the hatched regions in FIG. 34 correspond to one or more low refractive index materials with inverted light collimating features and the non-hatched regions refer to high refractive index regions with light collimating surface features.

Figure 35:
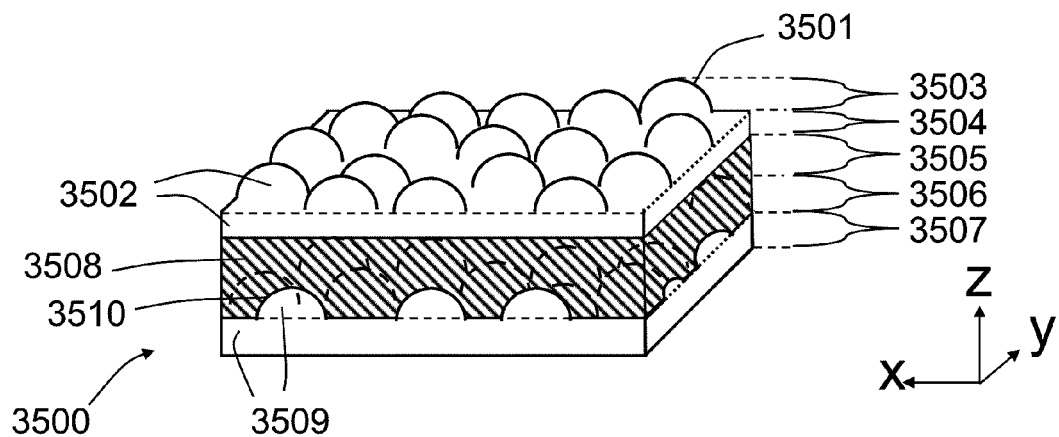
FIG. 35 is a perspective view of one embodiment of this invention of a composite comprising concave inverted light collimating features and convex light collimating features.

FIG. 35 is a perspective view of one embodiment of this invention of a composite comprising concave inverted light collimating features and convex light collimating features. A composite 3500 comprises concave inverted light collimating features 3510 in a first light transmitting material 3508 which is optically coupled to a second light transmitting material 3509 and a third light transmitting material 3502 with convex light collimating surface features 3501. The first light transmitting material 3508 comprises a first surface relief region 3506 comprising the inverted light collimating surface features 3510 and a first substrate region 3505 that does not comprise any inverted light collimating surface features 3610. The second light transmitting material 3509 comprises a second substrate region 3507 that does not comprise the inverted light collimating surface features 3510. The third light transmitting material 3502 comprises a third surface relief region 3503 that comprises the convex light collimating surface relief features 3501 and a third substrate region 3504 that does not comprise the light collimating surface relief features 3501. In one embodiment of this invention, the thickness of the optical composite can be reduced by reducing the thickness of one or more substrate regions (or regions without surface relief features) by extruding onto a film of a first light transmitting material with a low refractive index, effectively using the film as a support. In one embodiment of this invention, a composite comprises second and third substrate regions wherein their combined thickness is less than 50 microns, 30 microns, 20 microns or 10 microns.

Figure 36:
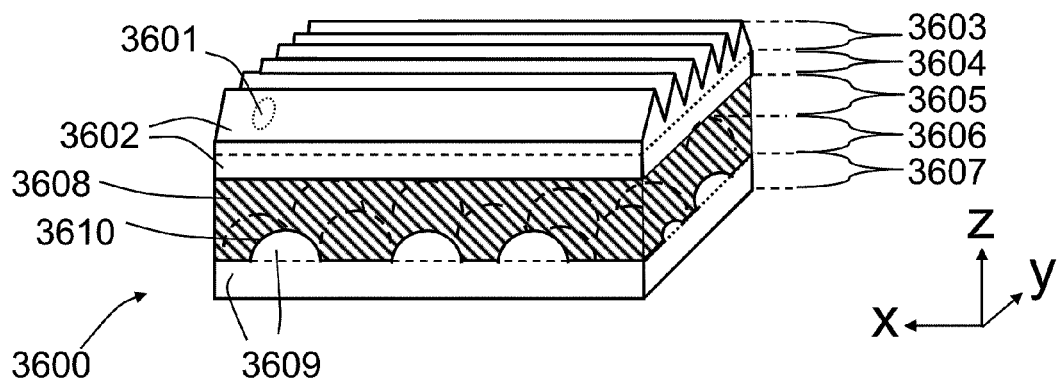
FIG. 36 is a perspective view of one embodiment of this invention of a composite comprising concave inverted light collimating features and a linear array of prismatic light collimating features.

FIG. 36 is a perspective view of one embodiment of this invention of a composite comprising concave inverted light collimating features and a linear array of prismatic light collimating features. A composite 3600 comprises concave inverted light collimating features 3610 in a first light transmitting material 3608 which is optically coupled to a second light transmitting material 3609 and a third light transmitting material 3602 with a linear array of prismatic light collimating surface features 3601. The first light transmitting material 3608 comprises a first surface relief region 3606 comprising the inverted light collimating surface features 3610 and a first substrate region 3605 without any inverted light collimating surface features 3610. The second light transmitting material 3609 comprises a second substrate region 3607 that does not comprise the inverted light collimating surface features 3610. The third light transmitting material 3602 comprises a third surface relief region 3603 comprising the linear array of prismatic light collimating surface features 3601 and a third substrate region 3604 that does not comprise the linear array of prismatic light collimating surface features 3601.

Figure 37:
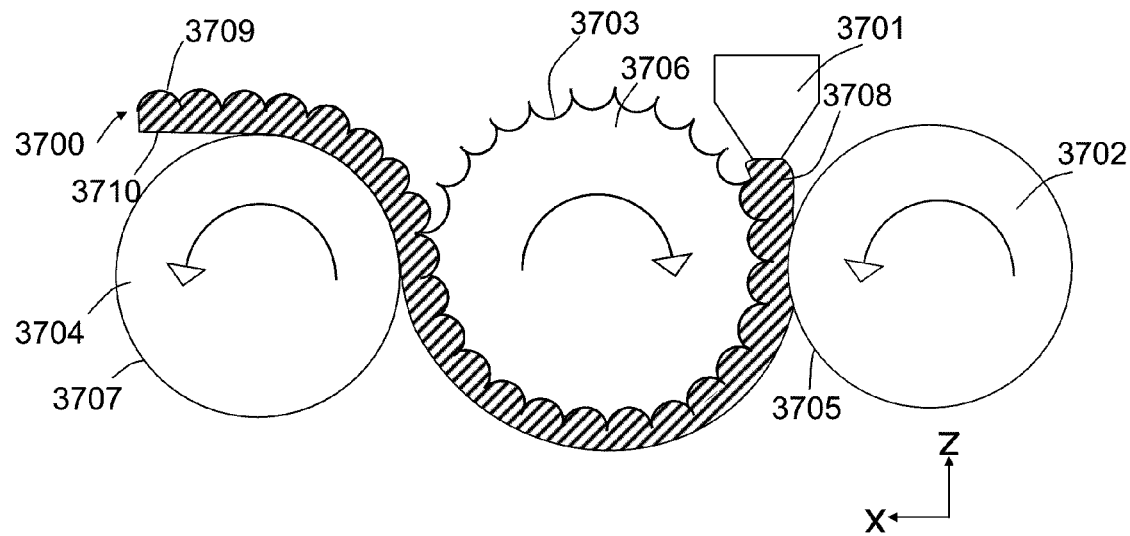
FIG. 37 is a cross-sectional view of one embodiment of this invention of a method for manufacturing a composite comprising extruding and embossing a second light transmitting material.

FIG. 37 is a cross-sectional view of one embodiment of this invention of a method for manufacturing a composite comprising extruding and embossing a second light transmitting material. A second light transmitting material 3708 is extruded from an extrusion film die 3701 onto a casting roll 3702 and embossing roll 3706. The casting roll 3702 has a substantially smooth surface 3705 and the embossing roll 3706 has concave surface features 3703 for embossing convex light collimating surface features 3709 on the resulting film 3700. The second light transmitting material 3708 is cooled by one or more of the casting roll 3702 or embossing roll 3706 and is further fed around a third roll 3704 with a substantially smooth surface 3707.

Figure 38:
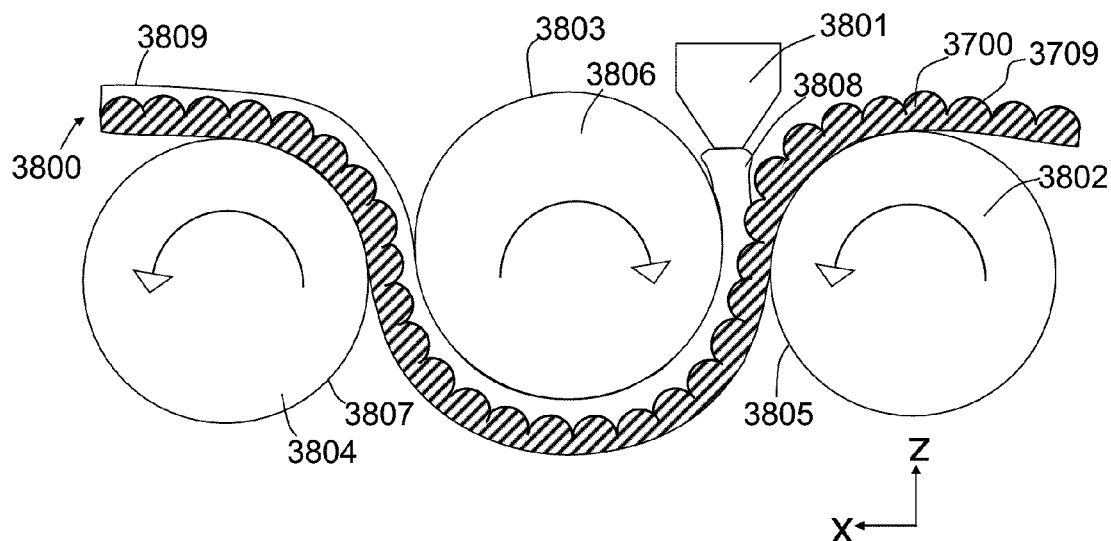
FIG. 38 is a cross-sectional view of one embodiment of this invention of a method for manufacturing a composite comprising extruding a first light transmitting material onto a film with light collimating surface features such that the surface is substantially planarized.

FIG. 38 is a cross-sectional view of one embodiment of this invention of a method for manufacturing a composite comprising extruding a first light transmitting material onto a film with light collimating surface features such that the surface is substantially planarized. A first light transmitting material 3808 is extruded from an extrusion film die 3801 onto a film 3700 comprising a convex light collimating surface features 3709 and a casting roll 3806 with a substantially planar surface 3803. The first light transmitting material 3808 is cooled by one or more of the casting roll 3806 or the film 3700 and is further fed around a third roll 3804 with a substantially smooth surface 3807. The casting roll 3806 cools the surface of the first light transmitting material 3808 and forms a substantially planar surface 3809 on the resulting composite 3800.

Figure 39:
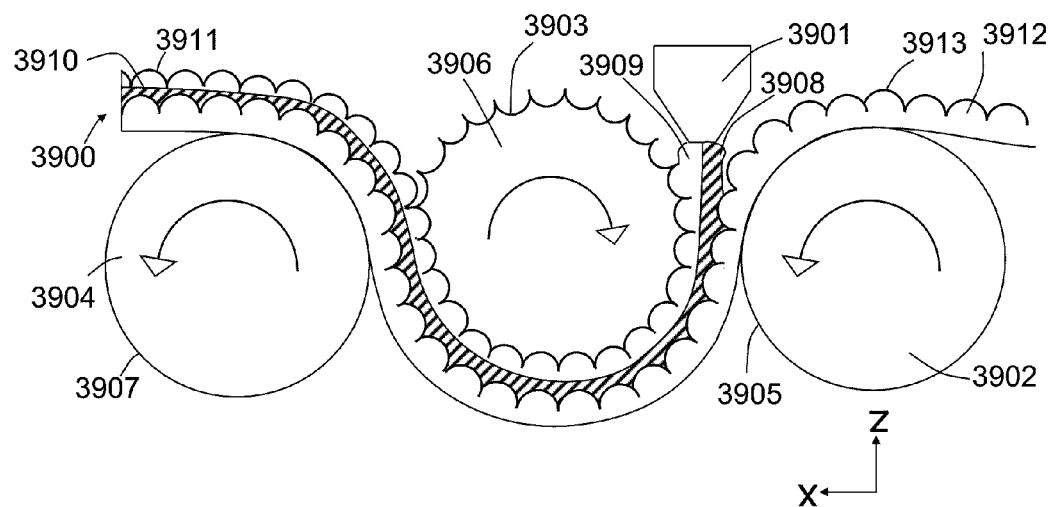
FIG. 39 is a cross-sectional view of one embodiment of this invention of a method for manufacturing a composite comprising extruding a first and third light transmitting material onto a film comprising light collimating surface features and embossing light collimating surface features into the third light transmitting material.

FIG. 39 is a cross-sectional view of one embodiment of this invention of a method for manufacturing a composite comprising extruding a first and third light transmitting material onto a film comprising light collimating surface features and embossing light collimating surface features into the third light transmitting material. A third light transmitting material 3909 and a first light transmitting material 3908 are co-extruded from a multi-layer extrusion film die 3901 onto a film 3912 comprising first convex light collimating surface features 3913 and onto an embossing roll 3906 with concave features 3903 on the surface such that light collimating surface features 3911 are formed on the third light transmitting material 3909 forming the optical composite 3900. The third light transmitting material 3909 and the first light transmitting material 3908 are cooled by one or more of the embossing roll 3906 or film 3912 and is further fed around a third roll 3904 with a substantially smooth surface 3907. In one embodiment of this invention, the interface 3910 between the third light transmitting material 3909 and first light transmitting material 3908 is substantially planar. In one embodiment of this invention, a method of manufacturing a composite comprises simultaneously co-extruding a first and third light transmitting material on a light collimating film and embossing the third light transmitting material with light collimating features. In one embodiment of this invention, co-extruding the first and third light transmitting materials simultaneously, removes a separate manufacturing step (such as extruding a planarization layer of a first light transmitting material). In another embodiment of this invention, co-extruding the first and third light transmitting materials simultaneously, reduces the total composite thickness, t, because a substrate material is not required for the first or third light transmitting materials. In one embodiment, the thickness, t, of the composite 3900 is less than 50 microns more than the combined maximum height of the first convex light collimating surface features 3913 and the maximum height of the light collimating surface features 3911.

Figure 40:
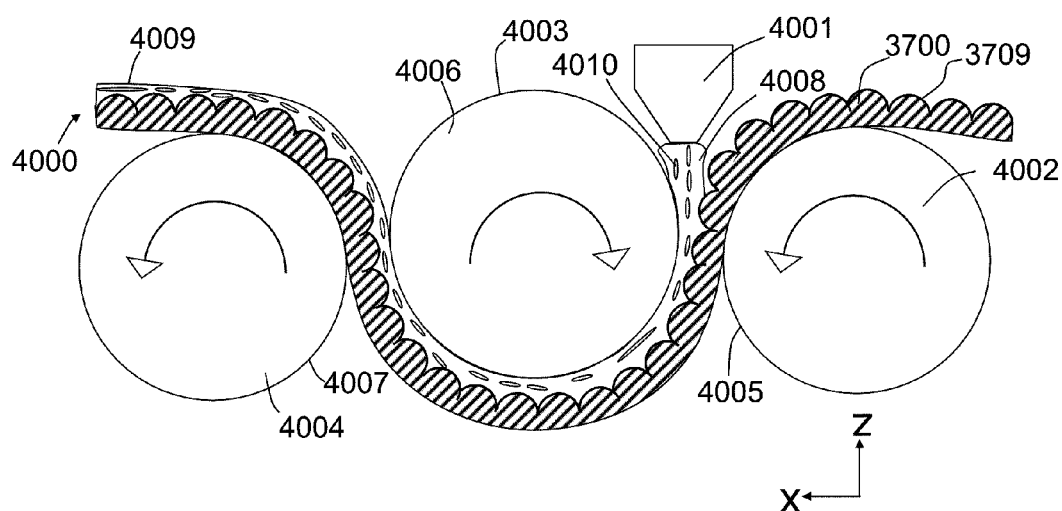
FIG. 40 is a cross-sectional view of one embodiment of this invention of a method for manufacturing a composite comprising extruding and embossing a first light transmitting material comprising dispersed phased domains onto a film with inverted light collimating features.

FIG. 40 is a cross-sectional view of one embodiment of this invention of a method for manufacturing a composite comprising extruding and embossing a first light transmitting material comprising dispersed phased domains onto a film with inverted light collimating features. A first light transmitting material 4008 comprising dispersed phase domains 4010 of a fourth light transmitting material is extruded onto a first film 3700 comprising a second light transmitting material with light collimating surface features 3709 from an extrusion film die 4001. The first light transmitting material is extruded onto a first film 3700 with convex light collimating surface features 3709 and a casting roll 4006 with a substantially smooth surface 4003 for achieving a substantially planar surface 4009 on a surface of the resulting composite 4000. The first light transmitting material 4008 is cooled by one or more of the casting roll 4006 or film 3700 and is further fed around a third roll 4004 with a substantially smooth surface 4007. In one embodiment of this invention, the process of extruding the first light transmitting material elongates or stretches the dispersed phase domains shape such that they are ellipsoidal, asymmetrically shaped, or have a larger dimension in the x direction than in the y direction. In another embodiment of this invention, the materials and process conditions are chosen such that the dispersed phase domains in a light transmitting material are not substantially elongated or are substantially spherical in the composite.

Figure 41:
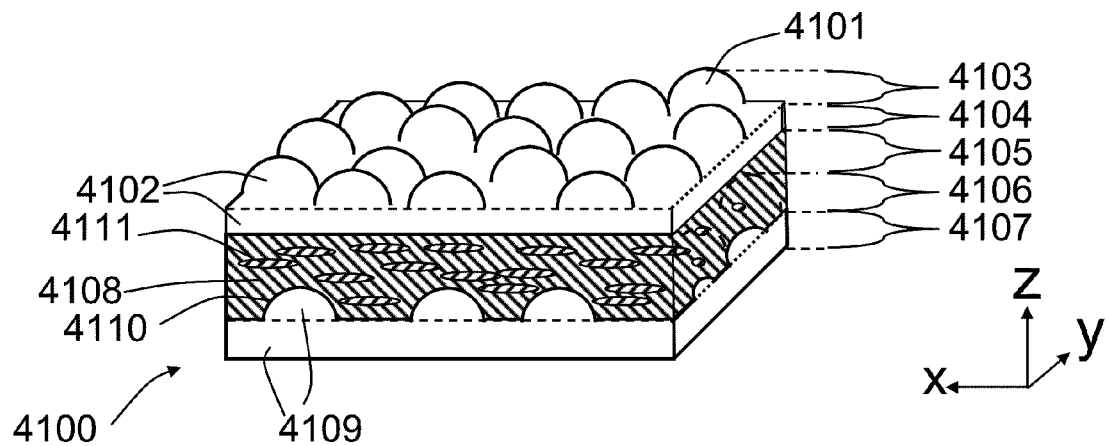
FIG. 41 is a perspective view of one embodiment of this invention of a composite comprising concave inverted light collimating surface features, asymmetrically shaped dispersed phase domains, and convex light collimating surface features.

FIG. 41 is a perspective view of one embodiment of this invention of a composite comprising concave inverted light collimating surface features and convex light collimating surface features. A composite 4100 comprises concave inverted light collimating features 4110 in a first light transmitting material 4108 which is optically coupled to a second light transmitting material 4109 and a third light transmitting material 4102 with convex light collimating surface features 4101. The first light transmitting material 4108 comprises a first surface relief region 4106 comprising the inverted light collimating surface features 4110 and a first substrate region 4105 that does not comprise any inverted light collimating surface features 4110. The second light transmitting material 4109 comprises a second substrate region 4107 that does not comprise the inverted light collimating surface features 4110. The third light transmitting material 4102 comprises a third surface relief region 4103 that comprises the convex light collimating surface relief features 4101 and a third substrate region 4104 that does not comprise the convex light collimating surface relief features 4101. The first light transmitting material 4108 further comprises dispersed phase domains 4111 of a light transmitting material wherein the dispersed phase domains 4111 are ellipsoidal.

In one embodiment of this invention, a composite comprises ellipsoidal domains in a first light transmitting material that diffuse incident light such that the uniformity of a light emitting device comprising the composite is greater than 70%, 80% or 90%. In another embodiment of this invention, a composite comprises a substantially regular array of inverted light collimating surface features and a substantially regular array of light collimating features and a first light transmitting region comprising dispersed phase domains wherein the disperse phase domains scatter light in-between the inverted light collimating surface relief features and the light collimating surface features such that the moiré contrast is less than 30%, 20% or 10%.

Figure 42:
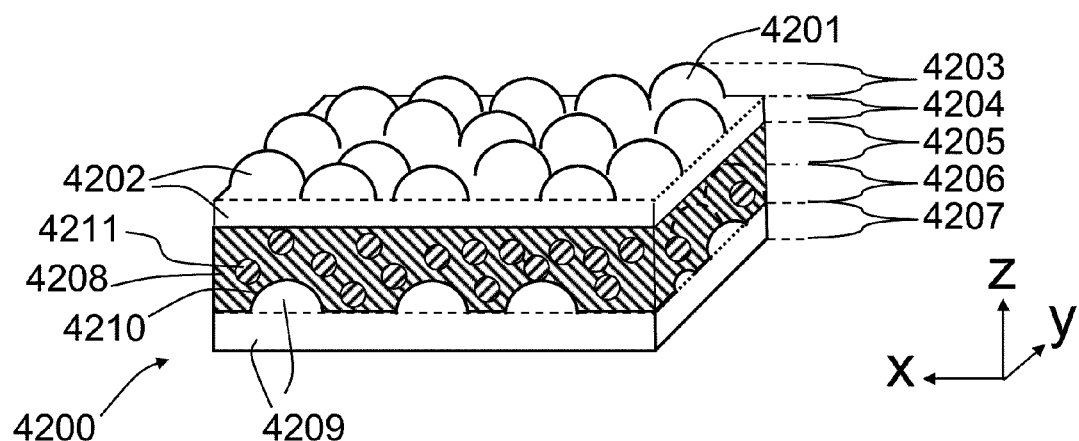
FIG. 42 is a perspective view of one embodiment of this invention of a composite comprising concave inverted light collimating surface features, spherical dispersed phase domains, and convex light collimating surface features.

FIG. 42 is a perspective view of one embodiment of this invention of a composite comprising concave inverted light collimating surface features and convex light collimating surface features. A composite 4200 comprises concave inverted light collimating features 4210 in a first light transmitting material 4208 which is optically coupled to a second light transmitting material 4209 and a third light transmitting material 4202 with convex light collimating surface features 4201. The first light transmitting material 4208 comprises a first surface relief region 4206 comprising the inverted light collimating surface features 4210 and a first substrate region 4205 that does not comprise any inverted light collimating surface features 4210. The second light transmitting material 4209 comprises a second substrate region 4207 that does not comprise the inverted light collimating surface features 4210. The third light transmitting material 4202 comprises a third surface relief region 4203 that comprises the convex light collimating surface relief features 4201 and a third substrate region 4204 that does not comprise the convex light collimating surface relief features 4201. The first light transmitting material 4208 comprises dispersed phase domains 4211 of a fourth light transmitting material wherein the dispersed phase domains 4211 are substantially spherical.

Figure 43:
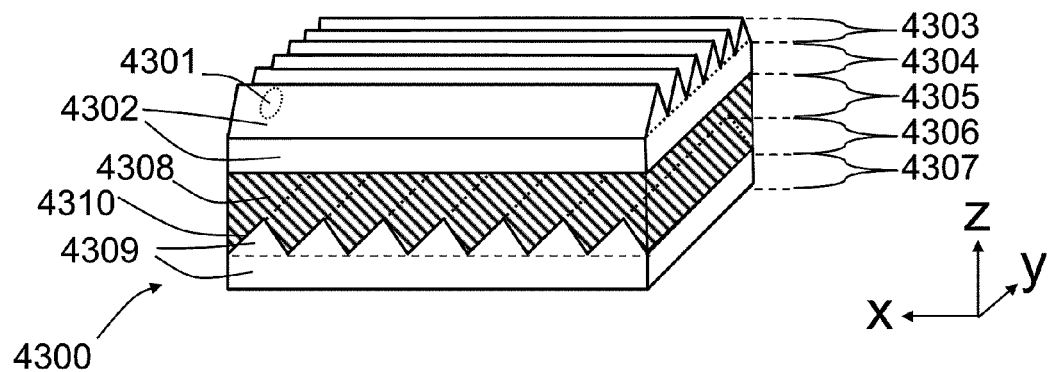
FIG. 43 is a perspective view of one embodiment of this invention of a composite comprising concave prismatic inverted light collimating surface features and convex prismatic light collimating surface features.

FIG. 43 is a perspective view of one embodiment of this invention of a composite comprising concave prismatic inverted light collimating surface features and convex prismatic light collimating surface features. A composite 4300 comprises concave prismatic inverted light collimating features 4310 in a first light transmitting material 4308 which is optically coupled to a second light transmitting material 4309 and a third light transmitting material 4302 with convex prismatic light collimating surface features 4301. The first light transmitting material 4308 comprises a first surface relief region 4306 comprising the inverted prismatic light collimating surface features 4310 and a first substrate region 4305 that does not comprise any inverted prismatic light collimating surface features 4310. The second light transmitting material 4309 comprises a second substrate region 4307 that does not comprise the inverted prismatic light collimating surface relief features 4310. The third light transmitting material 4302 comprises a third surface relief region 4303 that comprises the convex prismatic light collimating surface relief features 4301 and a third substrate region 4304 that does not comprise the convex prismatic light collimating surface relief features 4301.

Figure 44:
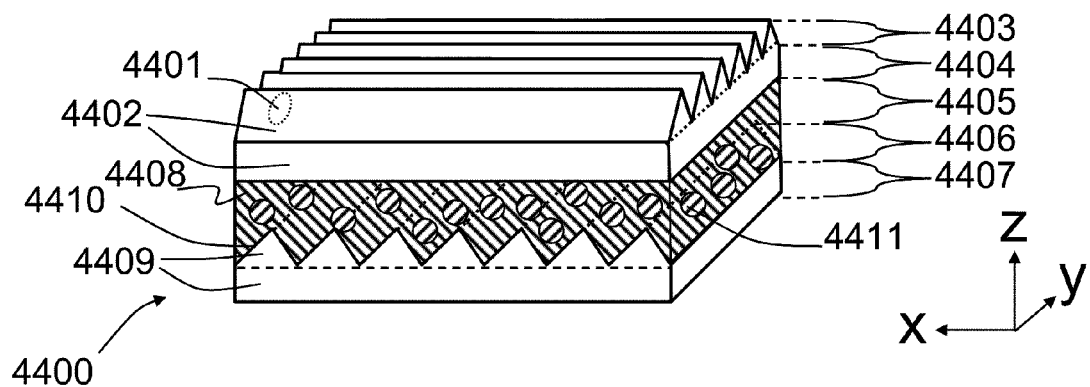
FIG. 44 is a perspective view of one embodiment of this invention of a composite comprising concave prismatic inverted light collimating surface features, spherical dispersed phase domains, and convex prismatic light collimating surface features.

FIG. 44 is a perspective view of one embodiment of this invention of a composite comprising concave prismatic inverted light collimating surface features and convex prismatic light collimating surface features. A composite 4400 comprises concave prismatic inverted light collimating features 4410 in a first light transmitting material 4408 which is optically coupled to a second light transmitting material 4409 and a third light transmitting material 4402 with convex prismatic light collimating surface features 4401. The first light transmitting material 4408 comprises a first surface relief region 4406 comprising the inverted prismatic light collimating surface features 4410 and a first substrate region 4405 that does not comprise any inverted prismatic light collimating surface features 4410. The second light transmitting material 4409 comprises a second substrate region 4407 that does not comprise the inverted prismatic light collimating surface relief features 4410. The third light transmitting material 4402 comprises a third surface relief region 4403 that comprises the convex prismatic light collimating surface relief features 4401 and a third substrate region 4404 that does not comprise the convex prismatic light collimating surface relief features 4401. The first light transmitting material 4408 comprises dispersed phase domains 4411 of a light transmitting material wherein the dispersed phase domains 4411 are spherical.

FIG. 45 is a perspective view of one embodiment of this invention of a composite comprising concave prismatic inverted light collimating surface features and convex prismatic light collimating surface features. A composite 4500 comprises concave prismatic inverted light collimating features 4510 in a first light transmitting material 4508 which is optically coupled to a second light transmitting material 4509 and a third light transmitting material 4502 with convex prismatic light collimating surface features 4501. The first light transmitting material 4508 comprises a first surface relief region 4506 comprising the inverted prismatic light collimating surface features 4510 and a first substrate region 4505 that does not comprise any inverted prismatic light collimating surface features 4510. The second light transmitting material 4509 comprises a second substrate region 4507 that does not comprise the inverted prismatic light collimating surface relief features 4510. The third light transmitting material 4502 comprises a third surface relief region 4503 that comprises the convex prismatic light collimating surface relief features 4501 and a third substrate region 4504 that does not comprise the convex prismatic light collimating surface relief features 4501. The third light transmitting material 4502 comprises dispersed phase domains 4511 of a fourth light transmitting material wherein the dispersed phase domains 4511 are ellipsoidal.

FIG. 46A is a perspective view of a concave inverted light collimating surface feature of a composite of one embodiment of this invention. The concave inverted light collimating surface feature 4601 in the first light transmitting material 4617 is recessed from the substantially planar surface 4602 of the composite 4600. FIG. 46B is a perspective view of a convex light collimating surface feature 4603 corresponding to the inverse of the concave inverted light collimating surface feature 4601 of a composite of one embodiment of this invention. The convex light collimating surface feature 4603 in the first light transmitting material 4617 protrudes from the substantially planar surface 4602 of the composite 4604.

FIG. 46C is a perspective view of a prismatic inverted light collimating surface feature of a composite of one embodiment of this invention. The concave prismatic inverted light collimating surface feature 4605 in the first light transmitting material 4617 is recessed from the substantially planar surface 4602 of the composite 4606. FIG. 46D is a perspective view of a convex prismatic light collimating surface feature 4607 corresponding to the inverse of the concave prismatic inverted light collimating surface feature 4605 of a composite of one embodiment of this invention. The convex prismatic light collimating surface feature 4607 in the first light transmitting material 4617 protrudes from the substantially planar surface 4602 of the composite 4608.

Figure 46E:
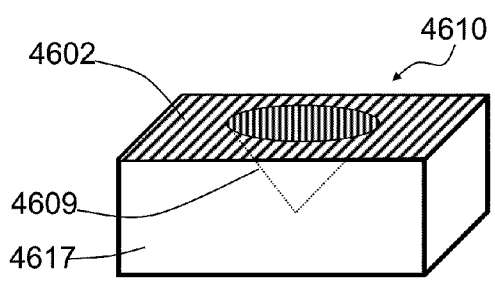
FIG. 46E is a perspective view of a conical inverted light collimating surface feature of a composite of one embodiment of this invention.
Figure 46F:
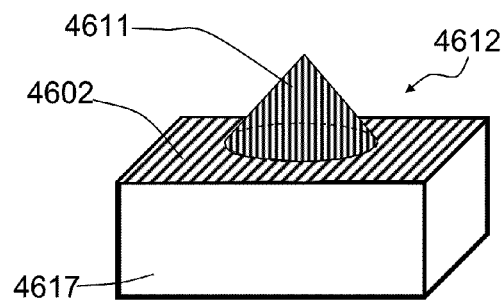
FIG. 46F is a perspective view of a convex conical light collimating surface feature corresponding to the inverse of FIG. 46E.

FIG. 46E is a perspective view of a conical inverted light collimating surface feature of a composite of one embodiment of this invention. The concave conical inverted light collimating surface feature 4609 in the first light transmitting material 4617 is recessed from the substantially planar surface 4602 of the composite 4610. FIG. 46F is a perspective view of a convex conical light collimating surface feature 4611 corresponding to the inverse of the concave conical inverted light collimating surface feature 4609 of a composite of one embodiment of this invention. The convex conical light collimating surface feature 4611 in the first light transmitting material 4617 protrudes from the substantially planar surface 4602 of the composite 4612.

Figure 46G:
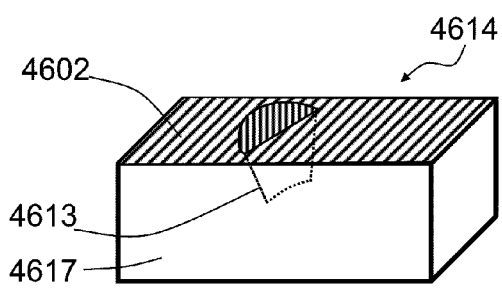
FIG. 46G is a perspective view of a concave geometrical inverted light collimating surface feature of a composite of one embodiment of this invention.
Figure 46H:
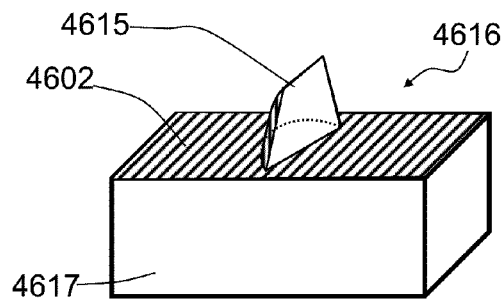
FIG. 46H is a perspective view of a convex geometrical light collimating surface feature corresponding to the inverse of the FIG. 46G

FIG. 46G is a perspective view of a concave geometrical inverted light collimating surface feature of a composite of one embodiment of this invention. The concave geometrical inverted light collimating surface feature 4613 in the first light transmitting material 4617 is recessed from the substantially planar surface 4602 of the composite 4614. FIG. 46H is a perspective view of a convex geometrical light collimating surface feature 4615 corresponding to the inverse of the concave conical inverted light collimating surface feature 4613 of a composite of one embodiment of this invention. The convex geometrical light collimating surface feature 4615 in the first light transmitting material 4617 protrudes from the substantially planar surface 4602 of the composite 4616.

In one embodiment of this invention a composite comprises a concave or convex geometrical surface feature wherein the feature can be defined by parametric curves, planar surfaces, polygonal shapes, geometric shapes or some combination thereof. In one embodiment of this invention a composite comprises concave or convex surface features of complex or random or substantially random shape such that the curvature or features are not readily definable but have a general convex or concave nature. For example, substantially random convex shapes can occur on a tool used for embossing by blasting a material with glass beads such that the surface is deformed.

Figure 47:
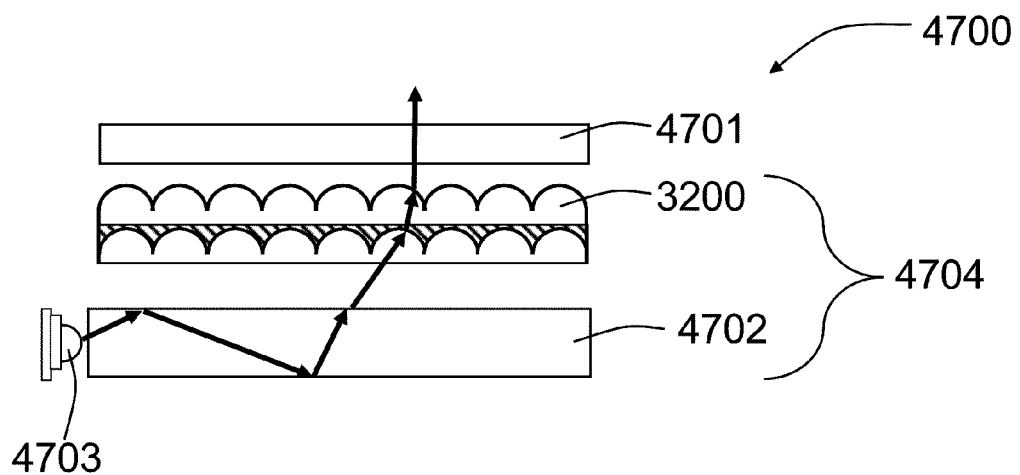
FIG. 47 is a cross-sectional view of one embodiment of this invention of a display comprising a backlight comprising a composite of one embodiment of this invention.

FIG. 47 is a cross-sectional view of one embodiment of this invention of a display comprising a backlight comprising a composite of one embodiment of this invention. A liquid crystal display 4700 comprises a liquid crystal display panel 4701 and a backlight 4704. The backlight 4704 comprises the composite 3200 of FIG. 32, a lightguide 4702 and a light source 4703. Light from the light source 4703 is collimated by the composite 3200 and provides illumination that is more collimated to the liquid crystal display panel 4701, creating a display 4700 with a more collimated light output. In one embodiment of this invention, the display is an emissive type such as an organic LED display, a LED array panel or wall, an electroluminescent display, a bi-stable display or other displays known in the display industry.

Figure 48:
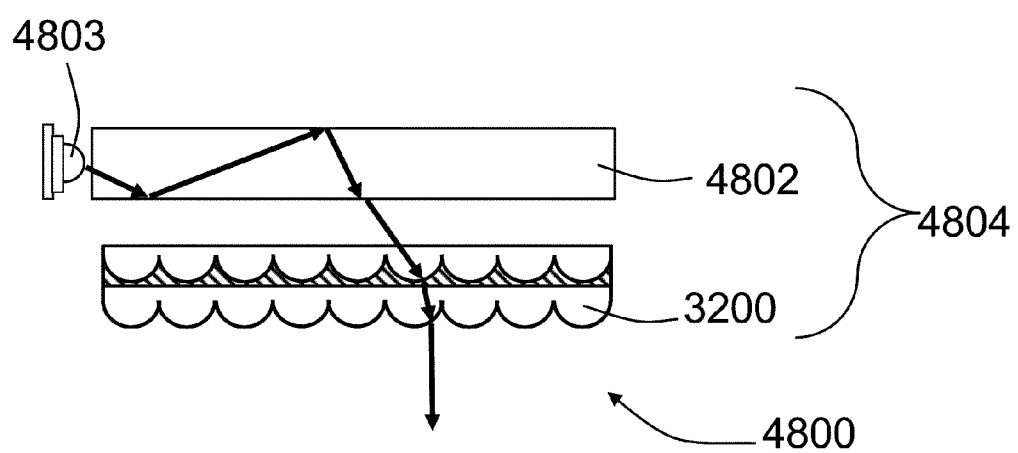
FIG. 48 is a cross-sectional view of one embodiment of this invention of light fixture comprising a light emitting device comprising a composite of one embodiment of this invention.

FIG. 48 is a cross-sectional view of one embodiment of this invention of light fixture comprising a light emitting device comprising a composite of one embodiment of this invention. A light fixture 4800 comprises a light emitting device 4804. The light emitting device 4804 comprises the composite 3200 of FIG. 32, a lightguide 4802 and a light source 4803 such as an LED. Light from the light source 4803 is collimated by the composite 3200 and provides illumination that is more collimated, creating a light fixture 4800 with a more collimated light output. In one embodiment of this invention, the light fixture is an emissive type such as an organic LED based light fixture, a LED array light fixture, a fluorescent bulb based light fixture or other fixtures known in the lighting industry.

Particular embodiments of the present invention are illustrated in the following Example(s). The following examples are given for the purpose of illustrating the invention, but not for limiting the scope or spirit of the invention.

Example 1

An anisotropic light scattering diffuser film produced as described in U.S. Pat. No. 5,932,342 is inserted into the cavity of a mold and held in place by a vacuum. A light source comprised of an array of light emitting diodes (white Rebel LEDs produced by Lumileds) on a metal core strip. The diffuser is oriented with the domains substantially parallel to the optical axis of the LEDs. Light transmitting PMMA is injected into the mold such that it is optically coupled to the output surface of the LEDs and the anisotropic light scattering diffuser film. The mold is cooled and the resulting article is removed.

Example 2

Two anisotropic light scattering diffuser films produced as described in U.S. Pat. No. 5,932,342 are inserted onto opposite surfaces of the cavity of a mold and held in place by a vacuum. A light source comprised of an array of light emitting diodes (white Rebel LEDs produced by Lumileds) on a metal core strip. The diffusers are oriented with the domains substantially parallel to the optical axis of the LEDs. Light transmitting PMMA is injected into the mold such that it is optically coupled to the output surface of the LEDs and the anisotropic light scattering diffuser films. The mold is cooled and the resulting article is removed.

Example 3

A polymeric optical film is formed in a low refractive index material (FEP NP101 from Daikin America Inc.) by extruding the polymer onto a tooled metal drum comprising inverted light collimating features of hemispherical concave features using a nip roller. The film is then surface treated to promote adhesion of a second material and fed into a second extrusion process wherein a polycarbonate (Bayer Makrolon 3100) is extruded onto the inverted light collimating features on the optical film such that the film is substantially planarized. The resulting film is then fed into a third extrusion process such that polycarbonate (Bayer Markrolon 3100) is optically coupled to the FEP material and embossed with light collimating surface features.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $\frac{1}{20}^{th}$, $\frac{1}{10}^{th}$, $\frac{1}{5}^{th}$, $\frac{1}{3}^{rd}$, $\frac{1}{2}$, etc, or by rounded-off approximations thereof, within the scope of the invention unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. A method of manufacturing an optical composite comprising:
   a. forming a plurality of inverted light collimating surface features in a first material with a first refractive index $n_{L1x}$; and
   b. optically coupling a second material with a second refractive index $n_{H2x}$ onto the first plurality of inverted light collimating features, the optical coupling forming a non-planar interface between the first material and the second material;
   wherein the optical composite comprises dispersed domains of a third material with a third refractive index $n_{dx}$.

2. The method of claim 1 wherein $n_{L1x} < n_{H2x}$.

3. The method of claim 1 wherein the optically coupling forms light redirecting features within the volume of the optical composite between the first material and the second material.

4. The method of claim 1 wherein the plurality of inverted light collimating surface features are recessed surface structures.

5. The method of claim 1 wherein the plurality of inverted light collimating surface comprises a concave feature wherein a line drawn between two points along a surface of the concave feature does not pass through the first material.

6. The method of claim 1 wherein forming a plurality of inverted light collimating surface features comprises embossing the plurality of inverted light collimating surface features into the first material.

7. The method of claim 6 wherein the embossing is radiation cured embossing or thermal embossing.

8. The method of claim 1 wherein the second material is adhesive.

9. The method of claim 1 wherein the second material comprises a surface on the side of the second material opposite the non-planar interface that is substantially planar.

10. The method of claim 1 wherein the first material comprises dispersing domains of a third material with a third refractive index $n_{dx}$ within the first material and $|n_{dx} - n_{L1x}| > 0.001$.

11. The method of claim 1 wherein the dispersed domains are asymmetrically shaped.

12. The method of claim 1 wherein the second material comprises dispersed domains of a third material with a third refractive index $n_{dx}$ and $|n_{dx} - n_{L1x}| > 0.001$.

13. A waveguide for illumination comprising the optical composite formed by the method of claim 1.

14. A lens for a light fixture comprising the optical composite formed by the method of claim 1.

15. The method of claim 1 wherein $n_{L1x} > n_{H2x}$.

16. A method of manufacturing an optical composite comprising:
   a. forming a plurality of inverted light collimating surface features in a first material with a first refractive index $n_{L1x}$;
   b. forming a plurality of light collimating surface features in a second material with a second refractive index $n_{H2x}$; and
   c. optically coupling the plurality of inverted light collimating surface features and the plurality of light collimating surface features to form an interface between the first material and the second material;
   wherein the optical composite comprises dispersed domains of a third material with a third refractive index $n_{dx}$.

17. The method of claim 16 wherein $n_{L1x} < n_{H2x}$.

18. The method of claim 16 wherein forming the plurality of light collimating surface features and optically coupling the plurality of inverted light collimating surface features and the plurality of light collimating surface features occur simultaneously.

19. The method of claim 16 wherein forming the plurality of inverted light collimating surface features and optically coupling the plurality of inverted light collimating surface features and the plurality of light collimating surface features occur simultaneously.

20. The method of claim 16 wherein $n_{L1x} > n_{H2x}$.

21. The method of claim 20 wherein forming the plurality of light collimating surface features and optically coupling the plurality of inverted light collimating surface features and the plurality of light collimating surface features occur simultaneously.

22. The method of claim 20 wherein forming the plurality of inverted light collimating surface features and optically coupling the plurality of inverted light collimating surface features and the plurality of light collimating surface features occur simultaneously.

23. A method of manufacturing an optical composite comprising:
   a. embossing a plurality of inverted light collimating surface features on a first surface of a film with a first refractive index $n_{L1x}$; and;
   b. forming a plurality of light collimating surface features in a second material with a second refractive index $n_{H2x}$ by extruding or coating the second material onto the first material;
   c. wherein the optical composite comprises dispersed domains of a third material with a third refractive index $n_{dx}$.

24. The method of claim 23 wherein $n_{L1x} < n_{H2x}$.

25. The method of claim 24 further comprising forming a substantially planar surface on a surface of the second material opposite the first material.

26. The method of claim 24 further comprising forming a planar surface on a second surface of the film opposite the first surface.

* * * * *